(12) United States Patent
Gross et al.

(10) Patent No.: US 7,878,301 B2
(45) Date of Patent: **\*Feb. 1, 2011**

(54) FIRE RETARDANT NONWOVEN MATERIAL AND PROCESS FOR MANUFACTURE

(75) Inventors: James R. Gross, Cordova, TN (US); Jeffrey Scott Hurley, Bartlett, TN (US); Brian E. Boehmer, Cordova, TN (US); Ronald Timothy Moose, Lakeland, TN (US)

(73) Assignee: Buckeye Technologies Inc., Memphis, TN (US)

(*) Notice: Subject to any disclaimer, the term of this patent is extended or adjusted under 35 U.S.C. 154(b) by 245 days.

This patent is subject to a terminal disclaimer.

(21) Appl. No.: 11/772,628

(22) Filed: Jul. 2, 2007

(65) Prior Publication Data

US 2008/0050565 A1    Feb. 28, 2008

Related U.S. Application Data

(63) Continuation-in-part of application No. 11/541,320, filed on Sep. 29, 2006, which is a continuation-in-part of application No. 10/592,067, filed as application No. PCT/US2006/012256 on Mar. 31, 2006.

(60) Provisional application No. 60/817,749, filed on Jun. 30, 2006, provisional application No. 60/848,105, filed on Sep. 29, 2006, provisional application No. 60/947,266, filed on Jun. 29, 2007, provisional application No. 60/667,873, filed on Apr. 1, 2005, provisional application No. 60/729,264, filed on Oct. 21, 2005.

(51) Int. Cl.
*E04B 1/82* (2006.01)

(52) U.S. Cl. ...................................... 181/290; 181/286

(58) Field of Classification Search ................ 181/290, 181/208, 286
See application file for complete search history.

(56) References Cited

U.S. PATENT DOCUMENTS 2,610,138 A * 9/1952 Heritage ................... 264/121

(Continued)

FOREIGN PATENT DOCUMENTS

EP      070164      1/1983

(Continued)

OTHER PUBLICATIONS

Morphology of Wood Pulp Fiber from Softwoods and Influence on Paper Strength; Richard A. Horn; U.S. Department of Agriculture, Forest Service, Research Paper; FPL 242; (1974).

(Continued)

*Primary Examiner*—Elvin G Enad
*Assistant Examiner*—Forrest M Phillips
(74) *Attorney, Agent, or Firm*—Baker Botts L.L.P.

(57) ABSTRACT

An improved acoustically and thermally insulating fire-retardant composite material suitable for use in structures such as buildings, appliances, and the interior passenger compartments and exterior components of automotive vehicles is provided. The material is comprised of at least one airlaid fibrous layer of controlled density and composition and incorporating suitable binding agents and additives as needed to meet expectations for noise abatement, fire-retardancy, and mildew resistance. Separately, an airlaid structure which provides a reduced, controlled airflow therethrough useful for acoustic insulation is provided, and which includes a woven or nonwoven scrim. A process for the production of the fire retardant nonwoven material is also provided.

60 Claims, 15 Drawing Sheets

U.S. PATENT DOCUMENTS

| | | | |
|---|---|---|---|
| 2,832,745 A | 8/1958 | Hechenbleikner | |
| 2,955,962 A | 10/1960 | Engdahl | |
| D200,773 S | 4/1965 | Anderson | |
| 3,259,536 A | 7/1966 | Gaeth et al. | |
| 3,424,270 A | 1/1969 | Hartman et al. | |
| 3,429,728 A | 2/1969 | Goldstone et al. | |
| 3,485,706 A * | 12/1969 | Evans | 428/134 |
| 3,536,557 A | 10/1970 | Goldstone et al. | |
| 3,844,813 A | 10/1974 | Leonard et al. | |
| 3,955,032 A | 5/1976 | Mischutin | |
| 4,026,808 A | 5/1977 | Duffy | |
| 4,035,215 A | 7/1977 | Goldstone | |
| 4,056,161 A | 11/1977 | Allen | |
| 4,131,664 A | 12/1978 | Flowers et al. | |
| 4,324,831 A | 4/1982 | Parrini et al. | |
| 4,420,526 A | 12/1983 | Schilling et al. | |
| 4,442,164 A | 4/1984 | Briggs et al. | |
| 4,568,581 A | 2/1986 | Peoples, Jr. | |
| 4,600,606 A | 7/1986 | Mischutin | |
| 4,702,861 A | 10/1987 | Farnum | |
| 4,776,854 A | 10/1988 | Ogawa et al. | |
| 4,851,283 A | 7/1989 | Holtrop et al. | |
| 4,851,291 A * | 7/1989 | Vigo et al. | 428/393 |
| 4,874,451 A | 10/1989 | Boger et al. | |
| 4,966,799 A | 10/1990 | Lucca et al. | |
| 5,050,256 A | 9/1991 | Woodcock | |
| 5,051,110 A | 9/1991 | Borrell et al. | |
| 5,055,341 A | 10/1991 | Yamaji et al. | |
| 5,064,714 A | 11/1991 | Yamaguchi et al. | |
| 5,068,001 A | 11/1991 | Haussling | |
| 5,141,784 A | 8/1992 | Beane et al. | |
| 5,200,457 A | 4/1993 | Vasishth et al. | |
| 5,246,772 A * | 9/1993 | Manning | 442/364 |
| 5,266,143 A | 11/1993 | Albera et al. | |
| 5,286,929 A | 2/1994 | Kazama et al. | |
| 5,296,657 A | 3/1994 | Gilliland et al. | |
| 5,321,861 A | 6/1994 | Dancey et al. | |
| 5,379,568 A | 1/1995 | Murray | |
| 5,401,793 A | 3/1995 | Kobayashi et al. | |
| 5,422,170 A | 6/1995 | Iwata et al. | |
| 5,491,186 A | 2/1996 | Kean et al. | |
| 5,492,881 A | 2/1996 | Diamond | |
| 5,516,580 A | 5/1996 | Frenette et al. | |
| 5,534,301 A | 7/1996 | Shutt | |
| 5,554,831 A | 9/1996 | Matsukawa et al. | |
| 5,591,289 A | 1/1997 | Souders et al. | |
| 5,646,077 A | 7/1997 | Matsunaga et al. | |
| 5,695,528 A | 12/1997 | Komori et al. | |
| 5,707,434 A | 1/1998 | Halloran et al. | |
| 5,721,281 A | 2/1998 | Blount | |
| 5,773,375 A | 6/1998 | Swan et al. | |
| 5,811,359 A | 9/1998 | Romanowski | |
| 5,817,408 A | 10/1998 | Orimo et al. | |
| 5,841,081 A | 11/1998 | Thompson et al. | |
| 5,843,559 A | 12/1998 | Cadieux et al. | |
| 5,886,306 A | 3/1999 | Patel et al. | |
| RE36,323 E | 10/1999 | Thompson et al. | |
| 5,971,099 A | 10/1999 | Yasuda et al. | |
| 6,017,601 A | 1/2000 | Amsel | |
| 6,102,465 A | 8/2000 | Nemoto et al. | |
| 6,109,389 A | 8/2000 | Hiers et al. | |
| 6,145,617 A | 11/2000 | Alts | |
| 6,153,668 A | 11/2000 | Gestner et al. | |
| 6,271,156 B1 * | 8/2001 | Gleason et al. | 442/413 |
| 6,296,075 B1 | 10/2001 | Gish et al. | |
| 6,296,076 B1 | 10/2001 | Hiers et al. | |
| 6,297,176 B1 | 10/2001 | North et al. | |
| 6,309,565 B1 | 10/2001 | Stowell et al. | |
| 6,336,948 B1 | 1/2002 | Inoue et al. | |
| 6,358,591 B1 * | 3/2002 | Smith | 428/74 |
| 6,419,729 B1 | 7/2002 | Duffy et al. | |
| 6,475,315 B1 | 11/2002 | Kean et al. | |
| 6,524,691 B2 | 2/2003 | Sugawara et al. | |
| 6,534,145 B1 | 3/2003 | Boyles | |
| 6,617,382 B1 | 9/2003 | Pirig et al. | |
| 6,631,785 B2 | 10/2003 | Khambete et al. | |
| 6,667,254 B1 | 12/2003 | Thompson, Jr. et al. | |
| 6,669,265 B2 | 12/2003 | Tilton et al. | |
| 6,726,980 B2 | 4/2004 | Staelgraeve et al. | |
| 6,746,974 B1 | 6/2004 | Reiterer et al. | |
| 6,746,976 B1 | 6/2004 | Urankar et al. | |
| 6,802,389 B2 | 10/2004 | Tompson et al. | |
| 6,893,711 B2 | 5/2005 | Williamson et al. | |
| 7,000,729 B2 | 2/2006 | Jacobsen | |
| RE39,010 E | 3/2006 | Gish et al. | |
| 7,055,649 B2 | 6/2006 | Tompson et al. | |
| 7,080,712 B2 | 7/2006 | Tsuiki et al. | |
| 7,137,477 B2 | 11/2006 | Keller et al. | |
| 7,150,059 B2 | 12/2006 | Small, Jr. et al. | |
| 7,157,117 B2 | 1/2007 | Mikhael et al. | |
| 7,226,656 B2 | 6/2007 | Coates et al. | |
| 2001/0051247 A1 | 12/2001 | Waitkus et al. | |
| 2002/0042237 A1 | 4/2002 | Sameshima et al. | |
| 2002/0137421 A1 | 9/2002 | Desroches et al. | |
| 2002/0148047 A1 | 10/2002 | Corzani et al. | |
| 2003/0012883 A1 | 1/2003 | Yu et al. | |
| 2003/0106741 A1 | 6/2003 | Tompson et al. | |
| 2003/0176131 A1 | 9/2003 | Tilton | |
| 2003/0207639 A1 | 11/2003 | Lin | |
| 2004/0023587 A1 | 2/2004 | Bargo | |
| 2004/0028958 A1 | 2/2004 | Assink et al. | |
| 2004/0050619 A1 | 3/2004 | Bargo | |
| 2004/0097156 A1 | 5/2004 | McGuire et al. | |
| 2004/0102112 A1 | 5/2004 | McGuire et al. | |
| 2004/0110438 A1 | 6/2004 | Thompson et al. | |
| 2004/0121114 A1 | 6/2004 | Piana et al. | |
| 2004/0121683 A1 * | 6/2004 | Jordan et al. | 442/182 |
| 2004/0121691 A1 * | 6/2004 | Klein | 442/389 |
| 2004/0163724 A1 | 8/2004 | Trabbold et al. | |
| 2004/0176003 A1 | 9/2004 | Yang et al. | |
| 2004/0180599 A1 | 9/2004 | Yang et al. | |
| 2004/0192139 A1 | 9/2004 | Pallach et al. | |
| 2004/0226100 A1 | 11/2004 | Small et al. | |
| 2004/0231915 A1 * | 11/2004 | Thompson et al. | 181/290 |
| 2004/0238275 A1 | 12/2004 | Keller et al. | |
| 2004/0248490 A1 | 12/2004 | Hyuga et al. | |
| 2005/0014431 A1 | 1/2005 | Carmody et al. | |
| 2005/0020159 A1 * | 1/2005 | Zucker | 442/59 |
| 2005/0031819 A1 | 2/2005 | Mankell et al. | |
| 2005/0066691 A1 | 3/2005 | Ruid et al. | |
| 2005/0126848 A1 | 6/2005 | Siavoshai et al. | |
| 2005/0132886 A1 | 6/2005 | Schultze et al. | |
| 2005/0164582 A1 | 7/2005 | McGuire et al. | |
| 2005/0210584 A1 | 9/2005 | Lim et al. | |
| 2005/0227558 A1 | 10/2005 | Small et al. | |
| 2005/0250406 A1 | 11/2005 | Wenstrup et al. | |
| 2005/0269850 A1 | 12/2005 | York et al. | |
| 2006/0000024 A1 | 1/2006 | McGuire et al. | |
| 2006/0065482 A1 | 3/2006 | Schmidft et al. | |
| 2006/0068675 A1 | 3/2006 | Handermann et al. | |
| 2006/0090832 A1 * | 5/2006 | Allison et al. | 156/72 |
| 2006/0090958 A1 | 5/2006 | Coates et al. | |
| 2006/0105928 A1 | 5/2006 | Crooks et al. | |
| 2006/0113146 A1 | 6/2006 | Khan et al. | |
| 2006/0160454 A1 | 7/2006 | Handermann et al. | |
| 2006/0228528 A1 | 10/2006 | Link et al. | |
| 2006/0240217 A1 | 10/2006 | Foss et al. | |
| 2006/0289231 A1 * | 12/2006 | Priebe et al. | 181/290 |
| 2007/0014960 A1 | 1/2007 | Emanuel et al. | |
| 2007/0048512 A1 | 3/2007 | Mikhael et al. | |
| 2007/0175195 A1 | 8/2007 | Skirius et al. | |
| 2008/0008858 A1 | 1/2008 | Hong et al. | |
| 2008/0022645 A1 | 1/2008 | Skirius et al. | |
| 2008/0050565 A1 | 2/2008 | Gross et al. | |

| | | | |
|---|---|---|---|
| 2008/0054231 | A1 | 3/2008 | Wenstrup et al. |
| 2008/0073146 | A1* | 3/2008 | Thompson et al. .......... 181/291 |
| 2008/0082151 | A1* | 4/2008 | Quincy et al. ................. 607/96 |
| 2008/0121461 | A1* | 5/2008 | Gross et al. ................. 181/286 |
| 2009/0019825 | A1 | 1/2009 | Skirius et al. |

FOREIGN PATENT DOCUMENTS

| | | |
|---|---|---|
| EP | 0480724 | 4/1992 |
| EP | 1182087 A | 2/2002 |
| EP | 1612768 A | 1/2006 |
| EP | 1661503 | 5/2006 |
| GB | 2237756 | 5/1991 |
| JP | 2000222852 | 8/2000 |
| WO | WO8904886 | 6/1989 |
| WO | WO 9114496 | 10/1991 |
| WO | WO92/07985 | 5/1992 |
| WO | WO9526228 | 10/1995 |
| WO | WO 0071790 | 11/2000 |
| WO | WO2004/086354 | 10/2004 |
| WO | WO2006052581 | 5/2006 |
| WO | WO 2006107847 | 10/2006 |
| WO | WO 2007047263 | 4/2007 |

OTHER PUBLICATIONS

U.S. Appl. No. 10/592,067, filed Sep. 7, 2006, Skirius et al.
U.S. Appl. No. 11/541,320; Oct. 5, 2009, Response to Non-Final Rejection.
U.S. Appl. No. 11/541,320; Apr. 13, 2009, Non-Final Rejection.
U.S. Appl. No. 11/541,320; Dec. 19, 2009, Response to Non-Final Rejection.
U.S. Appl. No. 11/541,320; Sep. 22, 2008, Non-Final Rejection.
U.S. Appl. No. 11/779,751, filed Jul. 18, 2007.
U.S. Appl. No. 11/624,580, filed Jan. 18, 2007.
U.S. Appl. No. 12/174,424, filed Jul. 16, 2008.
U.S. Appl. No. 12/643,717, filed Dec. 21, 2009.
U.S. Appl. No. 11/779,751, Mar. 9, 2010 Non-Final Office Action.
U.S. Appl. No. 11/779,751, Jul. 8, 2010 Response to Non-Final Office Action.
U.S. Appl. No. 11/624,580, Nov. 17, 2008 Non-Final Office Action.
U.S. Appl. No. 11/624,580, Mar. 17, 2009 Response to Non-Final Office Action.
U.S. Appl. No. 11/624,580, Jul. 10, 2009 Final Office Action.
U.S. Appl. No. 11/624,580, Oct. 7, 2009 Response to Final Office Action.
U.S. Appl. No. 11/624,580, Oct. 26, 2009 Notice of Allowance.
U.S. Appl. No. 11/624,580, Dec. 17, 2009 Request for Continued Examination.
U.S. Appl. No. 11/624,580, Jan. 21, 2010 Notice of Allowance.
U.S. Appl. No. 12/174,424, Aug. 10, 2010 Non-Final Office Action.
U.S. Appl. No. 12/643,717, Aug. 9, 2010 Non-Final Office Action.
U.S. Appl. No. 11/541,320, Jun. 10, 2010 Response to Final Office Action.
U.S. Appl. No. 11/541,320, Jul. 19, 2010 Notice of Allowance.
U.S. Appl. No. 11/541,320, Aug. 27, 2010 Supplemental Notice of Allowance.
U.S. Appl. No. 11/541,320: Jan. 15, 2010, Final Office Action.
U.S. Appl. No. 10/592,067: Jun. 1, 2010, non-final Office Action.
U.S. Appl. No. 11/541,320, Dec. 19, 2008 Response to Non-Final Office Action.

* cited by examiner

Fig. 1
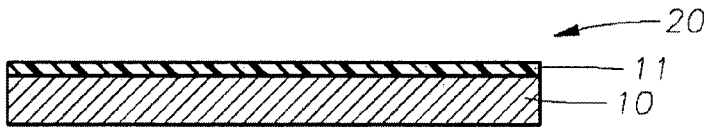
Fig. 2
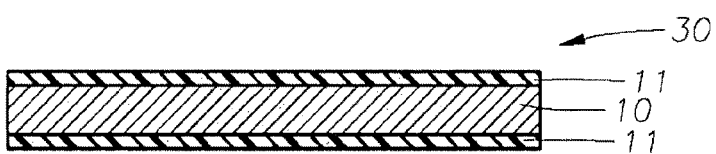
Fig. 3
Fig. 4
Fig. 5
Fig. 6  Normal Incidence Sound Absorption Coeffient
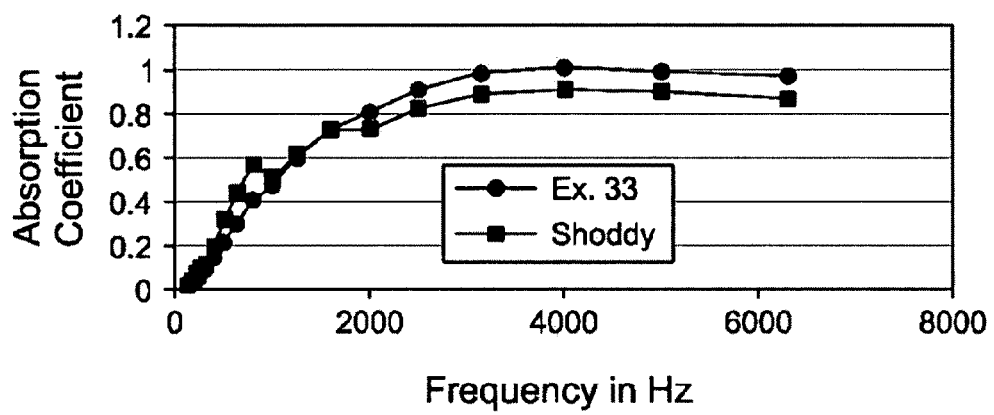

FIRE RETARDANT NONWOVEN MATERIAL AND PROCESS FOR MANUFACTURE

CROSS-REFERENCE TO RELATED APPLICATIONS

The present application claims priority under 35 U.S.C. §120 as a continuation in part application of U.S. application Ser. No. 11/541,320, filed Sep. 29, 2006. The present application also claims priority under 35 U.S.C. §119, based on U.S. Provisional Application Ser. Nos. 60/817,749, filed Jun. 30, 2006, 2006, 60/848,105, filed Sep. 29, 2006, and 60/947,266, filed Jun. 29, 2007. The teachings of these referenced applications are incorporated herein by reference in their entirety.

FIELD OF THE INVENTION

The present invention relates to nonwoven materials, and processes for producing such materials, that have superior flame-retardant, acoustic and/or thermal insulation characteristics. The invention specifically relates to airlaid structures treated with a fire-retardant, a water-repellent anti-leachant, or a combination thereof, which provide a reduced, controlled airflow therethrough useful for various fire-retardant materials including airlaid structures which provide a heat and flame retardant covering for cushions or bedding, and acoustic insulation of automobiles. Certain aspects of the invention relate to the manufacture of acoustic panels and padding for automobiles, such as dash panel liners or mats, engine side firewall insulation, engine side hood insulation, interior wheel well insulation, trunk compartment trim insulation, flooring underlayment, package trays, and door panels. Other aspects of the present invention relate to sound insulation for major appliances, such as dishwashers and washing machines, and sound and thermal insulation of exterior and interior walls, ceilings, and floors of buildings.

BACKGROUND OF THE INVENTION

The interior of an automobile is desirably insulated from sounds, which may be transmitted through the frame and body of the automobile. These sounds typically originate from the tires as they interact with the road surface, from external wind, or from the operation of the engine and other mechanical parts of the automobile. These sounds have frequencies ranging from a few Hertz (Hz) up to several thousand Hz.

While those skilled in the art recognize that a sound absorber is most effective at a thickness corresponding to one fourth of the wavelength of the frequency of sound to be absorbed, practical considerations of space and cost may limit the actual thickness of the insulating composites which can be employed. Acoustic blankets are designed with a variety of materials and configured to be installed against surfaces of structural panels of an automotive vehicle. The insulating blankets, or pads, serve to dampen, block, absorb or attenuate unwanted road noise and external sounds. Most commonly, these blankets are comprised of recycled textile fibers formed into a material called shoddy. In some instances, foam materials may be used.

With shoddy used in automobiles, a practical upper limit of insulating composite thickness is often thought to be approximately 25 mm (one inch) since the shoddy tends to be dense and heavy. Therefore, it is known in the art to apply an acoustical insulating barrier, sometimes called a heavy layer or viscoelastic layer, to the shoddy material for overall improved efficiency of sound reduction. Such a barrier material may double as carpeting attachment or may be included in the carpet fabrication. See, for example, U.S. Pat. Nos. 4,056,161; 4,966,799; 5,266,143; 5,068,001; and 6,109,389, the disclosures of which are hereby incorporated in their entirety.

Asphalt compositions, which are highly filled with dense inert powder (usually of a mineral nature) are applied in a molten state as disclosed in U.S. Pat. No. 3,429,728. Thermosetting resins like melamine, phenol-aldehydes, and urea resins are taught in U.S. Pat. No. 3,536,557, and dense filled vinyl plastisols are disclosed in U.S. Pat. No. 4,035,215. A variety of thermosetting and thermoplastic barrier materials are used in U.S. Pat. No. 4,131,664 to create the heavy or dense barrier layer. Also, a polymeric sound blocking material is disclosed in U.S. Pat. No. 3,424,270. All patents disclosed are hereby incorporated by reference in their entirety.

A drawback to the acoustical dampening materials disclosed in many of these patents is that they contribute significant weight to the vehicle. Those skilled in the art of acoustics and insulation understand that the best sound barrier is often times a heavy, dense material such as lead sheeting. However, a few pinholes or cracks can compromise even a thick or heavy sound barrier.

In lieu of sound barriers, sound absorbers, have been used in the art. Sound absorbers typically are significantly less dense than barrier materials, and may be porous. As a result, their acoustic performance is less affected by pinholes or cracks. In addition to absorbing sound energy, other mechanisms of reducing the perceived sound are to dampen and to block the sound waves. Although structural insulation requirements differ from automotive requirements, the technical learnings of one apply directly to the other.

In a final analysis of the final product, the actual physical mechanism of sound reduction (blocking or absorption) does not matter. The human ear or even a microphone cannot tell if a transmitted sound has been partially blocked or partially absorbed. In applications with numerous penetrations of the acoustic and structural panels, as in the firewall of an automobile, a sound-absorbing material may actually outperform a barrier material since the gaskets around the penetrations must be nearly perfect for the barrier material to be highly efficient in blocking the incident sound.

Routinely in the manufacture of vehicles, fibrous panels are die cut and/or molded under heat and pressure to impart a shape-sustaining contour to uniquely conform to the sheet metal of each make and model of vehicle. The molding operation can involve a heated die and cold material, or the acoustic material itself is heated and then pressed in a cold die.

Criteria in the manufacture and use of sound absorbing and blocking composites, pads, batts, or blankets have been the cost of the textile raw material itself, the cost of processing the materials into heavyweight nonwoven blankets, and the ease by which such blankets can be custom-molded to fit precisely against the structural panels of the vehicle. Other technical parameters of importance have been the acoustical properties of such fibrous nonwovens, their weight, and their durability over prolonged service during which time they may be subjected to wide variations in heat and humidity and quite possibly exposure to solvent or water-based adhesives.

Reducing the size and weight of vehicles has long been known to be effective in improving gas mileage. However, there have not heretofore been economically viable options for incorporating lighter-weight acoustic insulation materials while retaining the expected level of sound-insulating performance. The present invention offers nonwoven structures as a lighter alternative for acoustic insulation, providing a reduced, controlled airflow therethrough.

It is also known in the textile industry to produce fire-retardant fabrics for use as upholstery, mattress ticking, panel fabric, and other items. Such items are formed of natural or synthetic fibers, and then treated with fire-retardant chemicals. Conventional fire retarding chemicals include halogen-based and/or phosphorous-based chemicals. In approaches to render fabrics semi-permanently to permanently fire-retardant, whereby the fire-retardant chemical is reacted with the cellulose or protein functionalities of natural fibers, U.S. Pat. No. 2,832,745 discloses amidophosphates reacting with trimethylol melamine to form a thermosetting resin within the textile fiber. U.S. Pat. No. 4,026,808 reports on the use of a phosphorous containing N-hydroxy-methyl amide and tetrakis(hydroxymethyl)phosphonium chloride.

In what might be best described as a coating application, U.S. Pat. No. 3,955,032 reports a process using chlorinated-cyclopentadieno compounds and chlorobrominated-cyclpentadieno compounds, either alone or in combination with metal oxides, suspended in a latex medium and cured to render natural and synthetic materials and blends of the same fire-retardant. Similarly, in U.S. Pat. No. 4,600,606 a method of flame retarding textile and related fibrous materials is reported, which relies upon the use of a water-insoluble, non-phosphorous containing brominated aromatic or cycloaliphatic compounds along with a metal oxide to treat fabrics for protection against splashes of molten metals or glass. In yet another example of a dispersion of phosphorous-containing compounds and metal oxides in latex, U.S. Pat. No. 4,702,861 describes a flame retardant composition which, upon exposure to elevated temperatures and/or flame, reportedly creates a substantially continuous protective film generally encapsulating and/or enveloping the surface of the article onto which it is applied. The film-forming materials are based upon an aqueous latex dispersion of polyvinylchloride-acrylic copolymer, which is inherently fire-retardant.

Other disclosures which offer additional background information on flame-retardant materials include U.S. Pat. No. 4,776,854 entitled, "Method for Flameproofing Cellulosic Fibrous Materials"; U.S. Pat. No. 5,051,110 entitled, "Fibrous Material"; U.S. Pat. No. 5,695,528 entitled, "Treating Agent for Cellulosic Textile Material and Process for Treating Cellulosic Textile Material"; and U.S. Pat. No. 6,309,565 entitled, "Formaldehyde-Free Flame Retardant Treatment for Cellulose-Containing Materials".

SUMMARY OF THE INVENTION

The benefits and advantages of the present invention are achieved by providing a nonwoven material having acoustical, flame-retardant and thermal-insulating properties. It is an object of the present invention to expand upon the technology directed at the manufacture of flame retardant materials by offering a fire retardant nonwoven material. The material can serve, among other things, as an affordable and effective fire blocking protective liner material for foam and innerspring mattresses as well as for upholstered furniture. In other aspects of the invention, the material may be used in automotive applications as well as building insulation applications.

Specifically, the present invention is directed to a fire-retardant nonwoven material, containing a nonwoven substrate, a binder, and a fire retardant, wherein the fire-retardant nonwoven material has a Burn Through Time in a fire barrier screening test of about 1 minute or greater. In particular embodiments, the Burn Through Time is about 15 minutes or greater.

In one embodiment of the invention, the nonwoven substrate comprises matrix fibers including cellulosic fibers, synthetic fibers or a mixture thereof. The matrix fibers are present in amounts ranging from about 30 weight percent to about 95 weight percent based on the total weight of the nonwoven material. In other embodiments the matrix fibers are present in amounts ranging from about 60 weight percent to about 80 weight percent based on the total weight of the nonwoven material. In certain aspects of the invention, the matrix fibers include inherently fire-retardant fibers containing but not limited to ammonium polyphosphate, melamine, sodium tetraborate decahydrate, or combinations thereof.

In specific embodiments, the binder of the nonwoven material is a bicomponent fiber binder, a latex binder, a thermoplastic material, or a mixture thereof. The binder is present in amounts ranging from about 5 weight percent to about 70 weight percent, or alternatively, from about 20 weight percent to about 40 weight percent core binder.

In the present invention, the nonwoven substrate has a basis weight of from about 200 gram per square meter (gsm) to about 3000 gsm. In alternative embodiments, the basis weight of the nonwoven material substrate is from about 200 gsm to about 1500 gsm, or alternatively from about 1500 gsm to about 3000 gsm. In another embodiment, the basis weight of the nonwoven material substrate is from about 10 gsm to about 2000 gsm, alternatively from about 10 gs to about 150 gsm.

The fire-retardant nonwoven material of the invention may have a caliper thickness of from about 1.0 mm to about 60 mm; or alternatively, from about 1.0 mm to about 3 mm.

In specific embodiments, the fire retardant is present in an amount of from about 3 gsm to about 100 gsm. In an alternative embodiment, the fire retardant is present in an amount of from about 3 gsm to about 15 gsm. In another embodiment, the fire retardant is present in an amount of from about 15 gsm to about 50 gsm. In yet other embodiments, the fire retardant further contains an anti-lechant, which is present in an amount of from about 50 gsm to about 100 gsm. In a different embodiment, the fire retardant contains an anti-leachant present in an amount of from about 5 gsm to about 50 gsm.

In the present invention, the nonwoven material is an airlaid nonwoven, spunbonded nonwoven, a meltblown nonwoven, a spunlaced nonwoven, or a combination thereof. In a preferred embodiment, the nonwoven material is an airlaid nonwoven substrate. In one aspect of the invention, the nonwoven substrate has a density of from about 0.015 g/cm$^2$ to about 0.10 g/cm$^2$. In other aspects, the nonwoven substrate has a density of from about 0.017 g/cm$^2$ to about 0.045 g/cm$^2$.

In the present invention the fire-retardant nonwoven material imparts acoustic properties. Specifically, the nonwoven material has sound transmission reduction of 5 decibel or greater in an LSTT sound transmission test, or 11 decibel or greater in an LSTT sound transmission test.

In certain embodiments of the invention, the fire-retardant nonwoven material further contains a carrier or scrim having a basis weight of from about 8 gsm to about 2000 gsm which is integral with a surface of the core, or alternatively from about 8 gsm to about 25 gsm. In other embodiments of the invention, the carrier has a basis weight from about 10 gsm to about 2000 gsm.

In certain embodiments, the fire retardant material further contains an auxiliary layer containing plastic material with a basis weight of from about 50 gsm to about 700 gsm on the nonwoven material, or alternatively from about 300 gsm to about 700 gsm.

In yet another alternative embodiment, the auxiliary layer may have a basis weight of from 50 gsm to about 400 gsm on the nonwoven material; or from about 150 gsm to about 400 gsm.

In the fire-retardant nonwoven material of the present invention, the nonwoven material has a sound absorption coefficient (α) as determined by ASTM E1050-98 at 1000 Hz of about 0.5 or greater, alternatively about 0.7 or higher. In a different embodiment, the nonwoven material has a sound absorption coefficient (α) as determined by ASTM E1050-98 at 2500 Hz of about 0.9 or greater.

In particular aspects of the present invention, the nonwoven material has a SAMI of about 3 δdB/kgsm or greater, alternatively about 8 δdB/kgsm or greater.

In yet another aspect of the case, the fire-retardant, nonwoven material further contains a waterproofing, anti-leaching agent.

The fire-retardant nonwoven structures of the present invention may have an airflow resistance of from about 500 to about 10,000 Rayls ($NS/m^3$), or alternatively from about 500 to about 3,000 Rayls ($NS/m^3$).

In one specific embodiment of the invention, the fire retardant, nonwoven material contains a core, containing:
(A) from about 30 weight percent to about 95 weight percent matrix fibers;
(B) from about 60 weight percent to about 5 weight percent core binder, where weight percentages in the core are based on the total weight of the core;
(C) a fire retardant, where the fire-retardant nonwoven material has a Burn Through Time in a fire barrier screening test of about 1 minute or greater; and where
(D) the core has a basis weight of from about 200 $g/m^2$ to about 3000 $g/cm^2$,
(E) the core has a density of from about 0.015 $g/cm^2$ to about 0.10 $g/cm^2$, and
(F) the nonwoven material has sound transmission reduction of 5 decibel or greater in an LSTT sound transmission test.

The fire-retardant, nonwoven material of the present invention may be fabricated as a panel having an area of 50 $m^2$ or less. The panel may be molded with an application of heat and pressure into a shape which is retained. In particular embodiments, the panel has an area of 10 meters square or less.

In a specific embodiment of the invention, the fire retardant, nonwoven material contains:
(a) a scrim with an interior surface and an outer surface, the scrim having a basis weight of from about 8 gsm to about 200 gsm;
(b) a nonwoven material having an interior surface and an outer surface, wherein the interior surface of the nonwoven material is in contact with the interior surface of the scrim, the nonwoven material having a basis weight of from about 10 $g/m^2$ to about 2000 $g/m^2$ which contains from about 30 weight percent to about 95 weight percent matrix fibers and from about 5 weight percent to about 70 weight percent of a binder where the weight percentages are based on the total weight of the nonwoven material; and
(c) the substrate having been treated with a fire retardant.

The material can optionally further contain:
(d) deposited on the outer surface of the scrim from about 1 $g/m^2$ to about 40 $g/m^2$ of a polymeric coating; and, optionally,
(e) deposited on the outer surface of the nonwoven material from about 1 $g/m^2$ to about 40 $g/m^2$ of a second polymeric coating; and wherein the nonwoven structure has a Burn Through Time in a fire barrier screening test of about 1 minute or greater.

The present invention also covers various processes for producing the fire-retardant nonwoven material. Such processes include:

(A) providing a comminution sheet of cellulosic fibers,
(B) comminuting the sheet into individualized cellulosic fibers,
(C) providing binder fibers,
(D) air conveying the individualized cellulosic fibers and binder fibers to form a mixture of matrix fibers,
(E) air laying the matrix fibers on a forming wire to form an airlaid nonwoven material,
(F) optionally, depositing a latex binder on the airlaid nonwoven material,
(G) heating the nonwoven material to cure the binder fibers,
(H) depositing a fire retardant on the nonwoven material, and
(I) optionally, depositing an anti-leachant on the nonwoven material.

In another aspect of the invention, the process for the production of a fire-retardant, nonwoven material includes:
(1a) on a moving foraminous wire from one or more forming heads, depositing a mixture comprising:
(A) from about 95 weight percent to about 40 weight percent matrix fibers,
(B) from about 60 weight percent to about 5 weight percent core binder, to form a core of the nonwoven material, where weight percentages in the core are based on the total weight of the core, and
(C) a fire retardant, followed by
(2a) heating the nonwoven material to consolidate the mixture of matrix fibers and binder, or,
(1b) deposition on a moving foraminous wire of
(A) a woven or nonwoven carrier with a basis weight of from about 10 gsm to about 2000 gsm; followed by
(2b) deposition on the carrier from one or more forming heads of a mixture containing
(B) from about 95 weight percent to about 40 weight percent matrix fibers,
(C) a fire retardant, and
(D) from about 60 weight percent to about 5 weight percent core binder, to form a core of the nonwoven material, where weight percentages in the core are based on the total weight of the core, and so that the carrier is integral with a surface of the core, followed by
(3) heating the nonwoven material to consolidate the mixture of matrix fibers and binder, wherein
(E) the core has a basis weight of from about 200 gsm to about 3000 gsm, and
(F) the core has a density of from about 0.015 $g/cm^2$ to about 0.10 $g/cm^2$.

In another aspect, the process for the production of a nonwoven structure, includes:
(1) providing a scrim with an interior surface and an outer surface, the scrim having a basis weight of from about 8 $g/m^2$ to about 200 $g/m^2$;
(2) airlaying a nonwoven material on the interior surface of the scrim, the nonwoven material having a basis weight of from about 10 $g/m^2$ to about 2000 $g/m^2$ which contains from about 30 weight percent to about 95 weight percent matrix fibers and from about 5 weight percent to about 70 weight percent of a binder where the weight percentages are based on the total weight of the nonwoven material;
(3) depositing on the outer surface of the scrim from about 1 $g/m^2$ to about 40 $g/m^2$ of a polymeric coating;
(4) depositing a fire retardant material onto an outer surface of either the nonwoven structure or the scrim so that the nonwoven structure has a Burn Through Time in a fire barrier screening test of about 1 minute or greater; and, optionally, (5) depositing on the outer surface of the nonwoven material from about 1 g/m² to about 40 g/m² of a second polymeric coating.

In yet another aspect, the process for the production of a fire-retardant nonwoven material includes:
(A) depositing a fire retardant on a comminution sheet of cellulosic fibers,
(B) comminuting the sheet into individualized cellulosic fibers,
(C) providing binder fibers,
(D) air conveying the individualized cellulosic fibers and binder fibers to form a mixture of matrix fibers,
(E) air laying the matrix fibers on a forming wire to form an airlaid nonwoven material,
(F) optionally, depositing a latex binder on the airlaid nonwoven material,
(G) heating the nonwoven material to cure the binder, and
(H) optionally, depositing an anti-leachant on the nonwoven material.

In a particular embodiment the process for the production of a fire-retardant nonwoven material includes:
(A) providing a comminution sheet of cellulosic fibers,
(B) treating the comminution sheet with a substance by spraying or dousing the comminution sheet;
(C) comminuting the sheet into individualized cellulosic fibers,
(C) providing binder fibers,
(D) air conveying the individualized cellulosic fibers and binder fibers to form a mixture of matrix fibers,
(E) air laying the matrix fibers on a forming wire to form an airlaid nonwoven material, and
(F) heating the nonwoven material to cure the binder fibers.

The substance applied to the comminution sheet may be a fire retardant, waterproofing agent, pigment, adhesive, biocide, antileachant, polymer, antimicrobicide, or combinations thereof.

BRIEF DESCRIPTION OF THE DRAWINGS

So that the manner in which the above recited features of the present invention can be better understood, certain drawings are appended hereto. It is to be noted, however, that the appended drawings illustrate only selected embodiments of the inventions and are therefore not to be considered limiting of scope, for the inventions may admit to other equally effective embodiments and applications.

FIGS. 1-5 are cross-sectional views of nonwoven, airlaid materials in various embodiments.

FIG. 1 is a cross-sectional view of a homogeneous airlaid base pad.

FIG. 2 is a cross-sectional view of the pad of FIG. 1, having a single layer of moldable thermoplastic or thermosetting polymeric binder applied to one side of the airlaid pad. In this way, an airlaid structure is formed.

FIG. 3 is an alternate arrangement for an airlaid, nonwoven structure. FIG. 3 shows a cross-sectional view of the pad of FIG. 1 having a layer of the polymeric binder applied to both sides of the pad.

FIG. 4 is an alternate arrangement for an airlaid, nonwoven structure. FIG. 4 shows a cross-sectional view of the pad of FIG. 1, with one side of the base pad receiving a layer of polymeric binder, while the other receives a "heavy" layer. A dense filler is dispersed in a polymeric binder to form the heavy layer.

FIG. 5 is yet another alternate arrangement for an airlaid, nonwoven structure. FIG. 5 provides a cross-sectional view of the pad of FIG. 1, with the heavy layer being applied to one side of the airlaid pad.

FIG. 6 is a Cartesian coordinate showing a Normal Incidence Sound Absorption Coefficient. Frequency is charted against absorption coefficient.

DETAILED DESCRIPTION

Definitions

Figure 7:
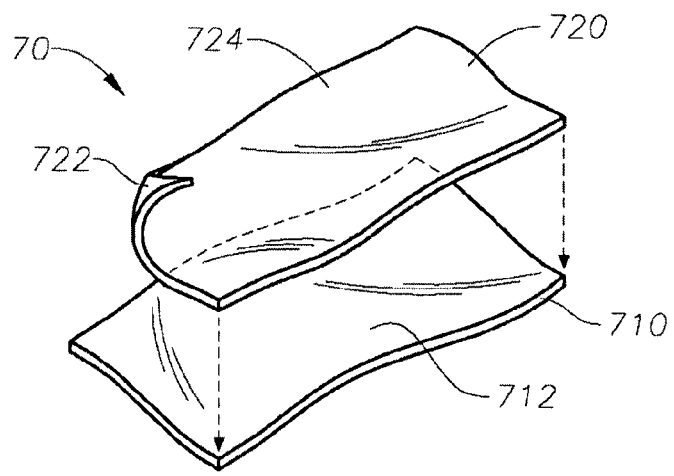
FIG. 7 is perspective view of still another alternate arrangement for an airlaid, nonwoven structure. Here, a scrim and a fibrous base pad are shown. The scrim is exploded away from an interior surface of the base pad for purposes of illustration.

As used herein, the terms "fibrous material" and "matrix fiber" refer to a synthetic or cellulosic fiber, or combinations thereof. The term "core" as used herein means a base fibrous material, and is referred to interchangeably herein as the "fibrous material," "core" or "base pad."

The term "scrim" as used herein means any fibrous woven or nonwoven layer of material. The scrim may be used as a carrier sheet in an airlaid process, or may be combined with a pre-formed airlaid or other nonwoven material in a converting process. In some instances, the terms carrier and scrim are interchangeable.

As used herein, the term "fire-retardant" refers to a chemical or additive that inhibits or resists the spread of fire or that inhibits autocombustion. Depending upon the context, the term "fire-retardant" may alternatively refer to a material or structure that has the characteristic of inhibiting or resisting the spread of fire or that inhibits autocombustion.

"Comminuting" means to defiberize or to disintegrate.

The terms "Laboratory Sound Transmission Test" or LSTT as used herein refer to a laboratory screening test that uses an amplified source of "white noise" on one side of a pad sample, and a microphone of the decibel meter on the other side of the sample.

The terms "Sound Absorption Mass Index" (SAMI) as used herein to the sound transmission loss in the LSTT (difference in decibel reading between transmitted sound without the sample in place and the reading with the sample installed) divided by the basis weight of the sample expressed in kilograms per square meter. The SAMI index normalizes the acoustic data from the LSTT for basis weight.

As used herein, the term "gsm" refers to the unit of grams per square meter ($g/m^2$).

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Unless specified otherwise, all values provided herein can be assumed to include the term about.

Nonwoven Material

A fire-retardant nonwoven material is disclosed herein. The nonwoven material contains a nonwoven substrate and a fire-retardant. As will be explained further below, the nonwoven material has superior fire-retardant or heat resistant capabilities as demonstrated by a Fire Barrier Test.

The nonwoven substrate has an interior surface and an outer surface. In one aspect, the nonwoven substrate has a basis weight of from about 10 gsm to about 2000 gsm, and contains from about 30 weight percent to about 95 weight percent matrix fibers. Preferably, the nonwoven substrate has from about 5 weight percent to about 70 weight percent of a binder. These weight percentages are based on the total weight of the nonwoven material. It may be desirable for the nonwoven substrate to have a basis weight of from about 10 gsm to about 1000 gsm, or more desirably, from about 10 gsm to about 500 gsm, or preferably, from about 10 gsm to about 250 gsm, or alternatively, from about 10 gsm to about 150 gsm.

Fibers

FIGS. 1-5 are cross-sectional views of nonwoven, airlaid materials in various embodiments. First, FIG. 1 presents a cross-sectional view of a homogeneous base pad or "core" 10. The airlaid base pad defines a nonwoven, airlaid structure fabricated from matrix fibers and a core binder. "Matrix fiber" refers to both synthetic and/or cellulosic fibers, or combinations thereof Preferably, the fibers do not melt or dissolve to any degree during the forming or bonding of the pad and any auxiliary layers or materials.

A wide variety of natural and synthetic fibers is suitable for use as matrix fibers for the pad. Preferred matrix fibers are cellulosic fibers, though matrix fibers may also be synthetic fibers or a mixture of cellulosic and synthetic fibers. In one aspect, the matrix fibers are any synthetic or cellulosic fiber that does not melt or dissolve to any degree during the formation or bonding of the nonwoven structure.

Cellulosic fibrous materials suitable for use in the present invention include both softwood fibers and hardwood fibers. See M. J. Kocurek & C. F. B. Stevens, *Pulp and Paper Manufacture—Vol.* 1: *Properties of Fibrous Raw Materials and Their Preparation for Pulping*, The Joint Textbook Committee of the Paper Industry, pp. 182 (1983), which is hereby incorporated by reference in its entirety. Exemplary, though not exclusive, types of softwood pulps are derived from slash pine, jack pine, radiata pine, loblolly pine, white spruce, lodgepole pine, redwood, and Douglas fir. North American southern softwoods and northern softwoods may be used, as well as softwoods from other regions of the world. Hardwood fibers may be obtained from oaks, genus *Quercus*, maples, genus *Acer*, poplars, genus *Populus*, or other commonly pulped species. In general, softwood fibers are preferred due to their longer fiber length as measured by T 233 cm-95, and southern softwood fibers are most preferred due to a higher coarseness as measured by T 234 cm-84, which leads to greater intrinsic fiber strength as measured by breaking load relative to either northern softwood or hardwood fibers.

Other suitable cellulose fibers include those derived from Esparto grass, bagasse, jute, ramie, kenaff, sisal, abaca, hemp, flax and other lignaceous and cellulosic fiber sources. Also available are cotton linter pulp, chemically modified cellulose such as cross-linked cellulose fibers, and highly purified cellulose fibers such as Buckeye HPF. Such fibers are available from Buckeye Technologies Inc. of Memphis, Tenn.

The fibrous material may be prepared from its natural state by any pulping process. Such processes include chemical, mechanical, thermomechanical (TMP) and chemithermomechanical pulping (CTMP). These industrial processes are described in detail in R. G. Macdonald & J. N. Franklin, *Pulp* and Paper Manufacture in 3 volumes; 2nd Edition, Volume 1: The Pulping of Wood, 1969; Volume 2: Control, Secondary Fiber, Structural Board, Coating, 1969, Volume 3: Papermaking and Paperboard Making, (1970), The joint Textbook Committee of the Paper Industry, and in M. J. Kocurek & C. F. B. Stevens, Pulp and Paper Manufacture, Vol. 1: Properties of Fibrous Raw Materials and Their Preparation for Pulping, The Joint Textbook Committee of the Paper Industry, p. 182 (1983). Both references are hereby incorporated by reference in their entirety.

The cellulose fiber used as a matrix fiber for the pad may be derived from a source which is one or more of Southern Softwood Kraft, Northern Softwood Kraft, hardwood, eucalyptus, mechanical, recycle and rayon. Preferably, Southern Softwood Kraft, Northern Softwood Kraft, or a mixture thereof is used. More preferably, Southern Softwood Kraft is used. Preferably, the fibrous material forming the pad is prepared by a chemical pulping process, such as a Kraft or sulfite process. The Kraft process is particularly preferred. Pulp prepared from a southern softwood by a Kraft process is often called SSK. In a similar manner, southern hardwood, northern softwood and northern hardwood pulps are designated SHK, NSK & NHK, respectively. Bleached pulp, which is fibers that have been delignified to very low levels of lignin, are preferred, although unbleached Kraft fibers may be used in some applications due to lower cost, especially if alkaline stability is not an issue.

Crosslinked cellulose fibers, also known in the industry as curly fibers, are also advantageous in this invention, particularly when it is desired to achieve extremely high caliper (thickness) of the nonwoven material and retain resiliency of the structure. Crosslinked fibers are described in U.S. Pat. Nos. 4,898,462; 4,889,595; 4,888,093; 4,822,453, all of which are hereby incorporated by reference in their entirety. Recycled cellulose fibers from cardboard and newsprint are further sources, as long as the recycled fibers can be individualized sufficiently to enter the air-stream of the airlaid machine.

The cellulose fibers may be blended with synthetic fibers such as polyester, nylon, polyethylene or polypropylene. Synthetic fibers suitable for use as a matrix fiber include cellulose acetate, polyolefins (including polyethylene and polypropylene), nylon, polyester (including polyethylene terephthalate (PET)), vinyl chloride, and regenerated cellulose such as viscose rayon, glass fibers, ceramic fibers, and the various bicomponent fibers known in the art. While bicomponent fibers may serve as matrix fibers in the nonwoven material of this invention, they will be more fully described and discussed below in the context of their role as a binder fiber.

Other synthetic fibers suitable for use in various embodiments as matrix fibers or as bicomponent binder fibers include fibers made from various polymers including, by way of example and not by limitation, acrylic, polyamides (such as, for example, Nylon 6, Nylon 6/6, Nylon 12, polyaspartic acid, polyglutamic acid, and so forth), polyamines, polyimides, polyamides, polyacrylics (such as, for example, polyacrylamide, polyacrylonitrile, esters of methacrylic acid and acrylic acid, and so forth), polycarbonates (such as, for example, polybisphenol A carbonate, polypropylene carbonate, and so forth), polydienes (such as, for example, polybutadiene, polyisoprene, polynorbomene, and so forth), polyepoxides, polyesters (such as, for example, polyethylene terephthalate, polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate, and so forth), polyethers (such as, for example, polyethylene glycol (polyethylene oxide), polybutylene glycol, polypropylene oxide, polyoxymethylene (paraformaldehyde), polytetramethylene ether (polytetrahydrofuran), polyepichlorohydrin, and so forth), polyfluorocarbons, formaldehyde polymers (such as, for example, urea-formaldehyde, melamine-formaldehyde, phenol formaldehyde, and so forth), natural polymers (such as, for example, cellulosics, chitosans, lignins, waxes, and so forth), polyolefins (such as, for example, polyethylene, polypropylene, polybutylene, polybutene, polyoctene, and so forth), polyphenylenes (such as, for example, polyphenylene oxide, polyphenylene sulfide, polyphenylene ether sulfone, and so forth), silicon containing polymers (such as, for example, polydimethyl siloxane, polycarbomethyl silane, and so forth), polyurethanes, polyvinyls (such as, for example, polyvinyl butyral, polyvinyl alcohol, esters and ethers of polyvinyl alcohol, polyvinyl acetate, polystyrene, polymethylstyrene, polyvinyl chloride, polyvinyl pyrrolidone, polymethyl vinyl ether, polyethyl vinyl ether, polyvinyl methyl ketone, and so forth), polyacetals, polyarylates, and copolymers (such as, for example, polyethylene-co-vinyl acetate, polyethylene-co-acrylic acid, polybutylene terephthalate-co-polyethylene terephthalate, polylauryllactam-block-polytetrahydrofuran, and so forth).

The matrix fibers desirably are present in the base pad in an amount of from about 30 percent by weight to about 95 percent by weight based on the total weight of the core or pad material. More desirably, the matrix fibers are present in the core in an amount of from about 40 weight percent to about 95 percent by weight based on the total weight of the pad; or, desirably, in an amount from about 55 percent to about 90 percent by weight; preferably still, in an amount of about 60 percent by weight to about 80 percent by weight.

Bicomponent fibers having a core and sheath are known in the art. Many varieties are used in the manufacture of nonwoven materials, particularly those produced by airlaid techniques. Various bicomponent fibers suitable for use in the present invention are disclosed in U.S. Pat. Nos. 5,372,885 and 5,456,982, both of which are hereby incorporated by reference in their entirety. Examples of bicomponent fiber manufacturers include KoSa (Salisbury, N.C.), Trevira (Bobingen, Germany) and ES Fiber Visions (Athens, Ga.).

Bicomponent fibers may incorporate a variety of polymers as their core and sheath components. Bicomponent fibers that have a PE (polyethylene) or modified PE sheath typically have a PET (polyethyleneterephthalate) or PP (polypropylene) core. In one embodiment, the bicomponent fiber has a core made of polyester and sheath made of polyethylene. Alternatively, a multi-component fiber with a PP (polypropylene) or modified PP or PE sheath or a combination of PP and modified PE as the sheath or a copolyester sheath wherein the copolyester is isophthalic acid modified PET (polyetheylene therephthalate) typically with a PET or PP core, or a PP sheath-PET core and PE sheath-PP core and co-PET sheath fibers may be employed. Various geometric configurations can be used for the bicomponent fiber used in the core or base pad, including concentric, eccentric, islands-in-the-sea, and side-by-side. The relative weight percentages of the core and sheath components of the total fiber may be varied.

Useful in various embodiments of this invention are multicomponent fibers having enhanced reversible thermal properties. Such fibers are described in U.S. Pat. No. 6,855,422, which is hereby incorporated by reference in its entirety. Such materials serve as phase changer or temperature regulating materials. Generally, phase change materials have the ability to absorb or release thermal energy to reduce or eliminate heat flow. In general, a phase change material may comprise any substance, or mixture of substances, that has the capability of absorbing or releasing thermal energy to reduce or eliminate heat flow at or within a temperature stabilizing range. The temperature stabilizing range may comprise a particular transition temperature or range of transition temperatures. Phase change materials used in conjunction with various embodiments of the nonwoven structure will be capable of inhibiting a flow of thermal energy during a time when the phase change material is absorbing or releasing heat, typically as the phase change material undergoes a transition between two states, such as, for example, liquid and solid states, liquid and gaseous states, solid and gaseous states, or two solid states. This action is typically transient, and will occur until a latent heat of the phase change material is absorbed or released during a heating or cooling process. Thermal energy may be stored or removed from the phase change material, and the phase change material typically can be effectively recharged by a source of heat or cold. By selecting an appropriate phase change material, the multi-component fiber may be designed for use in any one of numerous products.

An embodiment targeted at the structural thermal insulation market is to use the versatility of an airlaid machine to dose into the airlaid pad fibers, granules or microcapsules that can store heat or cold for release six or eight hours later. The granules reduce the energy bill for a building insulated with such granules.

In certain embodiments, the denier of the fiber ranges from about 1.0 dpf to about 4.0 dpf, and preferably from about 1.5 dpf to about 2.5 dpf. In certain embodiments, the length of the fiber ranges from about 3 mm to about 12 mm, preferably from about 4.5 mm to about 7.5 mm.

Binders

The matrix fibers are held by a binder. The purpose of the binder when present is to consolidate and hold the material together. The matrix fibers and binder together form the core or base pad. Binders suitable for use in the nonwoven material may be various bicomponent binder fibers or mixtures thereof, various latices or mixtures thereof, or bicomponent fibers or mixtures thereof in combination with various latices or mixtures thereof, which may be thermoplastic, thermosetting or a mixture thereof. Thermoplastic powders may be used in various embodiments, and may be included in the nonwoven fibrous material as a fine powder, chips, or in granular form. In one embodiment of the invention, binders are present in amounts ranging from about 5 weight percent to about 70 weight percent core binder. In another embodiment of the invention, binders are present in amount ranging from about 10 weight percent to about 45 weight percent core binder. Preferably, the binder ranges in amounts of from about 20 weight percent to about 40 weight percent core binder.

Another type of binder useful in various embodiments of this invention is thermoplastic materials in the form of powders, such as, for example, powdered polyethylene. Various latex binders are suitable for use in the nonwoven materials and core of this invention. An example is ethyl vinyl acetate copolymers such as AirFlex 124. AirFlex 124 is available from Air Products of Allentown, Pa. AirFlex 124 has about 10 percent solids and about 0.75 percent by weight AEROSOL® OT, which is an anionic surfactant. AEROSOL® OT is available from Cytec Industries (West Paterson, N.J.). Other classes of emulsion polymer binders such as styrene-butadiene and acrylic binders may also be used. BINDERS AIRFLEX® 124 and 192 from Air Products (Allentown, Pa.), optionally having an opacifier and whitener, such as, for example, titanium dioxide, dispersed in the emulsion may also be used. Other classes of emulsion polymer binders such as styrene-butadiene, acrylic, and carboxylated styrene butadiene acrylonitrile (SBAN) may also be used. A carboxylated SBAN is available from Dow Reichhold Specialty Latex (Research Triangle Park, N.C.). The Dow Chemical Company (Midland, Mich.) is a source of a wide variety of suitable latex binders, such as, for example, Modified Styrene Butadiene (S/B) Latexes CP 615NA and CP 692NA, and Modified Styrene Acrylate (S/A) Latexes, such as, for example, CP6810NA. A wide variety of suitable latices are discussed in *Emulsion Polymers*, Mohamed S. El-Aasser et al. (Editors), ISBN: 3-527-30134-8, from the 217th American Chemical Society (ACS) Meeting in Anaheim, Calif. (March 1999), and in *Emulsion Polymerization and Emulsion Polymers*, Peter A. Lovell et al. (Editors), ISBN: 0-471-96746-7, published by Jossey-Bass, Wiley. Also useful are various acrylic, styrene-acrylic and vinyl acrylic latices from Specialty Polymers, Inc. (Chester, S.C.). Also useful are Rhoplex™ and Primal™ acrylate emulsion polymers from Rohm and Haas (Philadephia, Pa.). Additional binders contemplated by the invention include, but are not limited to RHOPLEX® line of acrylic binders by Rohm & Haas Chemicals, LLC of Charlotte, N.C.; TYLAC® (carboxylated styrene-butadiene-acrylonitrile copolymer) from Dow Reichhold Specialty Latex LLC of Research Triangle Park, N.C.; and ROVENE® (carboxylated styrene-butadiene rubber) from Mallard Creek Polymers, Inc. of Charlotte, N.C.

In addition to being useful as a binder in the core of the nonwoven material, lattices may be used on one or both of the outer surfaces of the material to control dusting. In one embodiment of the present invention, the amount of lattices used would be in the range of from about 2 to about 10 gsm on an individual surface.

The core or pad containing the matrix fibers and core binder has a basis weight ranging from about 200 gsm to about 3000 gsm. In some embodiments, the pad has a basis weight of from about 200 gsm to about 1500 gsm, and in other embodiments from about 1500 gsm to about 3000 gsm. In particular embodiments, the basis weight may range from about 300 gsm to about 3000 gsm; others, from about 400 gsm to about 3000 gsm; others, from about 500 gsm to about 3000 gsm, others from about 600 gsm to about 3000 gsm; others, from about 700 gsm to about 3000 gsm, others from about 800 gsm to about 3000 gsm; others, from about 900 gsm to about 3000 gsm, others from about 1000 gsm to about 3000 gsm; others, from about 1100 gsm to about 3000 gsm, others from about 1200 gsm to about 3000 gsm; others, from about 1300 gsm to about 3000 gsm, others from about 1400 gsm to about 3000 gsm; still others, from about 1500 gsm to about 3000 gsm; and others, from about 1600 gsm to about 3000 gsm. In alternative embodiments of the claimed invention, the basis weight of the core or pad ranges from about 10 gsm to about 2000 gsm, alternatively from about 10 gsm to about 1000 gsm, or from about 10 gsm to about 500 gsm, from about 10 gsm to about 250 gsm, or from about 10 gsm to about 150 gsm.

The core or pad desirably has a density of from about 0.015 $g/cm^2$ to about 0.10 $g/cm^2$. In certain embodiments, the density is from about 0.015 $g/cm^2$ to about 0.08 $g/cm^2$. More desirably, the pad has a density of from about 0.015 $g/cm^2$ to about 0.06 $g/cm^2$, and in some embodiments from about 0.017 $g/cm^2$ to about 0.045 $g/cm^2$.

Fire Retardants

For most applications, the side of the nonwoven material 10, 20, 30, 40, 50, 70, facing human occupation will be treated with any of a number of common fire-retardant agents known in the art. In certain embodiments, the fire retardant is present in amounts from about 3 gsm to about 100 gsm. In certain embodiments, the fire retardant is present in amounts from about 3 gsm to about 15 gsm. In other embodiments, the fire retardant is present in amounts of from about 15 gsm to about 50 gsm, preferably from about 50 gsm to about 100 gsm. Most typically, these fire-retardant agents include sodium borate or sodium phosphates of various types. Proprietary fire-retardant mixtures, such as, for example, Spartan™ AR 295 Flame Retardant from Spartan Flame Retardants Inc. of Crystal Lake Ill., include both organic and inorganic constituents.

For most applications, the side of the nonwoven material facing human occupation will be treated with the fire-retardant. However, in various embodiments, the materials may have two-sided treatments. Various fire-retardants known in the art may be applied to the nonwoven substrate. Most typically, these fire-retardant agents include sodium borate or sodium or ammonium phosphates or phosphate esters of various types. Proprietary fire-retardant mixtures, such as, for example, Spartan™ AR 295 Flame Retardant from Spartan Flame Retardants Inc. of Crystal Lake, Ill., include both organic and inorganic constituents. Another non-limiting example of a fire-retardant is GLO-TARD FFR2, which is an ammonium polyphosphate fire-retardant from GLO-TEX International, Inc. of Spartanburg, S.C. Another example is Fire Retard 3496, which is a phosphate ester supplied by Manufacturers Chemicals, L.P. of Cleveland, Tenn. Another fire-retardant agent that may be used in the present invention is Flovan CGN, a multi-purpose phosphate-based flame retardant supplied by Huntsman (Salt Lake City, Utah). Another contemplated fire-retardant additive is SPARTAN™ AR 295, a diammonium phosphate based flame retardant from Spartan Flame Retardants, Inc. (Crystal Lake, Ill.). Borax, sodium tetraborate decahydrate, is another fire-retardant product available from U.S. Borax Inc. (Valencia, Calif.). Borax typically comes in powder form, but is dissolved in water and can be sprayed onto the substrate.

Each of these known fire-retardants, as well as other fire-retardants formulated to be effective with materials which are primarily cellulosic fibers, are operable in this invention. The effective dose of each could be determined by anyone reasonable skilled in the art through experimentation and testing.

As noted above, certain fibers having enhanced reversible thermal properties are used in the present invention. This includes fiber types having inherent fire-retardant properties. Some nonlimiting examples of these fibers types include Basolfil Merge 80 Melamine fiber, VISIL® silica/silicate filled rayon flame retardant fiber by Sateri International Group (Oy, Finland) and FR Corona® is a silica-filled rayon flame retardant fiber from Daiwabo Rayon Co. Ltd. (Japan).

In one embodiment of this invention, the fire-retardant-treated substrate is further treated with a water-repellent anti-leachant. Various water-repellant anti-leachants are suitable for preparing the fire-retardant non-woven materials of the instant invention. In the context of the present invention, a water-repellent anti-leachant may be a silicone-based compound, polymeric latex, fatty acid, paraffin, microcrystalline wax, fluorocarbon or any water-repellent anti-leachant known in the art or combination thereof. Specific water-repellent anti-leachants include silicone emulsions, that is, organomodified polydimethylsiloxane such as Magnisoft T-29 by GE Silicones (Friendly, W.V.). Amino-siloxanes may also be employed, such as those containing 15 percent solids latex of Tallopol SK81 supplied by Bozzeto, Inc. of Greensboro, N.C. Another example is an amino-siloxane waterproofing agent such as Dow Corning 2-8630 Polymer (>60% aminofunctional siloxane) from Dow Corning Corp. (Midland, Mich.). Various fatty acids include, by way of example, lauric acid, myristic acid, palmitic acid, palmitoleic acid, steartic acid, oleic acid, linoleic acid, and ricinoleic acid. Behenic acid may be used, particularly when it is deposited on the fibers as aluminum salts from the sodium salts of the fatty acids.

In another aspect, polymeric binders may be used as water-repellent anti-leachants. Ethylene vinyl acetate copolymers such as AIRFLEX®-192 and AIRFLEX®-EP1188 Emulsion by Air Products Polymers (Allentown, Pa.) are suitable. Ethylene vinyl chloride copolymers may be used. An example is AIRFLEX® 4530 ethylene vinyl chloride binder dispersion from Air Products Polymers. Finally, but not exclusively, carboxylated styrene butadiene copolymer latex may be used. An example is ROVENE® 5066-18 carboxylated styrene butadiene latex by Mallard Creek Polymers, Inc. (Charlotte, N.C.).

By treating the airlaid structure with a water-repellent anti-leachant, the fire retarding chemical on the structure is effectively locked within the nonwoven as an aqueous insult cannot wet. Consequently, the mainly water-soluble fire-retardant treatment is not easily dissolved or extracted from the nonwoven structure. Various fire-retardants may be used in combination with the water-repellent anti-leachants. Anti-leaching agents may be present in amounts ranging from about 3 to about 50 gsm, preferably from about 5 to about 15 gsm, or alternatively from about 15 to about 50 gsm.

In order to test the nonwoven materials of the present invention, Fire Barrier Tests were performed. In a Fire Barrier Test, the barrier material to be tested is cut to 10 cm×10 cm square, and is then centrally positioned on a 6.35 mm (0.25 inch) thick square steel plate approximately 15 cm×15 cm (6×6 inches). The plate has a circular hole of diameter of 50.8 mm (or 2 inches) machined concentrically through the center portion. Photographs of the apparatus used for the Fire Barrier Test are provided, and are discussed below.

A piece of urethane foam mattress topping with dimensions of 10 cm×10 cm×5.08 cm thick (4×4×2 inches) is laid on top of the barrier. The foam is then covered with another steel plate that also has a 50.8 mm centrally located hole. The second plate is positioned in alignment with the first plate, and then clamped with the help of four, threaded studs welded to the lower plate and passing through holes in the upper plate. With bulky samples such as the 5.08 cm thick foam, it may be desirable to clamp the sample between the two plates by tightening wing nuts on the exposed upper portions of the threaded studs. Again, photographs of the apparatus used for the Fire Barrier Test are provided, and are discussed below The entire assemblage is mounted level over a Bunsen burner. The burner is fed with a natural gas flow rate of 415 ml/minute so that when moved under the sample, the tip of the flame just touches the underside of the barrier in the center of the hole. The flame is held in contact with the sample for a total of 15 minutes after which the condition of the barrier and the foam is assessed. The sample barrier is deemed to have passed the test if it remains intact throughout the flame exposure, and if the foam itself does not ignite. If the sample fails the test by burning through in less than 15 minutes, the test is halted and the time is recorded as the Burn Through Time ("BTT").

It is noted that the heat generated immediately above the Bunsen burner is quite intense. Precise temperature measurements have not been made, but temperatures well in excess of 700° C., and may be up to 1,500° C., are expected. When the intense flame of the Bunsen burner first comes into contact with the nonwoven material being tested, the heat creates a very brief burn period. This is a period of combustion lasting for a time which may be a fraction of a second to several seconds, which is referred to as the "poof." The poof is most likely caused by a combustion of flammable components at the surface of the material which are present in most all materials, even those with heavy fire-retardant treatments. The energy release associated with the poof is very small. For treated materials, the poof is over quickly, while for untreated combustible materials, serious burning advances quickly resulting in total burn through in less than about 10 seconds.

In a variation of this test, a thermocouple is placed in the foam or between the barrier and the foam to monitor the temperature rise throughout the duration of the Fire Barrier Test.

Figure 10:
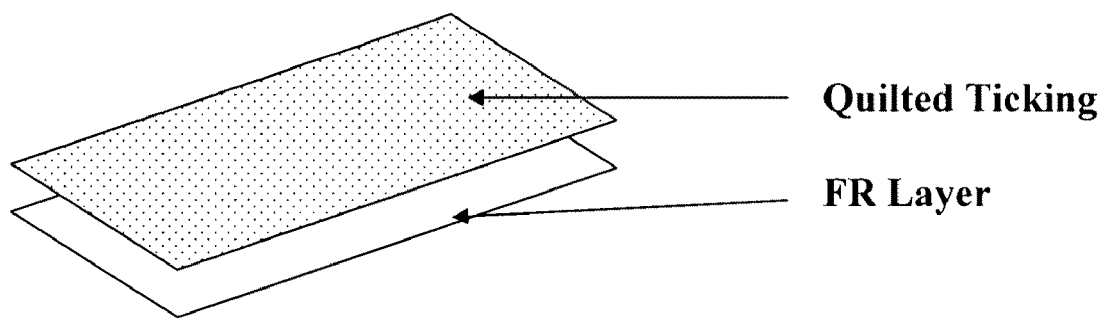
FIG. 10 is a perspective view of one embodiment of the invention shown in layered communication with the quilted ticking of a mattress.
Figure 11:
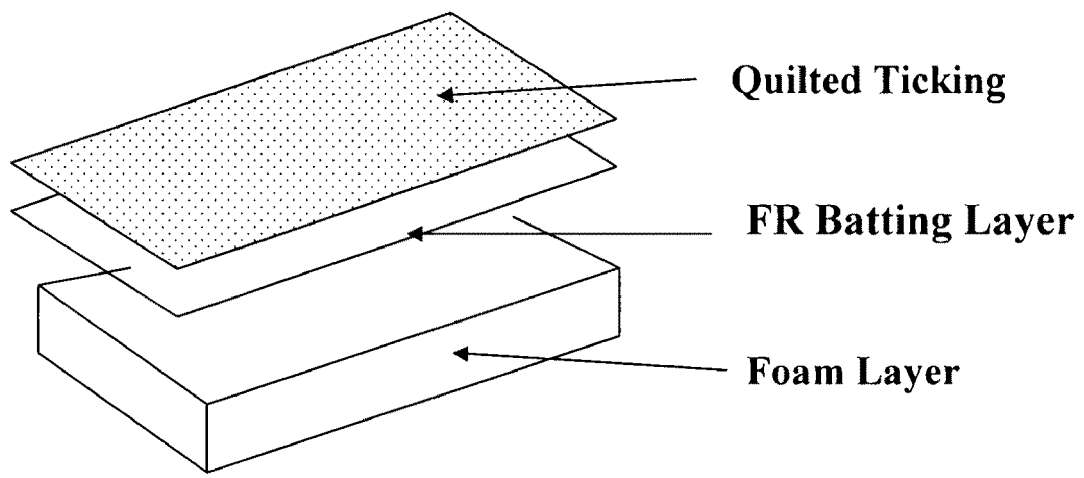
FIG. 11 is a perspective view of one embodiment of the invention utilized as a batting layer. A foam layer is shown apart from a nonwoven substrate.

As noted, various experiments were conducted in order to demonstrate the effectiveness of airlaid structures as fire-retardant materials. FIG. 10 illustrates an embodiment of a fire retardant structure in the quilted ticking of a mattress. In another embodiment of this invention as shown in FIG. 11, the basis weight and thickness (caliper) of the flame barrier are such that the barrier serves also as resilient padding and an effective thermo-insulator. The basis weight of the fire blocking airlaid non-woven fabric or structure comprising the second embodiment is in the range of from about 200 gsm to about 3000 gsm, alternatively of from about 200 gsm to about 1000 gsm.

Carrier and/or Scrim

In an alternative embodiment, the nonwoven material or core contains a woven or nonwoven carrier with a basis weight of from about 8 gsm to about 2000 gsm, or from about 10 gsm to about 2000 gsm. The carrier is integral with a surface of the nonwoven material (however, is not separately shown in FIG. 1). For illustrative purposes, the carrier would be akin to layer 11 in FIG. 1, however would be beneath the core 10.

Yet, an alternate embodiment of a nonwoven structure is presented at 70 in FIG. 7. In FIG. 7, a nonwoven structure 70 is provided which has nonwoven material or base pad 710. The nonwoven material 710 includes an interior surface 712 and an opposing outer surface (not seen). In addition, the material 710 includes a carrier or "scrim" 720. The scrim 720 has an interior surface 722. In addition, the scrim 720 has an opposing outer surface 724. The scrim 720 is shown in exploded-away relation to the nonwoven material 710 in FIG. 7. However, this is purely for illustrative purposes. In actual practice, the interior surface of the scrim 720 is integral with the interior surface 712 of the material 710.

As with core 10 of FIG. 1, nonwoven material 710 of FIG. 7 is fabricated of fibrous material held together with a binder. The same cellulosic or synthetic fiber materials used for core or pad 10 may be employed for nonwoven material or pad 710. In the alternate structure 70, the nonwoven material 710 has a basis weight of from about 10 gsm to about 2000 gsm and contains from about 30 weight percent to about 95 weight percent matrix fibers and from about 5 weight percent to about 70 weight percent of a binder where the weight percentages are based on the total weight of the pad. It may be desirable for the pad to alternatively have a basis weight of from about 10 gsm to about 1000 gsm, or more desirably, from about 10 gsm to about 500 gsm, or preferably, from about 10 gsm to about 250 gsm, or alternatively, from about 10 gsm to about 150 gsm.

The scrim may be either woven or nonwoven. In one embodiment, the scrim has a basis weight of from about 8 gsm to about 200 gsm. In another embodiment, the scrim has a basis weight of from about 8 gsm to about 100 gsm; more desirably, from about 8 gsm to about 75 gsm, or it may be preferable that the scrim has a basis weight of from about 8 gsm to about 50 gsm, or even from about 8 gsm to about 25 gsm.

A wide variety of materials including, cloth, textile, unbacked carpeting and other woven materials made of various natural fibers, synthetic fibers and mixtures thereof may further be used as carriers. Nonwoven synthetic fibers may be spunbonded, meltblown or spunlaced. An example is a spunbonded polypropylene nonwoven known as HYBOND™, a spunlaid thermalbonded soft fabric available in basis weights from 14 gsm to 20 gsm and ULTRATEX™, a spunlaid (continuous filament) thermalbonded polypropylene nonwoven in basis weights of 20, 30, 40, 50, 60, 70, 100, 120, and 150 gsm, from Texbond s.p.a., (Rovereto, Italy). Polyester spunbond nonwovens, with a uniform surface, high tear strength and high porosity, can be used. Polyester spunbond, which is a manufactured sheet of randomly orientated polyester filaments bonded by calendaring, needling, chemically or a combination of these methods in basis weights from 15 to 500 gsm is available from Johns Manville Sales GmbH (Bobingen, Germany).

Woven fibers include cloth, textile, unbacked carpeting and other woven materials made of various natural fibers, synthetic fibers and mixtures thereof may be used as carriers. A needlepunched nonwoven fabric may be used as a carrier. Alternatively, 3024 cellulosic carrier tissue, 18 gsm, from Cellu Tissue Co. (now Cellu Tissue, Neenah, Wis.), may be employed.

In general the scrim may be formed via the spunbond process, the melt-blown process, the spunlaced process, a carding process or a combination of any of these processes, such as, for example, spunbond-melt-blown-spunbond or spunbond-meltblown-meltblown-spunbond. Of interest also are other useful materials such as those where the scrim is made of a polyester, such as, for example, polyethylene terephthalate, polytrimethylene terephthalate and so forth, a polyolefin, such as, for example, polyethylene, polypropylene and so forth, polylactic acid, nylon or a combination of these materials.

The scrim may be fabricated from natural fibers such as cellulose fibers. Alternatively, synthetic fibers of various sorts which are spun-bonded, meltblown or spunlaced may be used. Still further, various other materials including, cloth, textile, unbacked carpeting and other woven materials made of various natural fibers, synthetic fibers and mixtures thereof may further be used as a scrim. Specific materials used for the scrim may include materials listed above for the carrier.

Additional Layers

Other embodiments for a nonwoven acoustic insulator structure are provided herein. FIG. 2 shows a cross-sectional view of an alternative embodiment of an acoustic insulating structure 20. The structure 20 is a nonwoven material which comprises the core 10 of FIG. 1 having matrix fibers and binder. Applied to one side of the core or airlaid material 10 is an auxiliary layer 11. The auxiliary layer 11 contains plastic material with a basis weight of from about 50 gsm to about 400 gsm present. The binder layer is preferably on an outer surface of the pad of the nonwoven structure, such as surface 2 shown in FIG. 1. However, the binder layer may also be present as a discrete inner layer within the core or base pad.

The plastic material forming the binder layer may be one or more of the aforementioned synthetic fibers. Alternatively, the plastic material may be one or more of the aforementioned latex solids. Alternatively still, the plastic material may be one of various other thermoplastic materials such as a hot melt adhesive or a thermosetting material. In one aspect, the auxiliary layer is a moldable thermoplastic or thermosetting polymeric binder material. When the plastic material is derived from latex solids it may contain a filler which was incorporated into the wet latex prior to application to the nonwoven core or pad. Suitable fillers include materials with anionic moieties such as, for example, sulfides, oxides, carbides, iodides, borides, carbonates or sulfates, in combination with one or more of vanadium, tantalum, tellurium, thorium, tin, tungsten, zinc, zirconium, aluminum, antimony, arsenic, barium, calcium, cerium, chromium, copper, europium, gallium, indium, iron, lead, magnesium, manganese, molybdenum, neodymium, nickel, niobium, osmium, palladium, platinum, rhodium, silver, sodium, or strontium. Preferred fillers include calcium carbonate, barium sulfate, lead sulfide, lead iodide, thorium boride, lead carbonate, strontium carbonate and mica.

As noted, the auxiliary layer may be made from one or more hot melt adhesives. MOR-MELT™ R-7001E Reactive Hot Melt Adhesive for Textile Lamination from Rohm and Haas Company (Philadelphia, Pa.), a moisture curing polyurethane reactive hot melt adhesive, designed for textile laminating, can be used.

FIG. 3 shows a cross-sectional view for another embodiment of an acoustic insulating structure 30. The structure again includes the core or base pad 10 of FIG. 1. Here, a layer of the plastic material or polymeric binder is applied to both sides of the pad.

The auxiliary layer 11 contains plastic material with a basis weight of from about 50 gsm to about 400 gsm. In other embodiments, the plastic material has a basis weight of from about 75 gsm to about 400 gsm; others, a basis weight of from about 100 gsm to about 400 gsm; others, a basis weight of from about 125 gsm to about 400 gsm; still others, a basis weight of from about 150 gsm to about 400 gsm. The basis weight of the auxiliary layer can depend upon the nature of the plastic material and the nature and amount of filler used.

FIG. 4 is a cross-sectional view of the base pad of FIG. 1. In this arrangement, one side of the pad 10 receives a layer of the polymeric binder 11 from FIG. 2, while the other receives a "heavy" layer 12. In order to form the heavy layer, a dense filler is dispersed in a polymeric binder. This allows the heavy layer to act as an additional acoustic barrier. The term "heavy" refers to density. Generally, a heavy layer will have a density greater than about 0.1 g/cc.

Binders having dense fine powder filler such as, for example, calcium carbonate, various kinds of clay, such as, for example, bentonite and kaolin, silica, alumina, barium sulfate, talc, titanium dioxide, zeolites, cellulose-type powders, diatomaceous earth, barium carbonate, mica, carbon, calcium oxide, magnesium oxide, aluminum hydroxide, pulp powder, wood powder, polymer particles, chitin and chitin derivatives are suitable for use in the heavy layer. Ordinarily, such a heavy layer 12 would only be applied to one side of the material as in FIG. 5. The unfilled binder 11 from FIG. 2 could be used on the other side. The particulate loading of from about 50 to about 700 gsm, based on the weight of binder solids in the latex, is operable in this embodiment. However, in an alternative embodiment, the particulate loading may range from about 0.5 gsm to about 30 gsm, based on the weight of binder solids in the latex. The dense fine powder layer contributes to the acoustic barrier properties of the fibrous layer. The second binder 12, when present, constitutes an amount of up to about 40 percent by weight, based on the total weight of the material, preferably an amount of up to about 15-20 percent.

The heavy layer 12, which is the auxiliary layer 11 containing a dense filler, has a basis weight that may range from about 50 gsm to about 700 gsm. In other embodiments, the heavy layer 12 has a basis weight of from about 75 gsm to about 700 gsm; others, a basis weight of from about 100 gsm to about 700 gsm; others, a basis weight of from about 200 gsm to about 700 gsm; still others, a basis weight of from about 300 gsm to about 700 gsm.

FIG. 5 is a cross-sectional view of the pad of FIG. 4. Here, only the heavy layer 12 is applied to one side of the airlaid pad 10.

In another embodiment involving creating a heavy layer of bonded dense powders and particulates, a powder dosing system is used on an airlaid machine (not shown). The machine lays down a solid layer of powder after the last forming head and before the first compaction roll. Latex binder in an amount sufficient to bond or fix the powder layer to the airlaid, nonwoven material is sprayed or foamed onto the powder-coated material before it passes into the drying/curing stage. This approach to bind powders to airlaid structures was previously used successfully to bind superabsorbent polymer in U.S. Pat. No. 6,403,857, the general teachings of which are incorporated herein by reference.

Alternatively, when the nonwoven material has a synthetic content equal to or greater than about 75 weight percent of the core, an auxiliary layer may be formed on a surface of the nonwoven material by partially or totally fusing the surface of the material through the application of heat or radiation.

Acoustic Features

The basic pad material has improved acoustical features. FIG. 6 is a Cartesian coordinate showing a Normal Incidence Sound Absorption Coefficient. Frequency is charted against absorption coefficient. Two different materials are compared. The first material is a sample of known shoddy. More specifically, the shoddy is a 25 mm thick by 2065 gsm commercially-produced shoddy. Data points are indicated by squares. The second material is Example 33 of a nonwoven material, which is a 1,000 gsm airlaid insulator sample that was 26 mm thick. Data points for the nonwoven structure are indicated by circles. The frequency range covered by the experiment was 100-6300 Hertz.

As a nonlimiting example, Example 33 represents a prototype of the nonwoven material having fibrous materials formed from bleached Kraft. No latex was sprayed onto any exterior surface of the pad. It can be seen that the absorption coefficient for the nonwoven material was superior to that of the shoddy at frequencies in excess of approximately 750 hertz, even though the nonwoven material is much lighter than the shoddy. (Example 33 is discussed further in connection with Table 8, below.)

A Laboratory Sound Transmission Test, or LSTT, refers to a laboratory screening test that uses an amplified source of "white noise" on one side of a pad sample, and a microphone of the decibel meter on the other side of the sample. An incident 90 dB sound level is utilized. In specific embodiments, the nonwoven material has sound transmission reduction of 5 decibel or greater in an LSTT sound transmission test. Preferably, the nonwoven material has sound transmission reduction of 7 decibel or greater, more preferably 9 decibel or greater, and still more preferably, a sound transmission reduction of 11 decibel or greater in an LSTT sound transmission test.

A Sound Absorption Mass Index (SAMI) is defined as the sound transmission loss in the LSTT (difference in decibel reading between transmitted sound without the sample in place and the reading with the sample installed) divided by the basis weight of the sample expressed in kilograms per square meter. This index normalizes the acoustic data from the LSTT for basis weight. Basis weight directly correlates to cost of manufacture of each insulation part. The nonwoven or structures of this invention desirably have a SAMI of about 3 δdB/kgsm or greater. Even more desirably, the structures will have a SAMI of about 5 δdB/kgsm or greater; still more desirably, a SAMI of about 6 δdB/kgsm or greater; more preferably, a SAMI of about 7 δdB/kgsm or greater, and more preferably, a SAMI of about 8 δdB/kgsm or greater. In other words, greater sound transmission loss is preferred.

In one embodiment of this invention, the nonwoven material has a sound absorption coefficient ($\alpha$) as determined by ASTM E1050-98 (Standard Test Method for Impedance and Absorption of Acoustical Materials Using a Tube, Two Microphones, and a Digital Frequency Analysis System) at 1000 Hz of about 0.5 or greater. Preferably, the nonwoven material has a sound absorption coefficient of about 0.55 or greater, particularly when combined with other layers to form structures 20, 30, 40, or 50. More desirably, the nonwoven material has a sound absorption coefficient of about 0.6 or greater, preferably about 0.65 or greater, more preferably about 0.7 or greater, 0.85 or greater, 0.90 or greater. Even more desirably, the nonwoven material has a sound absorption coefficient ($\alpha$) as determined by ASTM E1050-98 at 2500 Hz of about 0.95 or greater, or about 0.97 or greater, particularly when combined with other layers to form structures 20, 30, 40, or 50.

Additional Features

Also desired for most insulation applications is resistance to the growth of mold. To achieve this property either the matrix fiber and/or binder or the airlaid insulation material may be treated with any of a number of known mildewcides, such as, for example, 2-iodo-propynol-butyl carbamate, diiodomethyl-p-tolylsulfone, zinc pyrithione, N-octyl chloroisothiazalone, and octadecylaminodimethyltrimethoxysilylipropyl ammonium chloride used with chloropropyltrimethyoxysilane, to name a few. Other biocides that may be used are KATHON® based on isothiazolone chemistry and KORDEK® an aqueous-based microbicide, both from Rohm and Haas.

As noted above, in some automotive and appliance applications, the acoustic insulation desirably has a degree of water repellency. Door panels, wheel wells, and the engine compartment are typical applications requiring insulation, which will not retain significant amounts of water. Any of the known waterproofing agents like MAGNASOFT® Extra Emulsion by GE Silicones of Friendly, W.Va., for example, are operable.

Referring again to FIG. 7 and the nonwoven structure 70 having a scrim 720, the nonwoven structure 70 is designed to have a low caliper, or thickness. The caliper generally ranges from about 1 mm to about 60 mm. Preferably, the caliper is from about 1 mm to about 30 mm. In some desirable embodiments, the caliper of the structure 70 is from about 1 mm to about 15 mm, or from about 1 mm to about 7 mm, or from about 1 mm to about 3 mm.

The nonwoven structure 70 has an airflow resistance of from about 500 to about 10,000 Rayls (NS/m$^3$), or desirably in some embodiments, of from about 500 to about 5,000 Rayls (NS/m$^3$), or desirably in some embodiments, of from about 500 to about 3,000 Rayls (NS/m$^3$). By means of the selection of materials used to make the nonwoven structure 70, it is possible to produce materials with a variety of airflow resistances. For example, if greater airflow resistance is desired, a denser scrim 720 with a less open structure may be used, and the polymeric coatings may be of greater basis weight.

Process of Manufacture

In the process for the production of the nonwoven material by means of airlaying technology, matrix fibers are selected which are of a length and diameter to have excellent or beneficial thermal and acoustic insulating performance when combined with various fibrous, emulsion or latex, and/or powdered thermoplastic or thermoset binders. Naturally, in the execution of this invention, the physical characteristics of the fibers should be such as to enable them to be efficiently processed through an airlaid machine and be deposited in a primarily random fashion on the continuously moving foraminous belt or wire. In addition to the ability to be processed through a conventional airlaid machine, the selection of the fibers or fibrous mixture is also made in consideration of their resistance to thermal degradation at the elevated temperatures to which they may be subjected during the formation process, the molding operation, and during use.

In a preferred embodiment of the inventions, the nonwoven structure is an airlaid structure and the nonwoven material is an airfelt or other nonbonded web of fiber or, when bonded, an airlaid web.

In one specific embodiment of the invention, the fibrous composite will typically have a caliper of from about 1 to about 150 mm or more, and a basis weight of about 200 gsm to 5700 gsm or more, with the core or base pad typically having a basis weight of from about 200 gsm to about 3000 gsm, the carrier when present having a basis weight of from about 10 gsm to about 2000 gsm, and the auxiliary layer when present having a basis weight of from about 50 gsm to about 400 gsm with no filler, or from about 50 gsm to about 700 gsm with filler to form a heavy layer.

The initial thickness and density of each fibrous layer can be controlled in the airlaid process depending on the desired acoustic response of the panel to be produced. The thickness and weight can be varied to provide a custom acoustical insulating sheet material of the desired structure and possessing the desired properties. A significant advantage of this airlaid approach to acoustic and thermal insulation is the great versatility of the airlaid process to tailor the result to meet specific acoustic or thermal expectations.

The specific type and quantity of binding agents incorporated in each of the fibrous layers can be varied to meet the requirements of the end-use for the acoustic composite. Binder is introduced so as to effect a substantially uniform impregnation of the fibrous matrix and is employed in amounts ranging from as low as about 5 to about 60 percent by weight based on the total weight of the pad; more desirably, from about 10 percent to about 45 percent by weight based on the total weight of the core or pad. The use of higher concentrations of binder provides for greater rigidity of the resultant contoured panel. For most situations, satisfactory results are obtained when the binding agent is employed in an amount of from about 10 percent to about 60 percent by weight of the core. Ordinarily, this range of thermoplastic or thermoset binder is sufficient to render the nonwoven pad moldable. Being able to conform, under heat and pressure, to the unique shape of the body panels of the vehicle being insulated is a necessary requirement. Additionally, various latices, either of natural or synthetic rubber, as well as synthetic resin lattices, such as urethane or the like, can also be satisfactorily employed for this purpose. When latices are employed, they are conventionally spray-applied in liquid form to the fibrous web during the formation of the fibrous layer or blanket on the airlaid machine.

In one embodiment, a nonwoven substrate may be fabricated with or carried on a scrim. The scrim may be either a woven or nonwoven scrim with an interior surface and an outer surface. In one aspect, the scrim has a basis weight of from about 8 gsm to about 200 gsm. As a result of the manufacturing process, the scrim may be integral with a surface of the nonwoven material. In one aspect, the scrim is used as a carrier sheet in an airlaid process, with the interior surface of the scrim in direct contact with the interior surface of the nonwoven material. In a preferred method of production using airlaying techniques, the nonwoven material is formed directly on the interior surface of the scrim. However, the process may combine the scrim with a pre-formed airlaid or other nonwoven material in a converting process.

In addition to the base pad 710 (having matrix fibers and binder) and the scrim 720, the nonwoven structure 70 may further comprise a polymeric coating layer containing polymeric material. The polymeric material has a basis weight of from about 1 gsm to about 40 gsm present on the outer surface 724 of the scrim 720. Alternatively, the polymeric material may be applied to the outer surface (not shown, but opposing the interior surface 712) of the pad 710, or on both. The polymeric coating can be deposited by spraying, foaming, by a roller, or any other convenient method known in the art. Naturally, although the polymeric coating is deposited on an outer surface, there will be some degree of penetration into the scrim 720 or nonwoven pad material 710. The polymeric material may be one or more of the aforementioned synthetic fibers, latex solids, or various other thermoplastic materials, such as hot melt adhesives, or a thermosetting material other than latex solids. When the polymeric material is derived from latex solids it may contain a filler which was incorporated into the wet latex prior to application to the scrim 720 or pad 710. Suitable fillers include those materials listed above for the auxiliary layer 11 of structure 20 from FIG. 2.

With reference to FIG. 7, the polymeric coating on the outer surface of the scrim 720 and the optional second polymeric coating on the outer surface of the pad 710 both have a basis weight of from about 1 gsm to about 40 gsm. They can be the same or different, and, of course, it may be that only a polymeric coating on the outer surface of the scrim 720 is provided. In some embodiments, it may be desirable for a polymeric coating to have a basis weight of from about 1 gsm to about 25 gsm, or from about 1 gsm to about 10 gsm, or even from about 1 gsm to about 5 gsm. In other embodiments, it may be desirable for a polymeric coating to have a basis weight of from about 5 gsm to about 40 gsm, or from about 10 gsm to about 40 gsm, or even from about 25 gsm to about 40 gsm. Other materials may be deposited on an outer surface of the nonwoven structure 70 or contained in a polymeric coating, such as, for example, a solution of sodium tetraborate decahydrate from U.S. Borax Inc. (Valencia, Calif.), which is a fire-retardant.

A heavy layer such as layer 12 shown in FIG. 5 may also be applied to a surface of the fibrous pad 710. The heavy layer may be applied through a powder dosing system as described below. The powder dosing system delivers a heavy layer of bonded dense powders and particulates, and is used on an airlaid machine. The airlaid machine lays down a solid layer of powder after the last forming head and before the first compaction roll. Latex binder in an amount sufficient to bond or fix the powder layer to the airlaid is sprayed or foamed onto the powder-coated airlaid before it passes into the drying/curing stage. As noted above, this approach to binding powders to airlaid structures was previously used successfully to bind superabsorbent polymer in U.S. Pat. No. 6,403,857. In another embodiment the polymeric coating is made from one or more hot melt adhesives. MOR-MELT™ R-7001E Reactive Hot Melt Adhesive for Textile Lamination from Rohm and Haas Company (Philadelphia, Pa.), a moisture curing polyurethane reactive hot melt adhesive, designed for textile laminating, can be used.

In accordance with alternative embodiments of the method of making an acoustic insulative structure, the binding agent for the core of the airlaid structure may comprise any one of a variety of thermoplastic heat softening resins which are characterized as being compatible with the fibrous structure and have a heat softening range generally ranging from about 100° C. up to a temperature below that at which thermal degradation of the fibers occurs. Preferably, such thermoplastic resins are of a heat softening range within about 120° C. to about 170° C. Of the variety of thermoplastic resins suitable for use in accordance with the practice of the present invention, polyethylene, polystyrene, polypropylene, acrylic, polyvinyl acetate, polyvinyl chloride resins, or the like, can be satisfactorily used, of which polyethylene itself constitutes a preferred thermoplastic binder. A polyethylene bonding agent in chip form is commercially available from the Dow Chemical Company of Midland, Mich. The chips may be ground to a fine powder for direct addition to the airlaid product.

In a preferred process suitable for commercial production, the nonwoven material (such as structures 10, 20, 30, 40, 50 or 70) used as the insulating material is prepared as a continuous airlaid web. The airlaid web is typically prepared by disintegrating or defiberizing a cellulose pulp sheet or sheets, typically by hammermill, to provide individualized fibers. Rather than a pulp sheet of virgin fiber, the hammermills or other disintegrators can be fed with recycled airlaid edge trimmings and off-specification transitional material produced during grade changes and other airlaid production waste. Being able to thereby recycle production waste contributes to improved economics for the overall process. The individualized fibers from whichever source, virgin or recycle, are then air conveyed to forming heads on the airlaid web-forming machine. A number of manufacturers make airlaid web forming machines suitable for use in this invention, including Dan-Web Forming of Aarhus, Denmark, M&J Fibretech A/S of Horsens, Denmark, Rando Machine Corporation of Macedon, N.Y. (described in U.S. Pat. No. 3,972,092), Margasa Textile Machinery of Cerdanyola del Vallès, Spain, and DOA International of Wels, Austria. While these various forming machines differ in how the fiber is opened and air-conveyed to the forming wire, they all are capable of producing webs useful for forming airlaid, fibrous structures.

The Dan-Web forming heads include rotating or agitated perforated drums, which serve to maintain fiber separation until the fibers are pulled by vacuum onto a foraminous forming conveyor or forming wire. In the M&J machine, the forming head is basically a rotary agitator above a screen. The rotary agitator may comprise a series or cluster of rotating propellers or fan blades. Other fibers, such as a synthetic thermoplastic fiber, are opened, weighed, and mixed in a fiber dosing system such as a textile feeder supplied by Laroche S.A. of Cours-La Ville, France. From the textile feeder, the fibers are air conveyed to the forming heads of the airlaid machine where they are further mixed with the comminuted cellulose pulp fibers from the hammer mills and deposited on the continuously moving forming wire. Where defined layers are desired, separate forming heads are used for each type of fiber.

The airlaid web is transferred from the forming wire to a calender or other densification stage to densify the web, if necessary, to increase its strength and control web thickness. The fibers of the web are then bonded by passage through an oven set to a temperature high enough to fuse the included thermoplastic or other binder materials. Secondary binding from the drying or curing of a latex spray or foam application may occur in the same oven. The oven may preferably be a conventional through-air oven or be operated as a convection oven, but may achieve the necessary heating by infrared or even microwave irradiation. The insulating material may be treated with flame retardants before or after heat curing. In vehicle insulation applications, a flame retardant is typically added to the nonwoven structure in order to comply with the applicable automotive regulations. The finished nonwoven insulating material or structure may be treated with flame retardants and other additives, and rolled, slit, or slabbed and packaged for shipping. However, in vehicle applications the structure may be molded to contour to various vehicle panel surfaces as will be described further below.

As noted above, the nonwoven materials of the present invention may contain fire-retardant characteristics. The fire-retardant material may be incorporated into the nonwoven material by spraying or dousing the fire-retardant onto a comminution sheet before the sheet goes into the hammermill. Alternatively, the retardant may be applied to a surface of the already-formed nonwoven substrate. In either instance, the nonwoven substrate carries a fire-retardant or otherwise possesses fire-retardant properties.

The nonwoven material of the present invention may be treated with a variety of substances by treating through spraying or dousing a substance onto the communition sheet before the sheet goes into the hammermill. As noted above, the substance may be a fire-retardant treatment. However, the nonwoven material may also be treated with other substance prior to going into the hammermill, substances including, but not limited to waterproofing agents, pigments, adhesives, biocides, antileachants, polymers, antimicrobicides, combinations thereof, or other substances desirable to impart on the sheet. Such a treatment prior to entering the hammermill imparts a thorough and consistent dispersion of the additive material, as measured after the hammermill.

While not wanting to be bound by any particular theory, it has been observed that upon prolonged exposure to a continuous flame, the above airlaid cellulosic-based non-woven material or structure appears to be converted into a carbon fiber web structure which then repels the flame without appreciable shrinking or becoming consumed. Accordingly, the combination of natural and synthetic components, through the airlaid operation, and fire-retardant treatment, provides for an effective and commercially viable fire-blocking layer which can be installed as a fire blocking fabric liner under upholstery fabric and mattress ticking, thereby helping to protect the highly flammable interior components of such products from igniting and participating in the burning process. It is further believed that said fire blocking layer, when of sufficient thickness, additionally functions as an effective thermo-insulator and prevents the temperature of the foam and other components being protected from reaching decomposition or melting temperatures.

Various materials, structures and manufacturing processes useful in the practice of this invention are disclosed in U.S. Pat. Nos. 6,241,713; 6,353,148; 6,353,148; 6,171,441; 6,159,335; 5,695,486; 6,344,109; 5,068,079; 5,269,049; 5,693,162; 5,922,163; 6,007,653; 6,355,079; 6,403,857; 6,479,415; 6,562,742; 6,562,743; 6,559,081; 6,495,734; 6,420,626; in U.S. Patent applications with serial numbers and filing dates, Ser. No. 09/719,338 filed Jan. 17, 2001; Ser. No. 09/774,248 filed Jan. 30, 2001; and Ser. No. 09/854,179 filed May 11, 2001, and in U.S. Patent Application Publications or PCT Application Publications US 2002/0074097 A1, US 2002/0066517 A1, US 2002/0090511 A1, US 2003/0208175 A1, US 2004/0116882 A1, US 2004/0020114 A1, US 2004/0121135 A1, US 2005/0004541 A1, and WO 2005/013873 A1, and PCT/US04/43030 claiming the benefit of U.S. provisional patent application Ser. No. 60/569,980, filed May 10, 2004 and U.S. provisional patent application Ser. No. 60/531,706, filed Dec. 19, 2003, and U.S. provisional patent application Ser. No. 60/667,873, filed Apr. 1, 2005, all of which are hereby incorporated by reference in their entirety.

Non-Limiting Automotive Embodiment

Figure 8:
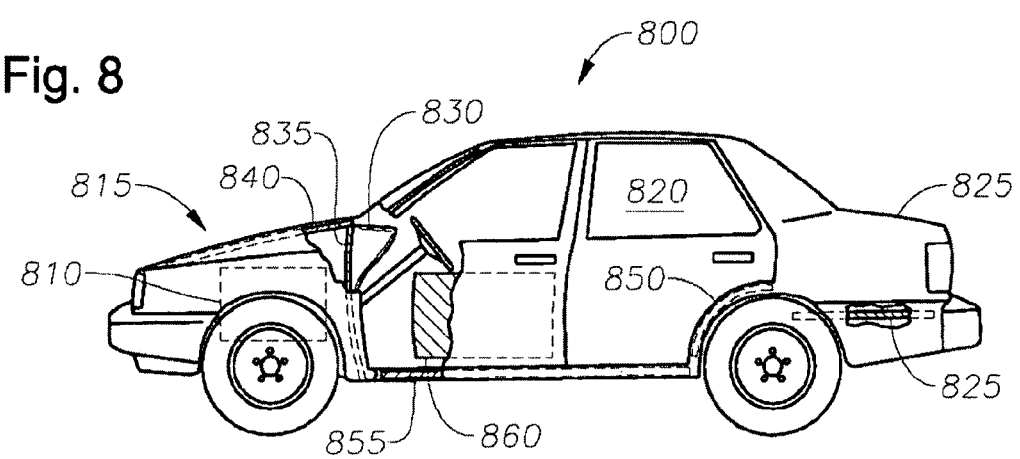
FIG. 8 is a general schematic side view of a vehicle illustrating various exemplary locations for the nonwoven materials of the present invention.

FIG. 8 illustrates a conventional vehicle 800 having an engine (shown schematically at 810) that is disposed within an engine compartment 815 that is typically in a forwardmost section of the vehicle 100. The vehicle 800 has a passenger compartment 820 and a trunk 825 at a rearwardmost section of the vehicle 800. As is typically known, the passenger compartment 820 includes a dashboard, generally indicated at 830, which contains a number of electronic components including electronic control units and display units, as well as electronic entertainment units. The dashboard 830 is the primary component that separates the engine compartment 815 from the passenger compartment 820. As previously discussed, it is desirable to insulate the passenger compartment 820 from undesirable noise which may be transmitted through the frame and the body of the vehicle 800.

The nonwoven structures 10, 20, 30, 40, 50, 60, 70 of the present invention can be placed in any number of locations throughout the vehicle 800 where it is desirable to insulate the passenger compartment 820 from these external or annoying sounds such as engine noise or road noise. Some locations where acoustic and thermal insulation is typically placed includes but are limited to the dashboard 830, where the nonwoven material can be molded into the shape of a dashboard liner; an engine side firewall 835, where the nonwoven material can be molded into the shape of a panel or the like to conform to the shape of the firewall 835; an engine side hood area 840, where the nonwoven material can be molded into a shape of a hood pad or panel; an interior wheel well area 850, where the nonwoven material can be molded into a shape of a panel or the like; a trunk area 825, where the nonwoven material can be molded into a shape of trunk compartment trim insulation; a floor 855 of the passenger compartment 830, where the nonwoven structures 10, 20, 30, 40, 50, 70 can be molded into flooring underlayment; and a vehicle door 860 location, where any of nonwoven structures 10, 20, 30, 40, 50, 70 can be molded into a door panel. It will be appreciated that the above list is merely illustrative and any of nonwoven structures 10, 20, 30, 40, 50, 70 can be placed in any number of other vehicle locations where acoustic and thermal insulation are desired, including a package tray location or even a roof location of the vehicle 800.

One of the advantages of the nonwoven structures 10, 20, 30, 40, 50, 70 is that they may be composed of material which permits the material to be molded into desired shapes and therefore, it is possible to manufacture specially contoured vehicle insulation parts that are already cut and shaped to fit a specific location in the vehicle 800. In other words, when the nonwoven acoustic structure or material is intended to act as a dashboard liner, the material will be molded into the shape of the particular dashboard 830 and therefore, can include various openings, etc. to accommodate other vehicle parts, such as a steering wheel, etc. The ability to pre-mold the nonwoven article represents an improvement over the prior art shoddy materials since the necessary openings and contoured portions of the article can be pre-molded therein, thus eliminating the need for time consuming cutting. Cutting can also lead to unkempt frayed edges about the openings. The nonwoven materials or acoustic structures 10, 20, 30, 40, 50, 70 can be pre-molded for placement in any of the other vehicle locations where insulation is desired. Thus, it will be appreciated that the ability to pre-mold the nonwoven materials permits the insulation articles to be mass produced according to specifications for a particular vehicle. In vehicle insulation applications, a flame retardant is typically added to the nonwoven material in order to comply with the applicable automotive regulations.

It will also be appreciated that the nonwoven material or acoustic structure 10, 20, 30, 40, 50, 70 that is either molded into a particular shape or cut into a particular shape can be coated on at least one face with a thin layer of adhesive or bonding material so as to permit the nonwoven material article to be affixed to another object, such as a metal vehicle part. For example, when the nonwoven material or structure 10, 20, 30, 40, 50, 70 is molded or cut into the shape of a liner for a trunk 825, the material is placed against the metal trunk floor, and it is desirable to locate the nonwoven material or structure 10, 20, 30, 40, 50, 70 so that it does not unnecessarily move. A release layer can initially be applied over the adhesive/bond layer and then be subsequently removed from the adhesive/bond layer at the point of use. For example, the release layer can be a paper release layer, such as waxed paper or the like.

In addition, the nonwoven material or structure 10, 20, 30, 40, 50, 70, in the form of a molded article, can be shaped into an automotive insulating insert or the like that has necessary openings formed therein and also is bonded to a substrate during the manufacturing process (e.g., molding process). For example, the molded nonwoven article can be bonded to a structural support, such as a plastic support, a heavy paper support, or a rug or carpeting. When the nonwoven material or structure 10, 20, 30, 40, 50, 70 is to be used as a trunk liner, it is typically preferred to have some type of rug or carpeting bonded to the acoustic structure to make the trunk area 825 visually more attractive. The rug or carpeting can be bonded to the formed acoustic insulating structure or nonwoven material 10, 20, 30, 40, 50, 70 during the manufacturing (molding) process using conventional techniques, including the use of an adhesive layer therebetween.

In accordance with one aspect of the present invention, the nonwoven material is molded with an application of heat and pressure into a shape which is retained. The panel may have an area that is 50 meters square, or less. Alternatively, the panel may have an area that is 25 meters square, or less; more desirably still, the panel may have an area that is 10 meters square, or less.

In another arrangement, a panel of the nonwoven material having an area of 10 meters square or less, is formed from a continuous process and cut into a long roll suitable for shipping by truck or by rail. Instead of a separate panel, the material can be slit to a desired width and shipped rolled on a core. The roll may contain up to 1000 square meters or more depending on the width and thickness.

Non-Limiting Insulation Embodiment

Figure 9:
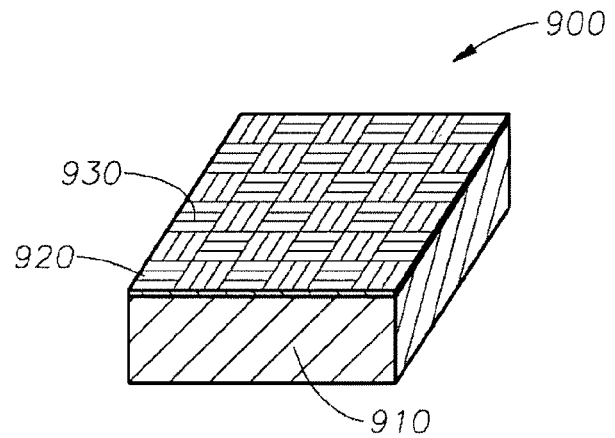
FIG. 9 is a perspective view of a nonwoven structure, formed as a ceiling tile. The tile includes a decorative outer layer.

According to another aspect of the present invention, the nonwoven materials can be pre-molded into articles that are intended to provide acoustic and thermal insulation in a building or the like. As shown in FIG. 9 and according to one exemplary embodiment, the nonwoven material is pre-molded into a ceiling tile 900 that has the desired acoustic and thermal insulation properties. The illustrated ceiling tile 900 is formed of a core 910 of the nonwoven material of the present invention in accordance with pad 10 of FIG. 1. The ceiling tile 900 further has an outer layer 920. It will be understood that the outer layer 920 is not a required element since the ceiling tile 900 can be formed of just the nonwoven materials of the present invention.

The outer layer 920 can be a decorative outer layer that is formed of a material that is different from the nonwoven material that makes up the core or base pad 910. For example, the outer layer 920 can be formed of a synthetic material that provides increased rigidity and stiffness in the outer layer 920. One suitable material for the outer layer 920 is a polymeric material, such as a latex that can be applied to one face of the core 910 to form the outer layer 920. For example, latex can be spray coated onto the one face of the core 910.

The outer layer 920 may include indicia 930, such as a decorative pattern or the like. The decorative pattern can be merely a roughened surface or the decorative pattern can be in the form of a waffle pattern or other grid. The decorative pattern can be formed by any number of different techniques, including embossing or even a molding process where the outer layer 920 is formed of a moldable material that is bonded to the one face of the core 910 by a molding process. The decorative pattern can be formed using a roller or by means of a laminate structure in that the outer layer 920 can be laminated onto the core 910.

Any number of different agents can be added to the tile 900 as previously mentioned, including but not limited to a fire-retardant and an agent that inhibits surface growth of mold and mildew, such as BIOBLOCK® paint, or the other aforementioned agents.

As with the other applications for the nonwoven materials of the present invention or as mentioned above, the nonwoven ceiling tile 900 offers superior acoustic and thermal insulation properties compared to conventional insulation that is typically used in buildings and constructed structures. It will be appreciated that the nonwoven materials of the present invention are not limited to being used as ceiling tiles but instead can be used in a number of other building insulation locations, including in side walls and partitions.

Additional Embodiments

The nonwoven material is also particularly suitable as part of a mattress, futon or other bedding product, furniture cushion or covering. Thus, the present invention includes a mattress or other bedding product incorporating the fire-retardant nonwoven material.

The present invention will be better understood by reference to the following proposed compound formulation examples, which is provided as exemplary of the invention, and not by way of limitation.

EXAMPLES

In connection with the following Examples and experiments, certain materials were used. While others materials are disclosed in the specification, the following list includes a summary of certain materials:

FOLEY FLUFFS® bleached Southern softwood Kraft from Buckeye Technologies Inc. of Memphis, Tenn. FOLEY FLUFFS® brand fibers are fabricated from cellulosic materials, primarily wood pulp from slash pine.

FFLE+ bleached and debonder-treated Southern softwood Kraft from Buckeye Technologies Inc. of Memphis, Tenn. FFLE+ represents another source of cellulosic fibers.

Trevira Type 255 Lot 1661 polyethylene sheath polyethylene therephthalate core, also referred to as PET or polyester, 2 dpf (denier per fiber) by 6 mm cut length synthetic bicomponent fiber from Trevira of Bobingen, Germany. This is a binder fiber having a core and sheath.

Cellutissue 3024 is an 18 gsm wet-laid tissue from Cellu Tissue Neenah of Neenah, Wis. may be used as a carrier sheet during airlaid formation.

VISIL® silica/silicate filled rayon flame retardant fiber by Sateri International Group, Oy, Finland.

FR Corona® is a silica-filled rayon flame retardant fiber from Daiwabo Rayon Co. Ltd., Japan.

GLO-TARD FFR2 an ammonium polyphosphate fire-retardant from GLO-TEX International, Inc. of Spartanburg, S.C. This product comes as a liquid spray that may be applied to either the formed substrate, or the cellulosic fibers before comminution.

Fire Retard 3496 a phosphate ester supplied by Manufacturers Chemicals, L.P. of Cleveland, Tenn. This product also comes as a liquid spray that may be applied to either the formed substrate, or the cellulosic fibers before comminution.

Flovan CGN, a multi-purpose phosphate-based flame retardant supplied by Huntsman headquartered in Salt Lake City, Utah.

Amino-siloxane waterproofing agent containing 15 percent solids latex of Tallopol SK81 supplied by Bozzeto, Inc. of Greensboro, N.C. This product comes as a liquid spray that may be applied to the formed substrate both for anti-dusting and to protect the fire-retardant from water exposure.

Amino-siloxane waterproofing agent Dow Corning 2-8630 Polymer (>60 percent aminofunctional siloxane) from Dow Corning Corporation of Midland, Mich. This product comes as a liquid spray that may be applied to the formed substrate both for anti-dusting and to protect the fire-retardant from water exposure.

Amino-siloxane waterproofing agent, GE Magnasoft Extra Emulsion from GE Advanced Materials Silicones in Wilton, Conn. This product is highly stable under alkaline conditions and is based on GE's patented linear block-copolymer technology platform. It imparts waterproofing to cellulose-based fabrics, such as wood, cotton, lyocell fiber-based fabric, and viscose rayon.

Basofil® a fire-retardant Melamine Fiber Merge 80 or Merge LH50 from Basofil Fibers, LLC. of Charlotte, N.C. This is another fire-retardant product. It is known in the art to use Basofil® as a batting material. In the Examples, the Basofil® fiber may be applied to the substrate or mixed with the fibers during fabrication of the substrate.

Borax, sodium tetraborate decahydrate available from U.S. Borax Inc. of Valencia, Calif. This is another fire-retardant product. Borax typically comes in powder form, but is dissolved in water and can be sprayed onto the substrate.

AFT fire-retardant cellulose insulation from Advanced Fiber Technologies of Bucyrus, Ohio. This is a fire-retardant material that can be fiberized from newsprint.

AIRFLEX® 192 ethylene vinyl acetate binder dispersion from Air Products Polymers of Allentown, Pa. This is a liquefied surface treatment used to encapsulate and protect the substrate from water intrusion.

Witconol TD-100 ethoxylated alcohol suspending agent by Akzo Nobel NV of Chicago, Ill.

AirFlex® 4530 ethylene vinyl chloride binder dispersion from Air Products Polymers of Allentown, Pa.

ROVENE® 5066-18 carboxylated styrene butadiene latex by Mallard Creek Polymers, Inc. of Charlotte, N.C.

Cartaren Black 95642 pa 30 from Clariant Corporation, Charlotte, N.C.

Basic Airlaid Handsheet Former Procedure.

The working examples described herein employed a laboratory airlaid handsheet apparatus which lays down a 35.5 cm×35.5 cm (14 inch×14 inch) pad. This size pad is termed a handsheet and is suitable for range-finding experiments before going to an actual airlaid machine to produce a continuous web. To make a handsheet on the handsheet former, weighed amounts of various fibers are added to a mixing chamber where jets of air fluidize and mix the fibers. The fluidized cloud of fibers is pulled down onto the forming wire by a vacuum source. A tissue or other porous carrier is used to minimize the loss of fiber to the vacuum system. While some applications call for a spunbond carrier to be attached to one face of the material, in other instances the carrier may be removed after formation of the handsheet. In the working examples that follow, the tissue carrier is removed.

Prior to feeding to the handsheet apparatus, chosen fibers are mechanically defibrated, or "comminuted," into a low density, individualized, fibrous form known as "fluff." Mechanical defibration may be performed by a variety of methods which are known in the art. Typically a hammer mill, such as, for example, a Kamas Mill, is employed. A Kamas Mill from Kamas Industri AB, Sweden with a 51 mm (2 inch) slot is particularly useful for laboratory scale production of fluff and is used in this procedure. The binder fibers and other synthetic fibers come loosely baled and do not require a separate opening step when used in the laboratory handset former.

The laboratory scale airlaid handsheet apparatus can be operated step-wise to simulate the commercial multiple-forming-head airlaid process to airlay the fiber mixtures into the 35.56 cm (14 inch) square handsheets. The handsheet former is located in a temperature- and relative humidity-controlled room maintained at 23° C.±1.5° C. (73.4° F.±2.7° F.) and 50±5 percent relative humidity. The fibrous raw materials are equilibrated in the controlled humidity room for at least 30 minutes prior to forming the handsheet. Controlling the humidity and temperature are necessary to avoid static electricity problems that can be generated in connection with the air-handling of finely divided materials.

For high basis weight materials, the handsheet apparatus is used to build a handsheet in up to 24 steps to produce as many layers. Forming the handsheet in this many steps helps to ensure that the batch-type forming head of the laboratory airlaid handsheet apparatus better simulates the degree of homogeneity which is obtained in a multiple forming head, continuous airlaid manufacturing machine. After each portion of the total weight of fibers is laid down, the forming wire is turned 90 degrees in the apparatus. This procedure helps to minimize air turbulence artifacts and delivers a more uniform handsheet. In this step-wise fashion the entire airlaid handsheet is formed.

After the airlaid step, the handsheet is pressed to a target thickness in a laboratory press heated to 150° C. The handsheet is then held under compression from 5 to 30 minutes so to fully activate the thermoplastic sheath of the bicomponent binder fiber.

Discussion of the Fire Barrier Test

Figure 12:
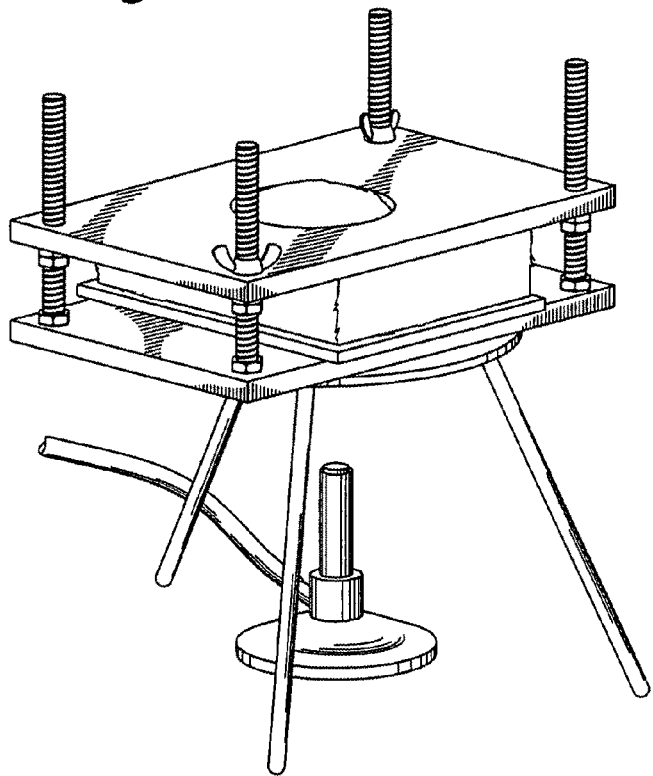
FIG. 12 is a photograph showing a front view of a Fire Barrier Test apparatus employed in the Examples of the present specification.

FIG. 12 is a photograph showing a front view of a Fire Barrier Test apparatus before ignition of the Bunsen burner. A piece of urethane foam mattress 10 cm×10 cm×5.08 cm thick (4×4×2 inches) is laid on top of a barrier sample. The foam and barrier sample are shown positioned between the opposing plates of the apparatus. The foam and sample are compressed to a thickness of approximately one inch. The entire assemblage is mounted level over a Bunsen burner.

Figure 13:
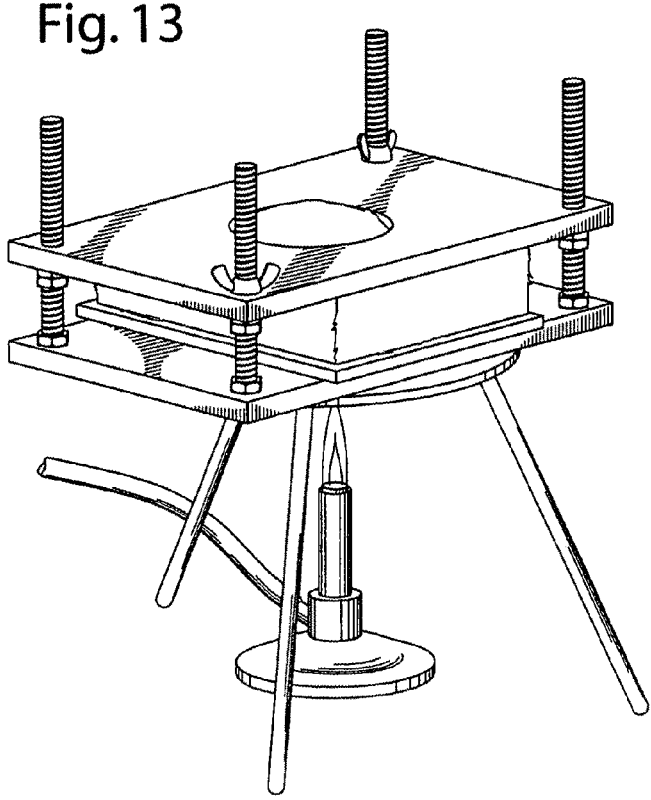
FIG. 13 is a photograph showing a front view of the Fire Barrier Test apparatus of FIG. 3 with the Bunsen burner positioned as employed in the Examples of the present specification.

Turning now to FIG. 13, this photograph shows a front view the Fire Barrier Test apparatus of FIG. 12 with an ignited Bunsen burner positioned below a compressed sample. The Bunsen burner is positioned under the concentric opening so that when ignited, the tip of the flame just touches a center portion of an exposed underside portion of the barrier. The burner is fed with a natural gas flow rate of approximately 415 ml/minute. A mirror may be held or mounted at an angle so that the burning may be easily viewed.

Figure 14:
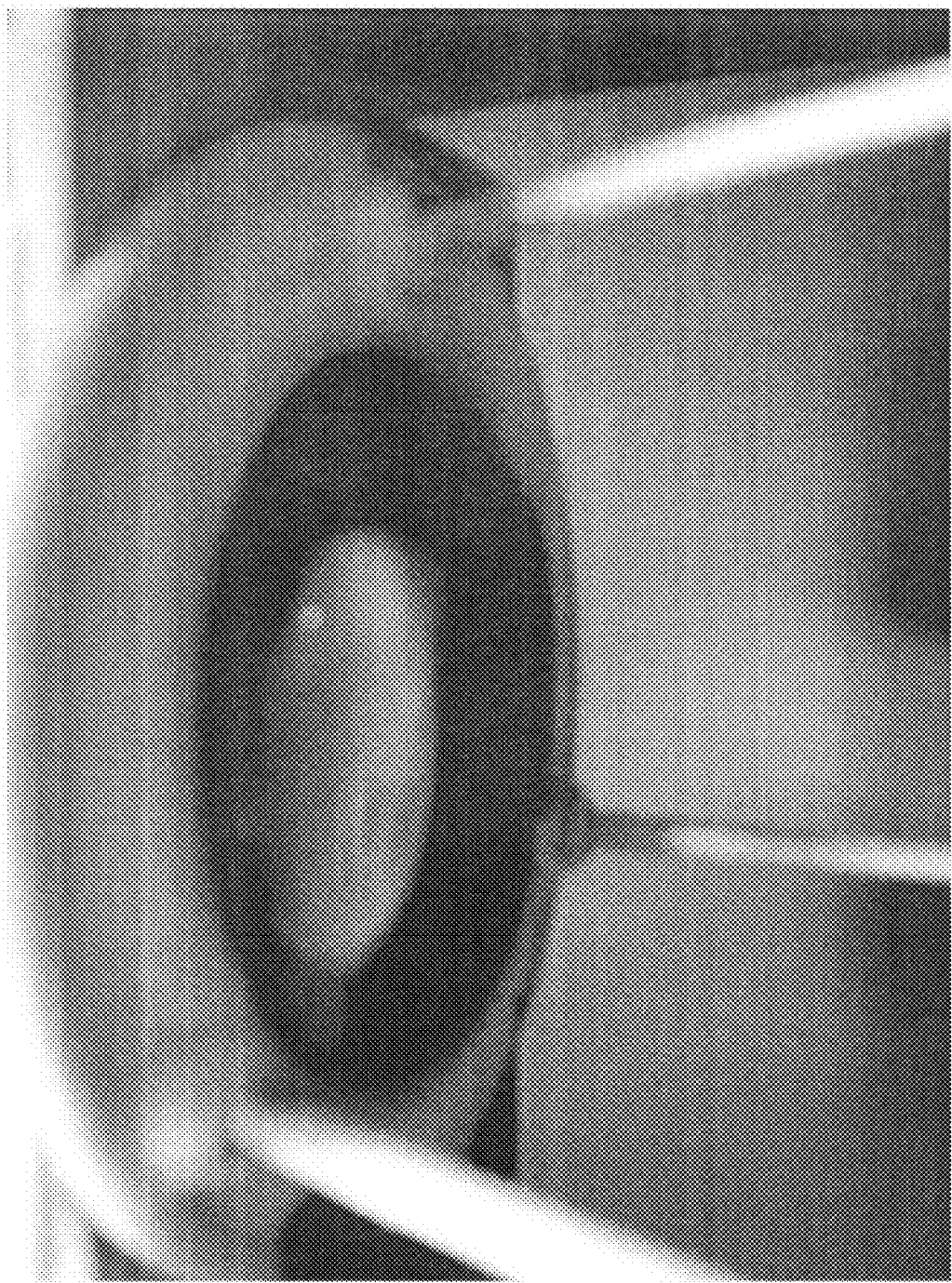
FIG. 14 is a photograph showing an underside view of a sample mounted on the Fire Barrier Test apparatus during the initial burn or "poof" as described in the Examples of the present specification.

FIG. 14 is a photograph illustrating an underside view of a sample mounted on the Fire Barrier Test apparatus during the initial burn or "poof" stage of testing. When the intense flame of the Bunsen burner first comes into contact with the nonwoven material being tested, the heat creates a very brief burn period or poof. As shown, the poof results in an intense flash or red flame or glow.

Figure 15:
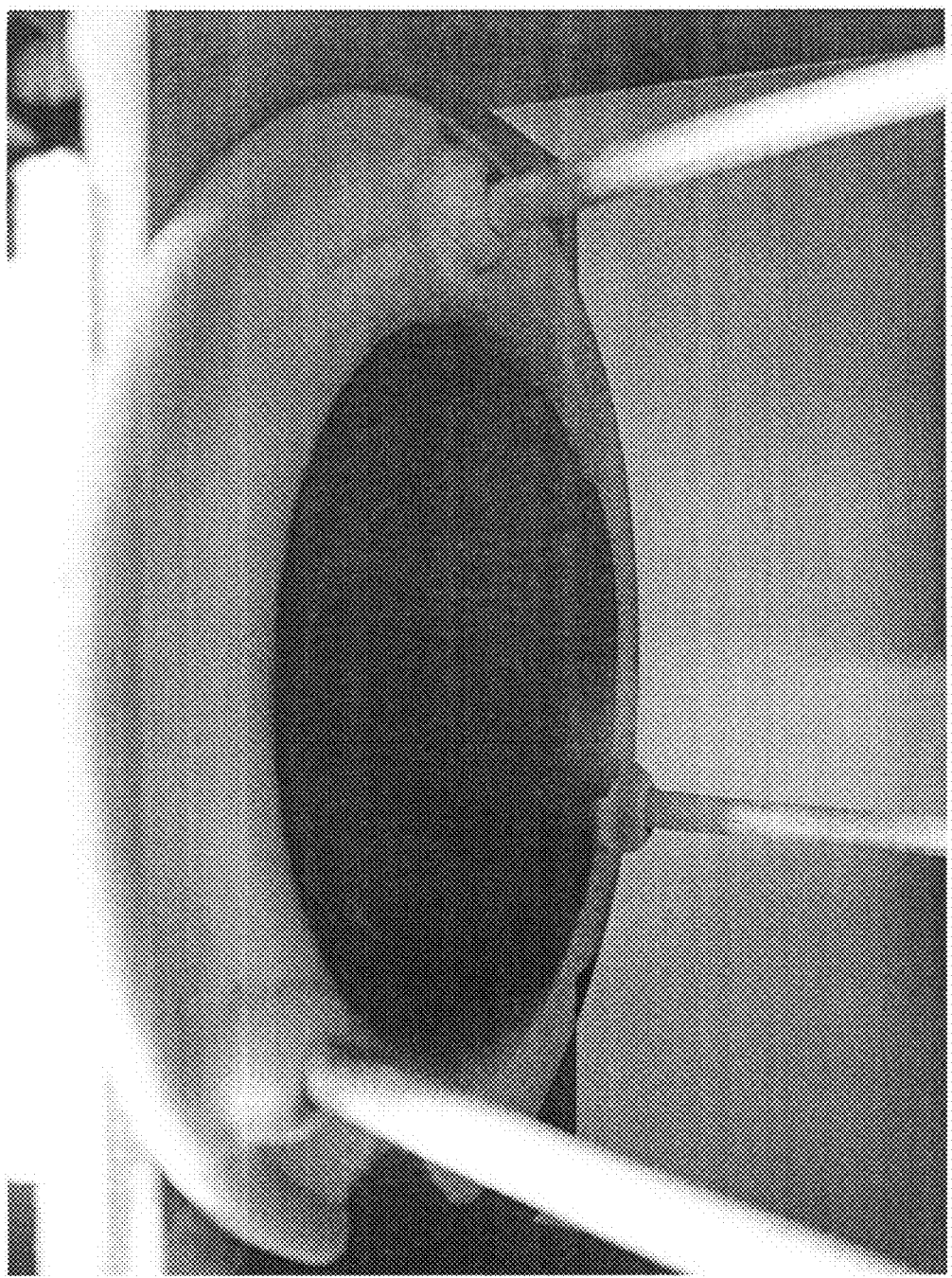
FIG. 15 is a photograph showing an underside view of a sample mounted on the Fire Barrier Test apparatus approximately 4 seconds after the initial burn as described in the Examples of the present specification.

FIG. 15 is a photograph showing an underside view of a sample mounted on the Fire Barrier Test apparatus approximately 4 seconds after the initial burn or poof subsided. As shown, the sample appears charred without any sustained reaction in the form of a flash or glow. For treated materials, the poof is over quickly, while for untreated combustible materials, serious burning advances quickly resulting in total burn through in about 10 seconds or less.

Figure 16:
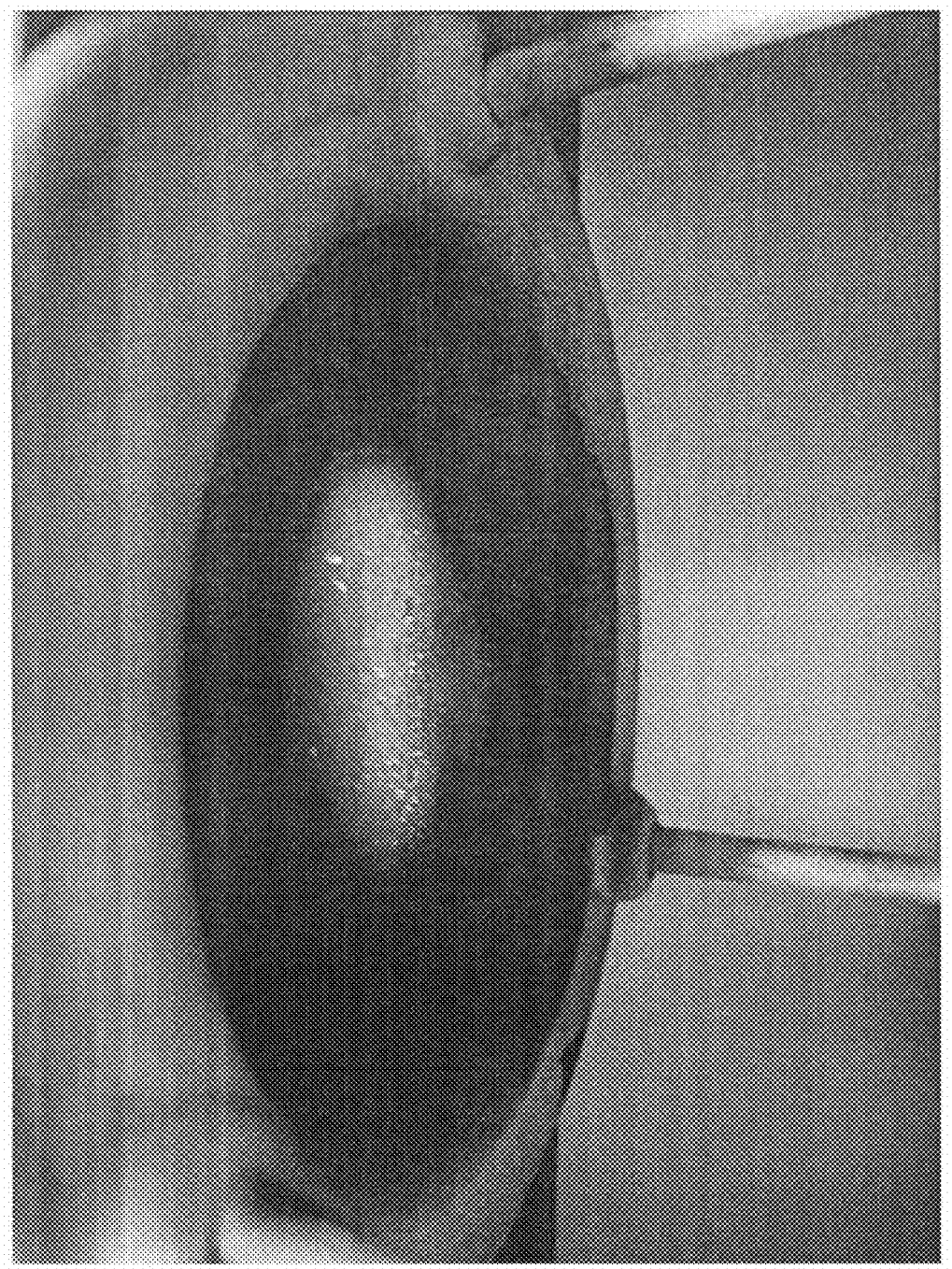
FIG. 16 is a photograph showing an underside view of a sample mounted on the Fire Barrier Test apparatus approximately 30-60 seconds into testing as described in the Examples of the present specification.

Referring now to FIG. 16, this photograph shows an underside view of a sample mounted on the Fire Barrier Test apparatus approximately 30-60 seconds into testing. The test sample displays a light "glow" exerting tremendous heat. The glow remains until burn through occurs. The glow is attributed to carbonized, treated fiber or carbonized polypropylene or a combination thereof.

Figure 17:
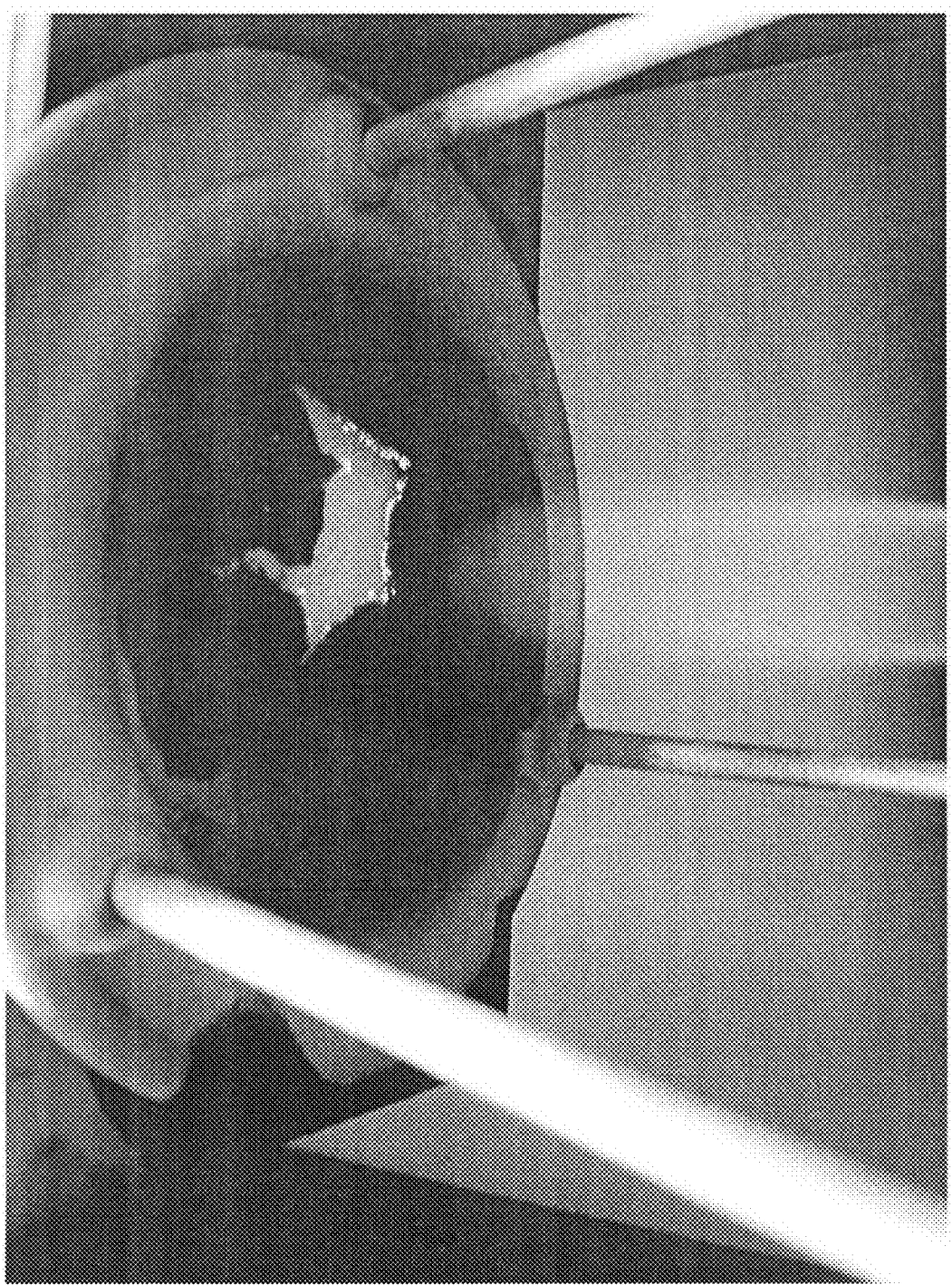
FIG. 17 is a photograph showing an underside view of a sample mounted on the Fire Barrier Test apparatus upon burn through or failure as described in the Examples of the present specification.

FIG. 17 is a photograph showing an underside view of a sample mounted on the Fire Barrier Test apparatus that has been burned through or failed. During testing, the flame is held in contact with the sample for a total of 15 minutes after which the condition of the barrier and the foam is assessed. The photograph shows the sample at the point where the heat from the tip of the Bunsen burner flame has caused a complete break through in the sample barrier layer exposing the urethane foam to the flame.

Figure 18:
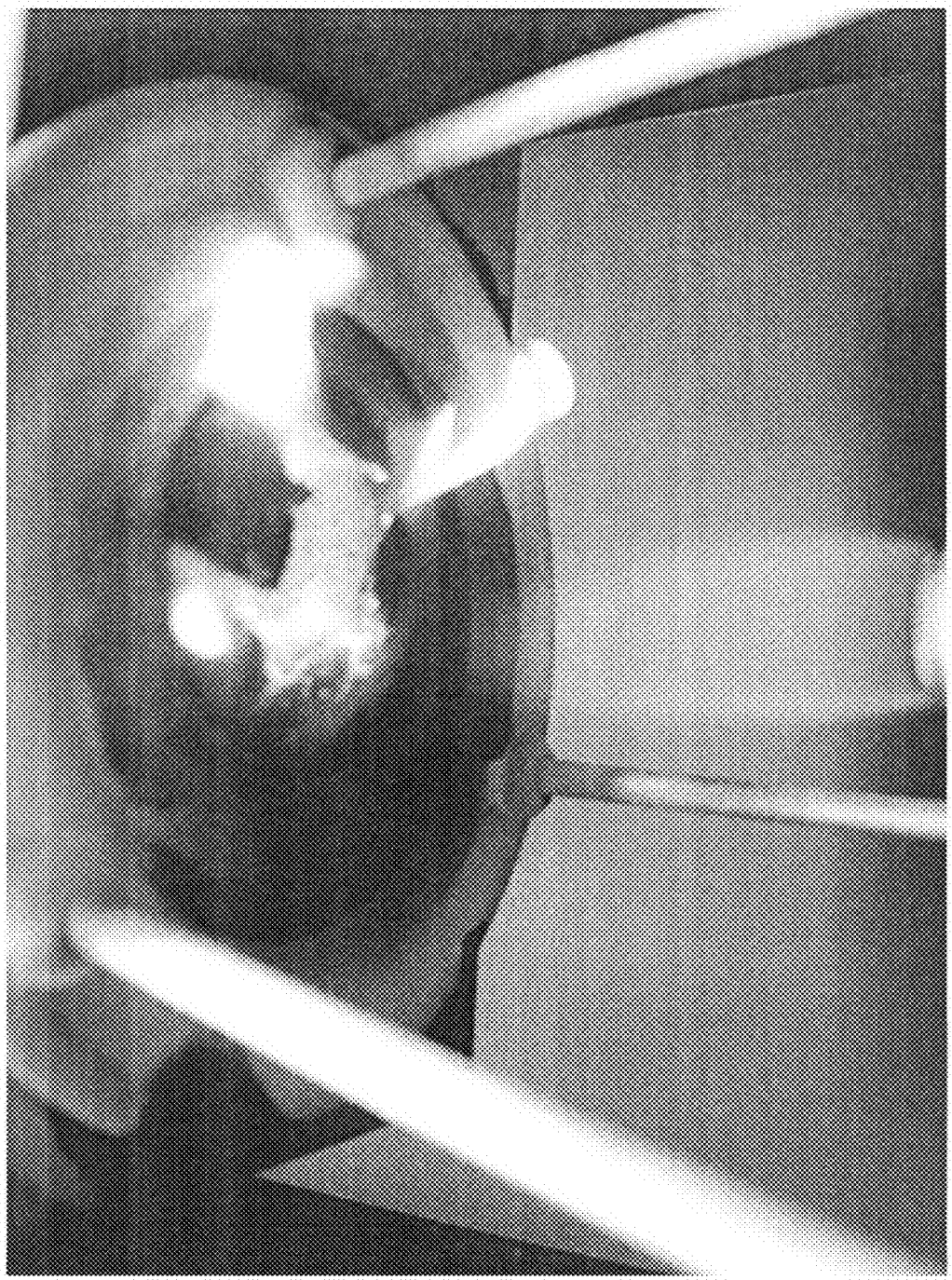
FIG. 18 is a photograph showing an underside view of a sample mounted on the Fire Barrier Test apparatus upon ignition of the foam layer.

Referring now to FIG. 18, this photograph shows an underside view of an ignited sample mounted on the Fire Barrier Test apparatus. This photo was taken a few seconds after the burning through or failure of a sample. As shown, a flame is originating from the urethane foam and jumping through a failed portion of the test sample. This photograph illustrates that unless the flame is removed immediately after break through, the urethane foam will likely ignite only seconds later.

Figure 19:
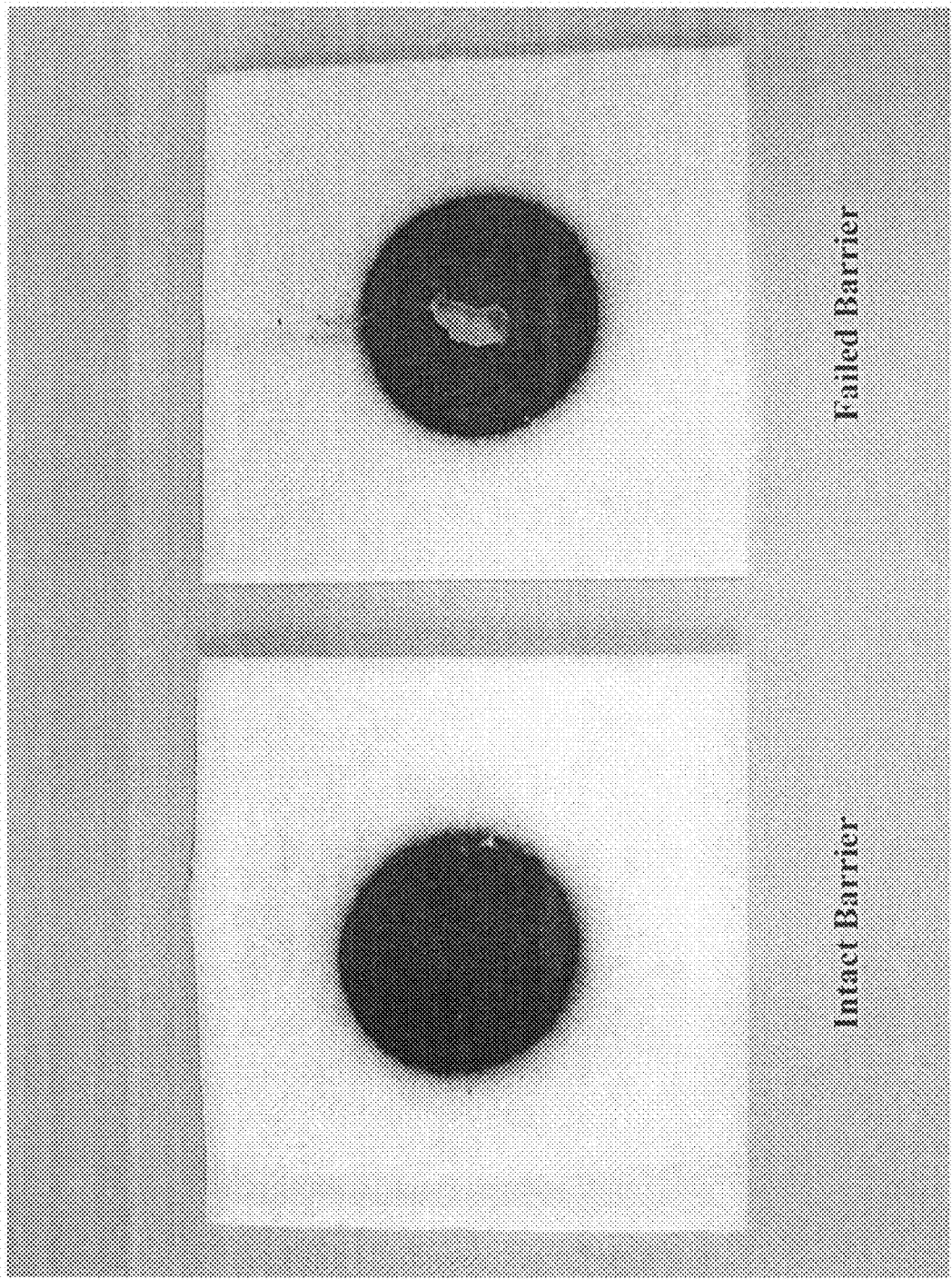
FIG. 19 is a photograph showing a bottom view of exemplary samples removed from the Fire Barrier Test apparatus after 15 minutes of testing. An intact barrier appears on the left while a burned through or failed barrier appears on the right.

FIG. 19 is a photograph showing a side-by-side bottom view of exemplary samples removed from the Fire Barrier Test apparatus after approximately 15 minutes of testing. An intact barrier appears on the left. This exemplary intact barrier shows no sign of break through or failure after 15 minute. A burned through or failed barrier appears on the right. As illustrated, this exemplary barrier develops a ripped portion or hole during testing.

Figure 20:
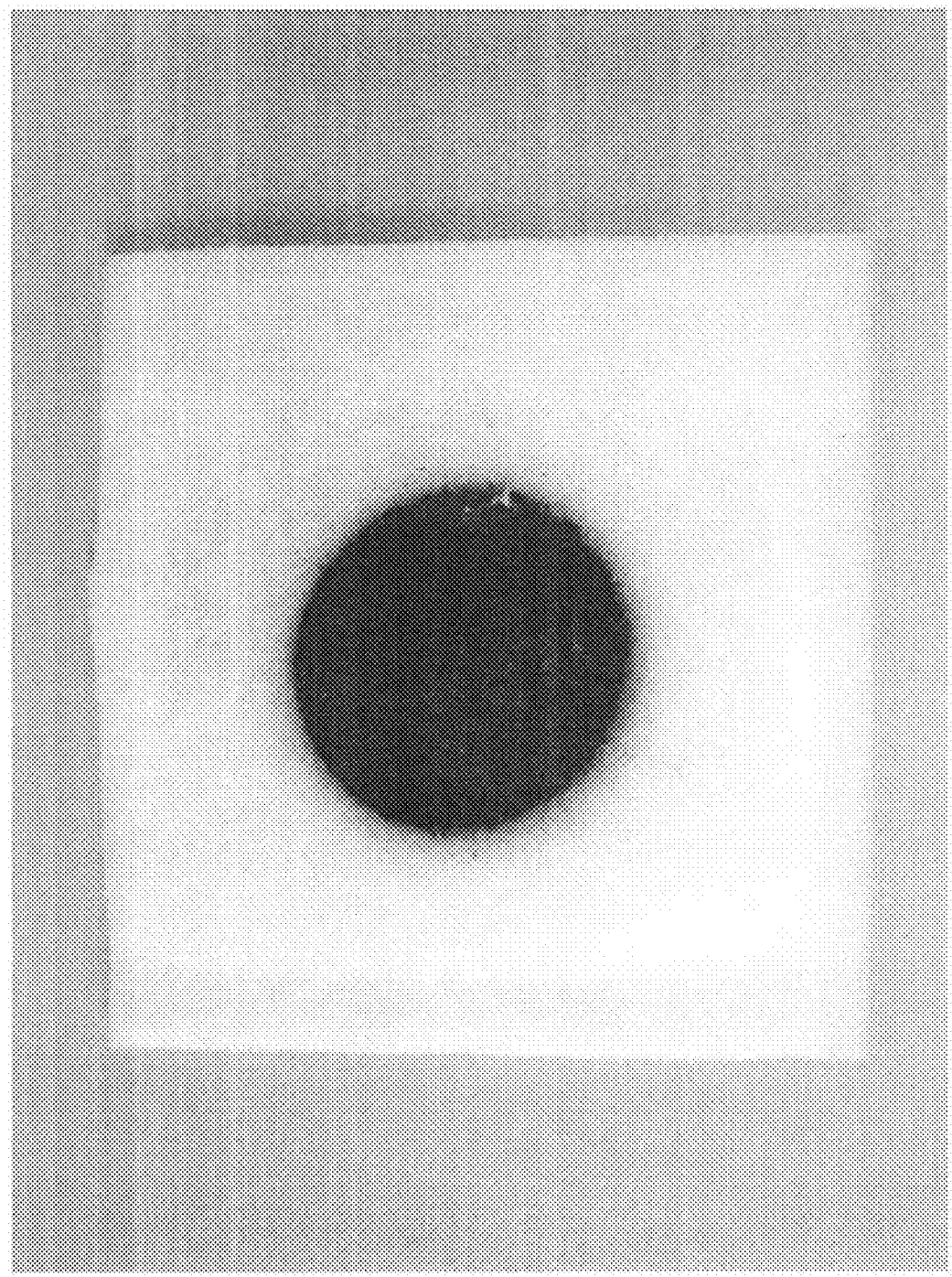
FIG. 20 is a photograph showing an enlarged bottom view of the intact Fire Barrier Test sample of FIG. 10.
Figure 21:
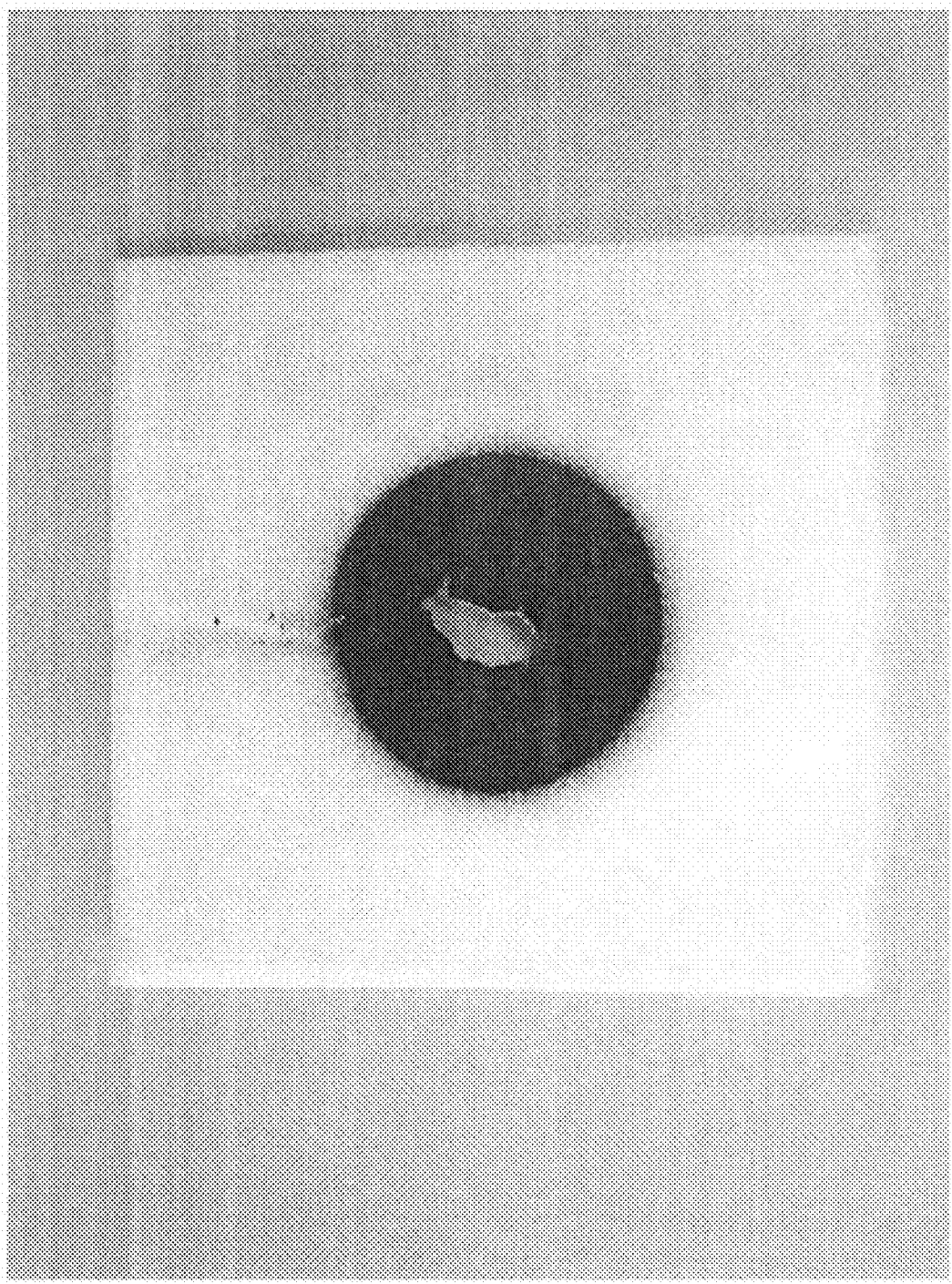
FIG. 21 is a photograph showing an enlarged bottom view of the burn through or failed portion of the Fire Barrier Test sample of FIG. 10.

FIG. 20 shows an enlarged bottom view of the intact Fire Barrier Test sample of FIG. 19. As illustrated, only a circular, charred area results in this intact sample. In contrast, FIG. 21 shows an enlarged bottom view of the burned through or failed Fire Barrier Test sample of FIG. 19. The ripped portion or hole is shown in a center portion of the circular, charred area.

Standard Leaching Procedure to Test for Performance

A dry handsheet to be tested is placed on a test stand. A vertical 6 cm diameter×6 cm high permeability column is placed over the center of the handsheet. 500 ml of water is poured slowly through the handsheet. After drying overnight, the handsheet is subjected to the Fire Barrier Test.

ASTM D7140-05 Standard Test Method to Measure Heat Transfer Through Textile Thermal Barrier Materials The ASTM D7140 standard procedure indicates this test method as covering the evaluation of heat transfer of textile materials which are used as thermal barriers when exposed to a calibrated convective and radiant energy heat source for 60 seconds. It is used to determine if the heat transfer is sufficient to ignite flammable materials which are contiguous to the textile thermal barriers.

A 0.127-meters by 0.127-meters (5-inch by 5-inch) sample of fire-retardant barrier material is centered flat on a mounting plate such that the side of the fire-retardant barrier material which would be exposed to the heat source is facing down toward a burner.

A second mounting plate with a calorimeter is placed on top of the sample.

A burner with a calibrated flame is positioned beneath the center of the specimen and exposure to the flame started and continued for 60 seconds.

At the end of that time period, the burner is removed and the specimen examined for flame impingement. Temperature (degrees Celsius) and energy values (cal/cm$^2$/sec) are recorded. Additionally, any physical changes that occurred during flame impingement are recorded.

For details on the test method and procedure, refer to ASTM D7140-05.

All ASTM D7140 test data described in this document was performed at The Govmark Organization, 96-D Allen Boulevard, Farmingdale N.Y. 11735.

ASTM C-518 Standard Thermal Conductivity Testing

The ASTM C-518 test method covers the measurement of steady state thermal transmission through specimens using a heat flow meter apparatus.

The thickness of the flame retardant material used in measurement of thermal conductivity was in the range of 0.0100-meters to 0.0104-meters (0.39-inch to 0.41-inch).

The thermal conductivity of a standard glass board was used as the reference sample.

ASTM C-518 testing in support of Buckeye's flame retardant material was performed at Orange County Material Test Laboratories.

For specific details on the test method and procedure, refer to the ASTM C-518 standard.

ASTM E1050-98 Standard Test Method for Impedance and Absorption of Acoustical Materials Using a Tube, Two Microphones and a Digital Frequency Analysis System E1050-98 utilizes a standing wave tube to determine the ratio of the sound energy normally incident on a test element to the sound energy absorbed by the test element. The normal acoustic impedance of the element may also be determined. The transfer function utilizes two phase matched microphones and the cross spectrum between the microphones to determine the normal incidence acoustic impedance of the test element, from which the normal incidence sound absorption coefficient can be calculated. A further discussion of this test method is disclosed below in the Examples.

UL-94 Flammability of Plastic Materials for Parts in Devices and Appliances

UL-94 is Underwriters Laboratories' standard for Flammability of Plastic Materials in Devices and Appliances. The UL 94 test, specifically for conformance to the V-0 requirement, was used in this context to measure flame-retarding efficacy of the flame retardant substrates. V-0 refers to a 20-mm Vertical Burning Test.

Flammability testing for conformance to UL94 V-0 was performed at Orange County Materials Test Laboratories. The sample size of flame retardant material used for this analysis was 0.125-meters by 0.013-meters.

The UL94 V-0 vertical burn test involves holding a cut specimen (sample strips 125 mm×13 mm) at one end in the vertical position over a 0.02-meter (20 mm) burner flame. The specimen is clamped in a vertical position using the top 6 mm of the sample. A 0.05-meters by 0.05-meters by 0.006-meters (50 mm by 50 mm by 6 mm) layer of dry absorbent cotton is placed 0.30-meters underneath the bottom edge of the specimen. The test strip is positioned so that the lower end is 300 mm above a horizontal layer of absorbent 100% cotton to catch any burning drips or particles. The burner flame is applied to the free end of the sample for two 10 second intervals, separated by the time it takes for the flaming combustion to cease after the first application.

The calibrated burner is adjusted to a blue 20 mm high flame which is applied to the middle of the lower edge of the sample for 10 seconds and is withdrawn to observe and time the afterflame. This is repeated twice more. A rating of V-0 means no burning drips or particles and the afterflame time was equal or less than 10 seconds for the first two burns and the total afterflame time was equal to or less than 50 seconds. The method specifies that a total of five specimens are tested, unless one of the samples in a set fails, in which case five more strips are tested. Several observations are made and recorded, including afterflame time after the first flame, afterflame time plus afterglow after the second flame, and whether or not flaming drips ignite the cotton placed below the specimen.

For specific procedural details, refer to UL Standard for Safety for Test for Flammability of Plastic Materials for Parts in Devices and Appliances, UL 94 Fifth Edition, Dated Oct. 29, 1996.

Having discussed the preparation of handsheets, the Fire Barrier Tests, and pertinent ASTM and UL standard tests, we now discuss the performance of various samples. Basis weights of handsheets and other materials are in units of grams per square meter, abbreviated gsm. The experiments on the handsheets are set out as "Examples."

Examples 1-41

Introduction to Sample Pad Formation

A laboratory airlaid apparatus was used which lays down a 35.5 cm×35.5 cm (14 inch×14 inch) pad. This size of sample is often termed a "handsheet" and is suitable for range-finding experiments. A handsheet may be formed before going to an actual airlaid machine to produce a continuous web.

In operating the handsheet former, pre-weighed amounts of selected fibers are added to a mixing chamber where jets of air fluidize and mix the fibers. The mixing chamber thus forms a fluidized "cloud" of fibers. The cloud of fibers is pulled down onto a forming wire by a vacuum source. A tissue or other porous carrier sheet is used over the wire to minimize the loss of fiber to the vacuum system. While some automotive applications call for a spunbond slipsheet or carrier attached to one face of the acoustically insulating handsheet or test pad, in other instances the carrier may be removed before further processing and testing.

A cellulose fluff pulp is typically used for the fiber matrix of the handsheet. The cellulosic material was chosen from any of the following:

1. FOLEY FLUFFS® bleached Southern softwood Kraft from Buckeye Technologies, Inc. of Memphis, Tenn.;
2. Unbleached Kraft wrapping paper, 42 pound stock, from Southern States Packaging, Spartanburg, S.C.;
3. Recycled unbleached Kraft from grinding post-consumer use cardboard;
4. Recycled pulp from grinding waste newsprint;
5. Recycled airlaid fibers from disintegrating various latex-bonded and fusible-fiber-bonded airlaid webs from Buckeye Technologies, Inc.; and
6. TEMFITE-P® (75 percent Northern hardwood 25 percent Northern softwood) sulfite pulp from Tembec of Temiscaming, Quebec, Canada.

The chosen fibers are preferably mechanically defibrated (comminuted) into a low density, individualized, fibrous form known as "fluff" prior to feeding to the handsheet apparatus. Mechanical defibration may be performed by a variety of methods which are presently known in the art. Typically a hammer mill, such as, for example, a Kamas Mill, is employed. A Kamas Mill from Kamas Industri AB, Sweden with a 51 mm (2 inch) slot is particularly useful for laboratory scale production of fluff. Another type of device, which has been found to be particularly useful for defibrating the cellulosic fibers in the laboratory is the three stage fluffing device described in U.S. Pat. No. 3,987,968, which is hereby incorporated by reference in its entirety. The three stage fluffing device subjects cellulosic pulp fibers to a combination of mechanical impact, mechanical agitation, and air agitation to create a substantially knot-free fluff pulp. Unless otherwise stated, in the following working examples, the FOLEY FLUFFS® dry lap pulp sheet was defibrated or comminuted using the Kamas mill while the unbleached kraft, cardboard, newsprint, virgin hardwood, and recycled airlaid fibers were comminuted using the three-stage fluffer.

The acoustic test pads may be fabricated from all-synthetic materials rather than cellulosic materials. Various polyethylene binder fibers may be used. For the preparation of acoustic materials or pads made from all-synthetic fibers in which PET is the matrix fiber instead of cellulose fluff, the following fiber raw materials were used:

1. PET, Recycled staple fiber, 15 dpf×6 mm type 376X5 by Wellman, Inc. of Johnsville, S.C.;
2. PET, virgin staple fiber 6 dpf×6 nun merge 35379A and 15 dpf×6 mm merge 35391A by Invista, formerly KoSa, of Salisbury, N.C.; and
3. co-PET bico, 2 dpf×6 mm, which has a lower melting copolyester sheath around a polyester core. Examples of this kind of copolyester are M1440, M1426 or M1427 by Wellman International, Mullagh, Kells, Co., Meath, Republic of Ireland and T254 by Invista, Salisbury, N.C.

A binder fiber will also be used in the preparation of the handsheets. Where the handsheets employ a cellulose fluff matrix, the binder fiber is preferably Type 255, Lot 1661 polyethylene sheath polyethylene terephthalate. The fiber is also referred to as PET or polyester, core 2 dpf (denier per fiber) by 6 mm cut length bicomponent fiber from Trevira of Bobingen, Germany. Bicomponent fibers are commonly referred to as "bico".

The binder fibers and other synthetic fibers come loosely baled and do not require a separate opening step when used in the laboratory pad-former. It is understood that actual airlaid production facilities have bale-opening equipment and means to meter the synthetic staple fiber.

The laboratory scale airlaid handsheet apparatus, which can be operated step-wise to simulate the commercial multiple forming head airlaid process, was used to air lay the fiber mixtures into 35.56 cm (14 inch) square airfelt pads. The handsheet former is located in a temperature and relative humidity controlled room maintained at 73.4±2.7° F. and 50±5% relative humidity. The fibrous raw materials are equilibrated in the controlled humidity room for at least 30 minutes prior to forming the pad. The controlled humidity and temperature are necessary to avoid static electricity problems in the air handling of finely divided materials. For these high basis weight materials, the handsheet apparatus is used to build a pad in up to 24 stages or layers. Forming the pad in this many steps helps ensure that the batch-type forming head of the laboratory airlaid handsheet apparatus better simulates the degree of homogeneity which is obtained in a multiple forming head continuous airlaid manufacturing machine.

After each portion of the total weight of fibers is laid down, the sample is turned 90 degrees in the apparatus. This procedure helps to minimize air turbulence artifacts and delivers a more uniform pad. In this step-wise fashion the entire airlaid test pad is formed. The pad is pressed to a target thickness in a laboratory press heated to 150° C. and held there from 5-30 minutes to fully activate the thermoplastic sheath of the bicomponent binder fiber.

For the purpose of initially screening large numbers of variations of insulating pad designs, a small sound transmission chamber was constructed. Laboratory Sound Transmission Tests (or LSTT) were performed in the chamber. The LSTT chambers were divided in half, forming a sound source or sound-generating portion and a sound receiving portion. Each half or portion of the test chamber was 25.4 cm (ten inches) square in cross-section and 61 cm (24 inches) in length. The chamber halves were constructed of 19 mm (¾ inch) medium density particle board and lined with mineral fiber acoustic ceiling tile, Style 755B Fissured Square Lay-in by Armstrong World Industries of Lancaster, Pa., to minimize reverberation within the chamber halves. The tile lining reduced the interior size of the sound chambers to 22.2 cm (8.75 inches) square. Soft rubber feet were placed on the bottom of each section to isolate the chamber from the benchtop.

A microphone was placed within the sound receiving portion of the test chamber to detect and measure sound. A microphone probe of a decibel gauge, Extech Model 407736 sound level meter, was inserted through a close-fitting hole in the end of the sound-receiving chamber. A 10 cm (4 inch) diameter speaker, Pioneer, Mod TS-G1040R with 10 cm woofer and 2.7 cm tweeter, frequency response. of 45-22000 Hz and 4.0 Ohms impedance, was installed at the end of the sound source portion of the chamber. The speaker was isolated by suspending it on rubber bands stretched between bolts protruding through the end cap. To generate a standard sound, a compact disc "Pure White Noise—The Voice of Earth" available from www.PureWhiteNoise.com was played through an RCA portable CD player, Model RCD025. The CD player was amplified through a 30 watt Lafayette Model LA-224T amplifier until the sound level on the other side of a 0.35 mm (0.014 inch) thick aluminum sheet is 90 decibels. The aluminum sheet is placed on the sound-generating side of the chamber.

After the LSTT chamber is set up, the pad samples to be tested are clamped between the sound source and sound-receiving chamber portions against the aluminum sheeting which is on the source chamber side. Only about 10-15 mm of the edges of the samples are compressed by being mounted between the two halves of the test apparatus. Without changing the volume setting on the CD player/amplifier and from what delivered the 90 dB sound through the aluminum sheet, the sound level is monitored for approximately one minute. The high and low decibel readings are recorded and the results averaged to represent the acoustic performance.

In order to directly compare samples of differing basis weights, a Sound Absorption Mass Index (SAMI) is calculated. SAMI is defined as the sound transmission loss in the LSTT (difference in decibel reading between transmitted sound without the sample in place and the reading with the sample installed) divided by the basis weight of the sample expressed in kilograms per square meter. Basically, this index normalizes the acoustic data from the LSTT for basis weight. Basis weight directly correlates to cost of manufacture of each insulation part. A very thick and dense material may absorb sound extremely well, yet be too costly to be commercially viable.

Table 1 is presented to demonstrate the sound transmission loss and other features of various airlaid, nonwoven materials in comparison to shoddy. Five comparative examples are provided. The control shoddy was obtained from the carpet underlayment of a Ford Motor Company FREESTAR® minivan, and is designated "CS-1."

In each of Examples 1-5, the weight ratio of cellulose pulp to bicomponent fiber was 80/20. Each example is a laminate of two airlaid slabs, which are coated on the outer sides with 120 gsm of the carboxylated SBAN latex binder from Dow-Reichhold. Abbreviations represent various fiber forms as follows:

"BK" means bleached Southern softwood Kraft.

"UBK" is unbleached Kraft.

"CB" represents comminuted cardboard, which is a recycled material made of unbleached kraft paper and retaining the construction adhesives used in making the original corrugated board. Strips of cardboard 25 mm by 100 mm were fed to the three-stage fluffer to create the loose fluff.

"HW" is a virgin pulp mixture from Tembec containing 25 percent Northern softwood and 75 percent Northern hardwoods, which was sent through the three-stage fluffer prior to being weighed out for the laboratory pad-forming apparatus. The pads were not compacted to any target thickness, but were cured in the oven at whatever thickness they were coming out of the pad-former.

TABLE 1

Examples 1-5 - Laboratory Sound Transmission Test

| Sample | Example | Density (g/cc) | Caliper (mm) | Basis Weight (gsm) | LSTT (dB) | LSTT (δdB) | SAMI (δdB/kgsm) |
|---|---|---|---|---|---|---|---|
| BK | 1 | 0.016 | 68 | 1412 | 78 | 12 | 8.50 |
| UBK | 2 | 0.018 | 56 | 1411 | 80 | 10 | 7.09 |
| CB | 3 | 0.021 | 52 | 1355 | 80 | 10 | 7.38 |
| HW | 4 | 0.028 | 37 | 1449 | 83 | 7 | 4.83 |

TABLE 1-continued

Examples 1-5 - Laboratory Sound Transmission Test

| Sample | Example | Density (g/cc) | Caliper (mm) | Basis Weight (gsm) | LSTT (dB) | LSTT (δdB) | SAMI (δdB/kgsm) |
|---|---|---|---|---|---|---|---|
| CB | 5 | 0.035 | 29 | 1175 | 83 | 7 | 5.95 |
| CS-1 | shoddy | 0.12 | 26 | 2065 | 84 | 6 | 2.91 |

The raw decibel readings, sound transmission loss (δdB), and the calculated SAMI values in Table 1 suggest that density or caliper may play important roles in sound absorption. In this respect, lower density (or higher caliper) samples were more sound-absorbent. Since sound transmission is being measured, the fact that lower density materials apparently work well indicates that the actual mechanism of sound deadening in this case is probably absorption rather than blocking. Without being bound by any theory, the inventors believe that the demonstrated efficiency of sound reduction is through the process of absorption by the airlaid composites and is in large part due to the vast number of small, short fibers, which are present in a given volume of composite. Although larger synthetic fibers still function to absorb sound energy, having a plethora of low modulus fine cellulose fibers and small pores between fibers most effectively absorbs the incident sound energy and dissipates it by mechanical vibration ultimately resulting in the generation of heat.

To expand upon the above findings, another experiment was carried out in which the caliper of the samples was held constant at 25 mm and the basis weight and resulting density were varied. The additional test samples are listed in Table 2, below. In Table 2, Examples 6-11 are listed. Examples 6-8 were formed in one layer in the pad-former but Examples 9-11 were laminated from two separate pieces of airlaid. These airlaid samples were only thermally bound and not sprayed with latex binder.

Since from Table 1 the source of the cellulose fluff matrix fiber did not seem to be a major factor, the raw material selection used in the experiment listed in Table 2 was limited to FOLEY FLUFFS® and the binder fiber was Type 255 Lot 1661 bicomponent fiber from Trevira. The samples were cured in a heated press between aluminum plates shimmed out to 25 mm until their internal temperatures reached at least about 140° C. to melt the polyethylene sheath of the binder fiber.

TABLE 2

Examples 6-11 - Effect of Basis Weight at Constant 25 mm Thickness

| Example | Density (g/cc) | Basis Weight (gsm) | LSTT (dB) | LSTT (δdB) | SAMI (δdB/kgsm) |
|---|---|---|---|---|---|
| 6 | 0.020 | 506 | 85.0 | 5 | 9.88 |
| 7 | 0.029 | 735 | 84.8 | 5.2 | 7.07 |
| 8 | 0.038 | 973 | 84.8 | 5.2 | 5.34 |
| 9 | 0.050 | 1243 | 85.3 | 4.7 | 3.78 |
| 10 | 0.062 | 1539 | 85.2 | 4.8 | 3.12 |
| 11 | 0.078 | 1939 | 85.2 | 4.8 | 2.48 |

Table 2 shows clearly that density, or basis weight at constant thickness, is not a primary factor in absolute sound absorption in decibels when caliper is held constant. While density varied from 0.020 g/cc to a high of 0.078 g/cc, sound transmission was essentially the same. The constant factor in this experiment was caliper or thickness. The SAMI calculation emphasizes that basis weight is a strong factor in cost/effectiveness or sound absorption per unit mass. What this table of data also suggests is that thickness of the absorbing media may be more important than other physical properties of the media. Accordingly and within reasonable practical limits, airlaid sound and thermal insulation is projected to perform about as well at lower weight but equal thickness as more conventional material currently employed for these purposes. Airlaid insulation materials exhibit outstanding performance when basis weight is taken into account.

To further explore the effects of thickness on sound absorbency, pad sample Examples 12-14 were formed. Table 3 demonstrates tests on Examples 12-14. In these Examples, the density of the fiber matrix was held constant at 0.04 g/cc and the basis weights (and calipers) were varied. It is noted that Example 8 from Table 2 is brought into Table 3 as Example 13. This experiment did not apply any second (latex) binder to the airlaid pads. Holding the density the same and allowing the basis weight and thickness to vary shows a small but definite direct effect of thickness on absolute sound absorbency, but the SAMI calculation shows that lower basis weight is more effective, since it shows a greater decibel change per unit mass.

TABLE 3

Examples 12-14 - Constant Density of 0.04 g/cc

| Example | Caliper (mm) | Basis Weight (gsm) | LSST (dB) | LSST (δdB) | SAMI (δdB/kgsm) |
|---|---|---|---|---|---|
| 12 | 19 | 751 | 85.5 | 4.5 | 5.99 |
| 13 | 25 | 973 | 84.8 | 5.2 | 5.34 |
| 14 | 34 | 1333 | 83.4 | 6.6 | 4.88 |

Next, pad sample Examples 15-19 were formed. The effects of the addition of a polymeric binder layer, indicated by "L" for Latex or "NL" for no latex, on one or both sides of the airlaid sample and of different levels of bicomponent binder fiber on sound transmission were explored. These variations are presented in Table 4. The latex binder (indicated by "L") was the styrene-butadiene-acrylonitrile emulsion product 68957-80 from Dow-Reichhold Specialty Latex.

TABLE 4

Examples 15-19 - Effect of Additional Binder at Constant 25 mm Thickness

| Example | Type | Density (g/cc) | Basis Weight (gsm) | LSST (dB) | LSST (δdB) | SAMI (δdB/kgsm) |
|---|---|---|---|---|---|---|
| 15 | NL 20% bico | 0.039 | 973 | 84.8 | 5.2 | 5.34 |
| 16 | NL 40% bico | 0.040 | 1014 | 85.4 | 4.6 | 4.54 |
| 17 | L 159 gsm 1 Side | 0.045 | 1132 | 84.2 | 5.8 | 5.12 |
| 18 | L 136 gsm 2 Sides | 0.050 | 1244 | 83.8 | 6.2 | 4.98 |
| 19 | L 231 gsm 1 Side | 0.048 | 1204 | 83.2 | 6.8 | 5.65 |

It can be seen that there is not a statistically significant difference in sound transmission between Example 15, with 20 percent bicomponent fiber, and Example 16, with 40 percent bicomponent fiber. However, adding a discrete layer of latex binder to one or both sides of the sound absorber seems to have a slight effect on reducing sound transmission (increasing sound transmission loss); however, the effect again is not statistically significant. More importantly, the polymeric binder clearly does not lower the acoustic performance. For purposes of moldability in various applications, it may be desirable to have the sound absorbing airlaid coated with latex binder.

Next, the laboratory handsheet forming apparatus was used to prepare a series of all-synthetic airlaid insulation pads of various basis weights (BW). These pad samples are listed in Table 5 as Examples 20-26. The test pads were formed from a 70/30 blend of polyester fibers and copolyester sheath bicomponent binder fibers. In Table 5, R-PET is recycled polyester and V-PET is virgin polyester. Pads with basis weights up through 800 gsm were formed in 12 stages with the web rotated 90° between each addition of fiber. Pads at 1000 gsm basis weight were similarly formed but in 24 stages. The unconsolidated webs were heat set in a 150° C. convection oven for 15-30 minutes and then trimmed to 30.5 cm (12 inch squares). Compaction to final thickness was done with a force of 408 kg (900 lbs.) in a press heated to 150° C. using aluminum and brass shims to set the final thickness. Pads of 1000 gsm were held in the press for 30 minutes while lower basis weight pads were heated for 15 minutes.

TABLE 5

Examples 20-26 - All-Synthetic Airlaid Insulation Panels

| Example | BW (gsm) | Matrix Fiber | Density (g/cc) | Caliper (mm) | LSTT (dB) | LSTT (δdB) | SAMI (δdB/kgsm) |
|---|---|---|---|---|---|---|---|
| 20 | 400 | R-PET 15 dpf | 0.015 | 28 | 87 | 3 | 7.5 |
| 21 | 600 | R-PETe 15 dpf | 0.017 | 36 | 86 | 4 | 6.67 |
| 22 | 600 | V-PET 6 dpf | 0.020 | 31 | 86 | 4 | 6.67 |
| 23 | 600 | V-PET 15 dpf | 0.018 | 35 | 86 | 4 | 6.67 |
| 24 | 750 | V-PET 6 dpf | 0.018 | 46 | 85 | 5 | 6.67 |
| 25 | 800 | R-PET 15 dpf | 0.017 | 47 | 85 | 5 | 6.25 |
| 26 | 1000 | V-PET 6 dpf | 0.018 | 59 | 83 | 7 | 7.00 |
| CS-1 | 2065 | Shoddy | 0.12 | 26 | 84 | 6 | 2.91 |
| 13 | 973 | fluff/bico | 0.038 | 25 | 84.8 | 5.2 | 5.34 |

Table 5 shows that, while the low basis weight/high caliper all-synthetic airlaid panels do not absorb sound very efficiently on an absolute basis, when the basis weight is factored in, the performance in dB drop per unit mass is very good. In addition to significant weight-savings over shoddy, there are other properties where the all-synthetic insulation would also outperform the cellulose-based insulation, such as moisture resistance and inherent mildew resistance.

Next, Table 6 presents tests performed on pad sample Examples 27 and 27A. Examples 27 and 27A illustrate the use of an airlaid panel or pad of this invention as an acoustic ceiling tile or acoustic wall covering. For these working examples, a 30/70 bico/fluff airlaid produced on a 2.7 meter wide commercial airlaid machine is compared to two types of commercial acoustic ceiling tiles. The mineral fiber tile (CS-2) is Fissured Square Lay-In type 755B from Armstrong World Industries of Lancaster, Pa. The vinyl faced fiberglass tile (CS-3) type 3020A is also by Armstrong. For the LSTT, Laboratory Sound Transmission Tester, the tiles are mounted with the decorative face of the tiles facing the 90 dB sound source. The spunbond carrier side of the airlaid panel or test pad faced the sound source. Rather than measuring how the ceiling tile absorbs sound within a room, the LSTT measures how much sound generated in the room escapes from the room.

The airlaid sample 27A is the same material as Example 27 except that it was finished at a higher caliper. Random Incidence Sound Absorption was measured on the airlaid material and on the mineral fiber commercial ceiling tile according to ASTM C423-02a, Sound Absorption and Sound Coefficients by the Reverberation Room Method. The samples were mounted, according to ASTM E795-00, on a type E400 fixture. The Noise Reduction Coefficient, NRC, is the average of the Random Incident Sound Absorption Coefficients at 250, 500, 1000, and 2000 Hz. rounded to the nearest 0.05. The microphone was mounted on the same side of the acoustic panels as the sound source. This ASTM test measures how well the absorbent material reduces the sound level within a room. A coefficient of 1.0 would mean that all the incident sound was absorbed.

TABLE 6

Examples 27-27A - Ceiling Tile Sound Transmission

| Example | Construction | BW (gsm) | Caliper (mm) | Density (g/cc) | LSTT (dB) | SAMI (δdB/kgsm) | NRC |
|---|---|---|---|---|---|---|---|
| 27 | airlaid | 797 | 21.6 | 0.037 | 85.7 | 5.40 | |
| 27A | airlaid | 800 | 31 | 0.026 | | | 0.75 |
| CS-2 | mineral fiber | 3097 | 14 | 0.22 | 79.8 | 3.29 | 0.5 |
| CS-3 | vinyl/fiberglass | 1136 | 25 | 0.045 | 84.7 | 4.67 | |

According to the results in Table 6, while the airlaid nonwoven panel at 797 gsm and 21.6 mm caliper (Example 27) is close to the resin-bonded fiberglass ceiling tile (CS-3) in reducing the volume of white noise passing through it. However, it is not as effective in absolute sound absorption as the heavy mineral fiber commercial ceiling tile (CS-2, which is 3.9 times the basis weight of the airlaid Examples 27. However, when the changes in decibel readings (δdB) are normalized to basis weight, shown on Table 6 as SAMI, the airlaid sample Example 27 is more efficient than both commercial tiles in the LSTT.

In the ASTM C423-02a test, the thicker lower density version of the airlaid test pad is significantly more sound absorbent on an absolute basis than the commercial ceiling tile, which is thin and dense. The airlaid panel or test pad absorbed 75% of the incident sound in the room while the commercial tile only absorbed 50%.

Examples 28-30 shown in Table 7 demonstrate test samples fabricated with a machine having forming heads. The pads were made on a 0.6 meter wide pilot scale airlaid machine operating with three Dan-Web style forming heads. The web was formed on a 17 gsm polypropylene spunbond carrier type P9 obtained from BBA Fiberweb of Nashville, Tenn. The compaction roll after the forming heads was raised so that it did not touch the web during this trial. The binder sprayed on Example 30 was the carboxylated SBAN latex binder from Dow-Reichhold, which was diluted to about 10 percent solids. For this trial, the line was stopped to allow the web a residence time of about 20 minutes in the oven, which had been converted from through-air to convection. In actual production, the line would not be stopped and the web would pass through several ovens. In Table 7 under the heading "Type," the numbers refer to the bico/cellulose fluff ratio.

side of the sample as the sound source, whereas with the LSTT the sample is between the microphone and the sound source. The Impedance Tube Sound Absorption Test also records details on frequency-related acoustic properties while the LSTT only measures the loudness of the white noise.

Concerning the Impedance Tube Sound Absorption test, plane waves were generated in the tube by a random noise source. The standing waves were measured at two fixed locations using wall mounted microphones. The signals from the microphones were sent to a dual channel signal analyzer (B & K) Type 2032 to determine the complex acoustic transfer function, and finally to compute the sound absorption coefficient using a software package (B & K Type BZ5050). The sound absorption coefficient is the ratio of the amount of sound energy absorbed to the amount of sound energy incident upon the sample. Total absorption of the incident sound energy would have a coefficient of 1.0.

TABLE 7

Examples 28-30 - Pilot Scale Airlaid Machine Samples

| Example | Type | Latex Binder | Density g/cc | Caliper mm | Basis Weight (gsm) | LSST (dB) | SAMI (δdB/kgsm) |
|---|---|---|---|---|---|---|---|
| CS-1 | Shoddy | NA | 0.12 | 26 | 2065 | 84 | 2.9 |
| 28 | 30/70 | NA | 0.023 | 32 | 750 | 83.9 | 8.1 |
| 29 | 30/70 | NA | 0.026 | 39 | 1000 | 83.3 | 6.7 |
| 30 | 20/80 | 120 gsm | 0.028 | 35 | 960 | 83.7 | 6.6 |

Table 7 shows that the airlaid insulation material of Examples 28-30, which were produced on a pilot-scale airlaid machine, have sound absorption equivalent to the commercial shoddy material of considerably greater basis eight but lower caliper (higher density). Expressed per unit mass, the airlaid outperforms the shoddy.

To confirm and build upon the above findings, samples of various airlaid materials were submitted for testing to a certified acoustics test laboratory, Kolano & Saha Engineers, Inc. of Waterford, Mich. The Impedance Tube Sound Absorption Test procedure in accordance with the standard test method of ASTM E1050-98 "Impedance and Absorption of Acoustical Materials using a Tube, Two Microphones, and a Digital Frequency Analysis System" was used. The measurement was made using a two-microphone impedance measurement tube, B & K type 4206 from Brüel and Kjaer of Naerum, Denmark.

As noted, a main difference between the standard acoustic tests and the screening test is that with the Impedance Tube Sound Absorption Test, the microphone(s) is/are on the same The samples were tested with no air space between the material and the sample holder back plate. The samples were die-cut to fit the large (100 mm diameter) and small (29 mm diameter) sample holders of the B & K type 4206 tube. The large tube has a measurement range of 100-1600 Hz while the small tube operates from 1000-6300 Hz. The comparative showing (CS-2) was the same shoddy material used in Table 1. As noted in the first column, the examples in Table 8 were not sprayed with latex (NL), had 120 gsm of latex sprayed on one side (L-1), latex on each side (L-2), or had 240 gsm carbonate filler in the latex applied to each side (CCL-1). UB Kraft is unbleached Kraft pulp. B Kraft is bleached Kraft. Absorption Coefficients ($\alpha$) were computed and the results were averaged. Noise Reduction Coefficient, of "NRC," is the average sound absorption coefficients for the frequencies 250, 500, 1000, and 2000 Hz. NRC is used in the automotive industry to compare overall performance and allows samples which absorb well at low frequencies to be compared to samples absorbing well at higher frequencies. The full range of sound frequencies tested is illustrated in FIG. 1 for the control shoddy and Example 33.

TABLE 8

Examples 31-38 Sound Absorption Test

| Sample | Example | Density (g/cc) | Caliper (mm) | Basis Weight (Gsm) | $\alpha$ 1000 Hz. | $\alpha$ 2500 Hz. | NRC |
|---|---|---|---|---|---|---|---|
| UB Kraft | 31 | 0.028 | 31 | 706 | 0.456 | 0.832 | 0.376 |
| B Kraft w/o Latex | 32 | 0.03 | 25 | 750 | 0.412 | 0.879 | 0.357 |
| B Kraft w/o Latex | 33 | 0.037 | 26 | 1000 | 0.473 | 0.931 | 0.388 |
| B Kraft latex 1 side | 34 | 0.04 | 32 | 1200 | 0.721 | 0.991 | 0.535 |
| B Kraft | 35 | 0.031 | 34 | 1287 | 0.674 | 0.991 | 0.516 |
| B Kraft w/o Latex | 36 | 0.04 | 36 | 1300 | 0.696 | 0.986 | 0.541 |
| B Kraft w/o Latex | 37 | 0.05 | 25 | 1300 | 0.572 | 0.957 | 0.444 |

TABLE 8-continued

Examples 31-38 Sound Absorption Test

| Sample | Example | Density (g/cc) | Caliper (mm) | Basis Weight (Gsm) | α 1000 Hz. | α 2500 Hz. | NRC |
|---|---|---|---|---|---|---|---|
| B Kraft CaCO₃ | 38 | 0.073 | 28 | 1680 | 0.452 | 0.925 | 0.392 |
| Shoddy | CS-1 | 0.12 | 26 | 2065 | 0.511 | 0.817 | 0.415 |

The Sound Absorption Coefficient measurements in Table 8 generally support the initial conclusions from the sound transmission screening measurements of Table 1. Caliper appears to be a stronger factor in sound absorption than density and basis weight, however if composition and caliper are held constant as in Examples 32, 33, and 37, there is a definite trend toward higher sound absorption at higher basis weight over the range of 750 to 1300 gsm. Airlaid pads are quite effective at absorbing sound at significantly lower density and basis weight than the control shoddy material in common usage. The samples most effective at absorbing sound were Examples 34-36. These airlaid samples were all 80/20 bleached cellulose fluff/bicomponent binder fiber, greater than 25 mm in thickness and 1200-1300 gsm basis weight. Light weight Examples 31-32 and heavy weight Example 38 outperformed the shoddy at 2500 Hz, but not at the lower frequency 1000 Hz. The strong impact of the latex coating alone on low frequency sound absorption is shown in going from Example 33 to Example 34. Table 8 illustrates that acoustic performance equal or better than the current shoddy materials can be obtained with airlaid materials at a considerable weight savings, which could translate into improved vehicle gas mileage.

Tables 9 and 10 compare the wood pulp/bicomponent fiber airlaid nonwoven test pads (Examples 39-41) with carded and needlepunched nonwovens prepared from polypropylene thermoplastic fibers and natural fibers other than wood pulp. The comparison information (Samples A-F) was found in the published conference papers of INDA (Association of the Nonwoven Fabrics Industry) for INJ (International Nonwovens Journal) Summer 2000, pp. 35-36, entitled "Performance of Nonwoven Cellulosic Composites For Automotive Interiors". Table 9 shows the physical properties of the samples and Table 10 compares the ASTM C-384 sound absorption coefficients expressed as percents where total sound absorbency at a given frequency would be 100 percent. Samples 39-41 are Working Examples 39-41 and were prepared on the laboratory scale pad-former and submitted for the Impedance Tube Sound Absorption Test ASTM E-1050-98. The same frequencies as used in the published article cited above were selected in order to have side-by-side comparison of different fibers. The test methods differ mainly in that C-384 uses a single movable microphone and E-1050-98 uses two microphones. For most purposes, the data may be used interchangeably.

TABLE 9

Cellulosic-based Nonwovens

| Sample | Material | Blend Ratio | Thickness (mm) | Weight (gsm) | Density (g/cc) |
|---|---|---|---|---|---|
| A | Flax/PP | 50:50 | 12 | 698 | 0.0580 |
| B | Jute/PP | 50:50 | 12 | 686 | 0.057 |
| C | Kenaff/PP | 50:50 | 12 | 670 | 0.056 |
| D | Cotton/PET/PP | 35:35:30 | 11 | 770 | 0.07 |

TABLE 9-continued

Cellulosic-based Nonwovens

| Sample | Material | Blend Ratio | Thickness (mm) | Weight (gsm) | Density (g/cc) |
|---|---|---|---|---|---|
| 39 | Pulp/Bico | 80:20 | 13 | 500 | 0.038 |
| 40 | Pulp/Bico/Latex | 66:17:17 | 31 | 706 | 0.023 |
| 41 | Pulp/Bico/Latex | 66:17:17 | 25 | 750 | 0.03 |

That the wood pulp bico fiber airlaid pads of the present invention are substantially lower density than the prior art materials prepared from other natural and synthetic fibers are very evident in Table 9.

TABLE 10

Absorption References for Noise Reduction by ASTM C-384 and E 1050-98

| Freq. (Hz) | Target (%) | A % | B % | C % | D % | 39% | 40% | 41% |
|---|---|---|---|---|---|---|---|---|
| 800 | 9 | 15 | 15 | 17 | 18 | 14 | 43 | 33 |
| 1000 | 16 | 20 | 20 | 20 | 25 | 18 | 46 | 41 |
| 1600 | 35 | 32 | 35 | 34 | 36 | 33 | 69 | 65 |
| 2000 | 51 | 53 | 66 | 63 | 52 | 54 | 71 | 77 |

Table 10 shows that the airlaid nonwoven test samples essentially meet or exceed the industry targets and the thicker samples 40 and 41, which also have a latex binder applied, outperform all the needlepunched fiber combinations. The airlaid process is ideal for yielding thick yet lightweight nonwovens. Thickness has been shown (Tables 1 and 3) to be directly proportional to sound absorption efficiency indicated by a lower LSST reading for thicker samples.

Example 42

Deep Draw Moldability

An airlaid product was placed into a mold to demonstrate moldability of a nonwoven material. A circular aluminum mold was machined. The 152.4 mm (6.0 in) circular aluminum mold top has a 69.85 mm (2.75 in) circular projection tapering over (0.875 in) to a diameter of 50.8 mm (2.0 in). The aluminum mold base is machined out to a depth of 25.4 mm (1.0 in) and has an initial diameter of 76.2 mm (3.0 in) tapering to 57.15 mm (2.25 in) at the bottom. All edges contacting the insulation material are rounded to a radius of 3.2 mm (0.125 in).

Deep-draw moldability of the airlaid insulation material of this invention was demonstrated by taking a 22 cm×30 cm piece of the 750 gsm pilot plant sample of 30/70 bico/fluff airlaid similar to that of Example 28, but which had been to 18.4 mm caliper, heating it in a convection oven set at 150° C.

for 5 minutes, and then quickly placing it on a cold (ambient) milled aluminum die base. The die top was positioned and a pressure of 4.7 kg/cm² was applied to deform the material into the mold. The 750 gsm 18.4 mm caliper airlaid material was pressed into the mold without tearing of either the airlaid web or the spunbond carrier slipsheet and with only minor wrinkling. The control shoddy (1640 gsm and 25 mm caliper) was heated for 10 minutes in the 150° C. convection oven and subjected to the same molding conditions. The shoddy itself tore on one side and the nonwoven slipsheet ruptured.

Example 43

Fire-Retardant Treated Airlaid Insulation Material

The laboratory handsheet apparatus was used to produce a 250 gsm airlaid pad which was 13 mm thick. The fiber composition used was 70 percent FOLEY FLUFFS® and 30 percent Trevira type T-255 number 1661 bicomponent binder fiber; To cure the bicomponent fiber, the pad was placed in a 150° C. convection oven for 15 minutes. The pad was cut into three samples 10.2 cm×35.5 cm (4 in×14 inches). Each test strip was sprayed on each side with a 40 percent solids solution of fire-retardant additive SPARTAN™ AR 295, a diammonium phosphate based flame retardant from Spartan Flame Retardants, Inc. of Crystal Lake, Ill. to a wet add-on of 5-10 gsm and placed in the 150° C. convection oven for a drying time of 1.0 minute. When tested for horizontal burning under the conditions of FMVSS-302, the samples burned for 50 seconds before self-extinguishing and the flame front traveled 64 mm (2.5 inches). To pass the horizontal burn test, the maximum burn rate is 101 mm/min over a maximum distance of 254 mm.

FMVSS 302 is the Federal Motor Vehicle Safety Standard No. 302 of the Department of Transportation, Flammability of Interior Materials: Passenger Cars, Multipurpose Passenger Vehicles, Trucks, and Buses Sep. 1, 1972. This standard specifies burn resistance requirements for materials used in the occupant compartments of motor vehicles. Its purpose is to reduce deaths and injuries to motor vehicle occupants caused by vehicle fires, especially those originating in the interior of the vehicle from sources such as matches or cigarettes.

Example 44

Fire-Retardant and Binder Treated Airlaid Insulation Material

The laboratory handsheet apparatus was used to produce a 200 gsm airlaid pad which was 13 mm thick. The fiber composition used was 70 percent FOLEY FLUFFS® and 30 percent Trevira type T-255 number 1661 bicomponent binder fiber. The uncured 35.5 cm square pad (14 inch×14 inch) was placed over a vacuum box, and a 50/50 mixture of fire-retardant, SPARTAN AR295 at 25 percent solids, and Latex Binder, AirFlex 192 at 24.8 percent solids, was sprayed onto one surface of the structure. The chemical add-on was 5.3 grams wet solution. (approximately 10 gsm dry add on). The pad was cured at 150° C. for 15 minutes.

A 12-mesh screen, 50 mm wide×300 mm long was placed over the non-chemically treated top surface of the sample as a flame arrestor. Then, when tested for horizontal burning under the conditions of FMVSS-302, the sample burned for 30 seconds before self-extinguishing and the flame front traveled 38 mm (1.5 inches).

Example 45

Water Repellant Airlaid Insulation

FOLEY FLUFFS® dry lap (pulp sheet) was cut into strips measuring 51 mm×102 mm (2 inches×4 inches) and sprayed with 10 percent by weight add-on of an emulsion containing 5 percent silicone oil, MAGNASOFT® Extra Emulsion by GE Silicones of Friendly, W.Va. The damp pulp strips were immediately fed into the laboratory three-stage fluffer until enough fluff was collected to make a 200 gsm airlaid pad on the laboratory handsheet former. The composition of the airlaid was 80 percent treated pulp and 20 percent Trevira T-255 number 1661 bicomponent fiber. The pad was placed in a 150° C. convection oven for 15 minutes to cure the bicomponent binder fiber. To test for water repellency, 51 mm (2 inches) square samples were cut, weighed, and soaked overnight in a bath of water. A wire screen was placed over the samples to hold them under the surface of the water. Control samples made from untreated FOLEY FLUFFS® were similarly weighed and soaked. After 24 hours the samples were carefully removed from the water bath and allowed to drain until the drip frequency was only about one drop per minute. The wet weights were recorded and the water absorbency in g/g calculated as the wet weight minus the dry weight divided by the dry weight. The results were the averages of the measurements on five samples of each type. The airlaid pad made from untreated fluff pulp absorbed 32 g/g while the airlaid from silicone-treated fluff pulp absorbed only 0.68 g/g, displaying a high degree of water repellency.

Example 46

Thermal Insulation

Airlaid pads were formed in the laboratory handsheet apparatus from a blend of 80 percent FOLEY FLUFFS® cellulose fluff pulp and 20 percent bicomponent fiber, Trevira type 255 Lot 1661. The pads were placed in a platen press heated to 150° C. and shimmed to a gap of 25 mm. A thermocouple was inserted into the middle of the pad halfway between the two sides and halfway between the edges. The time for the middle of the pad to reach a temperature of 140° C. was recorded.

TABLE 11

| Basis weight (gsm) | Density (g/cc) | Time to 140° C. (minutes) | Time normalized to 0.038 g/cc | Time Normalized to 973 gsm |
|---|---|---|---|---|
| 506 | 0.02 | 5 | 9.5 | 9.6 |
| 735 | 0.029 | 7.5 | 9.8 | 9.9 |
| 973 | 0.038 | 12.5 | 12.5 | 12.5 |
| 1243 | 0.05 | 10 | 7.6 | 7.8 |
| 1539 | 0.062 | 17.5 | 10.7 | 11.1 |
| 1939 | 0.078 | 24 | 11.7 | 12.0 |

Table 11 illustrates that a heavier batt of insulation takes longer to reach the target temperature. When the differences in basis weight are removed by normalizing all the results to a basis weight of 973 gsm, the differences in heating rate are very small, approaching random variation around a constant.

Examples 47-50

Commercial Scale Airlaid Machine

Examples 47-50 shown in Table 12 were made on a 2.8-meter wide multi-head commercial scale airlaid machine. Although the type of airlaid machine is not critical to this invention or the pad embodiments, Examples 47-50 were made on a machine with Dan-Web style forming heads. The fluff/bico ratio was 75/25 by weight. The cellulose fiber was FOLEY FLUFFS® treated, from Buckeye Technologies Inc. The treated designation refers to an additive to lower the disintegration energy of the pulp sheet. The bicomponent fiber was 2.0 denier and 6 mm cut length Type T-255 with merge number 1661, made by Trevira GmbH of Bobingen, Germany. This type of bico fiber has a polyethylene sheath over a polyester core. The sound and thermal insulating webs were formed on a 20 gsm polyester spunbond carrier supplied by BBA Fiberweb of Nashville, Tenn.

After leaving the forming section, one side of the webs was sprayed with a mixture of sodium tetraborate and zinc pyrithrione to add fire retardancy and mildew resistance (7.5 gsm borax and 0.5 gsm zinc pyrithrione dry add-on) and subsequently sprayed with an ethylene-vinyl acetate type latex binder (AIRFLEX® 192 from Air Products and Chemicals 5.0 gsm dry add-on) to lock in surface fibers. After passage through an oven, the other side of the webs was similarly treated and dried in a second oven.

Table 12 shows that the higher the basis weight of the web, the higher is the final density. Acoustic performance improves with thickness as expected. NISA is Normal Incidence Sound Absorption according to Test Method ASTM E1050-98. RISA is Random Incidence Sound Absorption according to Test Method ASTM C423-02a with ASTM E795-00 Type "A" mounting and the scrim or carrier side facing the sound source. STL is Sound Transmission Loss according to Test Method SAE J1400-90 with a 20 ga. steel panel facing the sound source. Example 48 was also submitted for horizontal flammability test MVSS-302 and was found to have a burning rate of 48 mm/min which was well under the maximum allowed rate of 100 mm/min.

TABLE 12

Examples 47-50 - Commercial Scale Airlaid Machine Samples

| Example | Density (g/cc) | Caliper (mm) | Basis Weight (gsm) | NISA 1000 Hz | RISA NRC | STL-dB 2000 Hz |
|---|---|---|---|---|---|---|
| 47 | 0.026 | 9 | 230 | 0.109 | 0.30 | 37.4 |
| 48 | 0.030 | 17 | 510 | 0.231 | 0.50 | 39.3 |
| 49 | 0.038 | 20 | 760 | 0.339 | 0.60 | 41.0 |
| 50 | 0.038 | 28 | 1060 | 0.578 | 0.70 | 42.9 |

It is believed that the mechanism by which the airflow and conversely the airflow resistance of the airlaid structures of this invention is controlled in this airlaid process is that the small wood pulp fibers in the cellulose tissue trap or filter out droplets of the polymeric liquid binder thereby reducing the porosity of the tissue. This is illustrated in the following working examples where the airflow is significantly reduced by spraying an amount of liquid polymeric binder on the carrier side of the airlaid. The spray is drawn into and through the tissue by vacuum and capillary action. In addition to restricting the airflow through the tissue, the binder helps adhere the tissue to the airlaid.

Examples 51-64

Airlaid Structures

Fourteen airlaid structures were constructed using a laboratory pad-former that deposits individualized fibers onto a forming wire or nonwoven scrim or tissue carrier under vacuum. In this example, the resulting airlaid structure had a carrier tissue on one side. To form the airlaid structure, a single ply 18 gsm (grams per square meter) standard diaper carrier tissue of unknown maker was laid on the forming wire of the pad-former. The tissue is further characterized as having an airflow of 19.3 liters/sec (41 CFM), caliper of 0.07 mm, density of 0.254 g/cc, and MD tensile strength of 194 grams/cm with percent elongation of 19.25, and CD tensile strength of 111 grams/cm with elongation of 6.5 percent.

A 150 gsm airfelt was formed on the tissue in four increments of 3.65 grams cellulose fluff and 1.56 grams of bicomponent fiber. The pad was turned 90° after each addition to minimize formation irregularities. The composition of the airfelt was 70 percent cellulose fibers, available as FOLEY FLUFFS® LE+ from Buckeye Technologies Inc., Memphis, Tenn., and 30 percent bicomponent binder fiber or bico fiber, Type T-255 2.0 denier and 6 mm length. The airfelt and tissue were transferred to a cold laboratory press and compacted to about 0.05 g/cc density. The consolidated airlaid structure which measured 35.56 cm by 35.56 cm (14 inches by 14 inches) was trimmed to 30.5 by 35.56 cm (12 inches by 14 inches) and was placed in a heated (160° C.) laboratory press shimmed out to give a density range of 0.08-0.13 g/cc. The pads were held in the heated press for 15 minutes to fuse the bicomponent fiber. The airlaid structure was cut into four 15.24 cm (6 inch) squares. The airflow was measured on the untreated pads. The square samples were placed tissue side up on a vacuum box which had a 20 mesh stainless steel screen, and which was connected to the suction side of a 6.5 horsepower wet/dry vacuum cleaner. The tissue sides of the pads were sprayed with various polymeric binders and dried for 10 minutes in a 105-110° C. convection oven. The dry samples were weighed to calculate the actual add-on and measured for caliper (thickness) to calculate the density. The airflow after treatment was then measured.

Examples 51 through 60 were formed on a standard cellulosic tissue of about 20 gsm. Examples 61 and 62 were formed on Shawano Tissue product 3528, an 18 gsm reduced permeability tissue supplied by Shawano Specialty Paper of Shawano, Wis. Examples 63 and 64 were formed on Cellu Tissue 3205FQP, a 17 gsm reduced permeability tissue from Cellu Tissue Holdings Inc. of East Hartford, Conn. The percent solids of the binder may influence the permeability of the resulting composite. For example, in Example 63, the binder was sprayed at 15 percent solids and 34 gsm add-on produced an air flow of 13.6 liters/sec, while in Example 64 giving just 4.8 liters/sec for 33 gsm add-on the percent solids of the binder was 19.7 percent.

As also shown in Table 13, the measured airflow values through the pairs of similarly prepared and treated composites dropped when the amount of binder applied to the tissue sides was increased. The effect is not particularly dependent on the type of binder, as several different emulsion polymers and even a solution polymer (the polyvinyl alcohol) were effective in reducing the airflow. In general, tissue/airlaid composites with lower initial airflow required less binder to further reduce the airflow.

The binders used in this set of working examples are described as follows: AIRFLEX®-192 an ethylene vinyl acetate copolymer and VINAC® DP912 a vinyl acetate polymer by Air Products Polymers, L. P. of Allentown, Pa.; TYLAC® 873 carboxylated acrylonitrile-butadiene resin by Dow-Reichhold Specialty Latex LLC of Research Triangle Park, N.C.; and DUR-O-SET® 24-351A ethylene vinyl acetate and CELVOL® 24-203 poly(vinyl alcohol) by Celanese (formerly National Starch and Chemical) of Bridgewater, N.J. The MKS Rayls expression of airflow resistance was calculated from the measured airflow.

A pressure of approximately 0.809 kilograms-force/cm2 (11.5 psi) was applied for 45 seconds to bond the samples together. Each sample was die-cut into three strips each 25.4 mm by 102 mm (1.0 by 4.0 inch).

The strength of the bond (treated airlaid side to untreated carrier side) was measured by pulling the layers apart using a tensile tester (Twing-Albert Model QC1000) and a crosshead speed of 110 mm/min. The force needed to de-laminate the samples at the point of adhesion increased with the percent add-on of adhesive binders over the range studied. Examples 65 to 69 demonstrate that the airlaid acoustic absorbent of this

TABLE 13

Controlled Airflow

| Ex. | Tissue | Initial Airflow (liters/s) | Binder | Add-on (gsm) | Caliper (mm) | Basis Wt. gsm | Density g/cc | Final Airflow (liters/s) | Rayls N-S/m³ |
|---|---|---|---|---|---|---|---|---|---|
| 51 | Std. | 20.0 | AIRFLEX ® | 16.7 | 1.81 | 196 | 0.11 | 6.0 | 1915 |
| 52 | Std. | 15.0 | AIRFLEX ® | 13.9 | 1.94 | 198 | 0.10 | 9.9 | 1167 |
| 53 | Std. | 19.6 | TYLAC ® | 18.6 | 2.37 | 195 | 0.08 | 1.8 | 6452 |
| 54 | Std. | 15.4 | TYLAC ® | 15.7 | 1.54 | 204 | 0.13 | 4.4 | 2636 |
| 55 | Std. | 19.0 | VINAC ® | 17.9 | 2.37 | 199 | 0.08 | 3.0 | 3831 |
| 56 | Std. | 15.8 | VINAC ® | 15.4 | 1.61 | 201 | 0.12 | 4.2 | 2724 |
| 57 | Std. | 16.5 | 25-351A | 14.3 | 1.78 | 195 | 0.11 | 8.3 | 1393 |
| 58 | Std. | 16.1 | 25-351A | 7.12 | 1.80 | 181 | 0.10 | 13.3 | 872 |
| 59 | Std. | 16.5 | CELVOL ® | 13.7 | 1.97 | 183 | 0.09 | 2.5 | 4540 |
| 60 | Std. | 16.2 | CELVOL ® | 6.8 | 1.82 | 190 | 0.10 | 8.7 | 1332 |
| 61 | Sh | — | AIRFLEX ® | 11 | 3.0 | 139 | 0.05 | 10.3 | 1150 |
| 62 | Sh | 19.5 | AIRFLEX ® | 23 | 3.0 | 183 | 0.06 | 3.0 | 3890 |
| 63 | CT | 59.6 | AIRFLEX ® | 34 | 3 | 160 | 0.06 | 13.6 | 850 |
| 64 | CT | — | AIRFLEX ® | 33 | 3.2 | 163 | 0.05 | 4.8 | 2400 |

Examples 65-69

Laminating Adhesive Layer

A 12.5 mm thick 420 gsm airlaid pad with a fluff/bico ratio of 75/25 and having 5 gsm of latex binder sprayed on each side was formed on a 20 gsm polyester spunbond scrim on a 2.8-meter wide multi-head commercial scale Dan-Web style airlaid machine. The cellulose fiber was FOLEY FLUFFS® treated, from Buckeye Technologies, Inc. The treated designation refers to an additive to lower the disintegration energy of the pulp sheet. The bicomponent fiber was Trevira 1661 Type 255 2.0 dpf and 6 mm length. The polyester spunbond carrier was supplied by BBA Fiberweb of Nashville, Tenn.

The composite airlaid pad had a basis weight of about 420 gsm, including the polyester spunbond scrim. The pad was treated on the side opposite the scrim with different amounts of various non-crosslinking and thermoplastic latex binders. After drying in a 150° C. oven for 5 minutes, the samples or pad was cut into 102 mm by 102 mm (4 inch) squares to form different test samples. The samples were then placed in a 172° C. oven along with an untreated sample for 2 minutes. The hot samples were pressed together with the scrim side of the untreated sample toward the treated side of the other sample.

invention can bond to a dissimilar material under heat and pressure such as might be employed in assembling a carpet and padding for an automobile. As shown in Table 14, the glass transition temperature of the adhesive was not a factor in bond strength. However, having some vinyl acetate in the polymer backbone appeared to contribute to stronger adhesion of the treated airlaid side of the composite to the untreated scrim side, at least with the Air Products binders.

The binders used in this set of working examples are described as follows:

25-351A=DURO-SET® 351A—an ethylene-vinyl acetate latex from Celanese;

25-44011=NACRYLIC® 4401—an acrylic latex from Celanese;

AF4500=AIRFLEX® 4500—an ethylene-vinyl chloride latex from Air Products Polymers L.P.;

AF410=AIRFLEX® 410—an ethylene-vinyl acetate latex from Air Products Polymers L.P.; and EF9100=VINAC® 9100—a vinyl acetate latex from Air Products Polymers L.P.

TABLE 14

Examples 65-69 - Thermoplastic Adhesives

| Example | Binder Code | Binder Type | Binder Tg ° C. | Delaminating Strength in Grams at Varying Binder Add-on | | | | |
|---|---|---|---|---|---|---|---|---|
| | | | | 5 gsm | 10 gsm | 15 gsm | 20 gsm | 25 gsm |
| 65 | 25-351A | EVA | 0 | 97 | 108 | 112 | 151 | 142 |
| 66 | 25-4401 | Acrylic | −23 | 80 | 95 | 93 | 112 | 156 |

TABLE 14-continued

Examples 65-69 - Thermoplastic Adhesives

| Example | Binder Code | Binder Type | Binder Tg ° C. | Delaminating Strength in Grams at Varying Binder Add-on | | | | |
|---|---|---|---|---|---|---|---|---|
| | | | | 5 gsm | 10 gsm | 15 gsm | 20 gsm | 25 gsm |
| 67 | AF4500 | EVCl | 3 | 59.3 | 87.3 | 121.3 | 131.3 | 164.7 |
| 68 | AF410 | EVA | 4 | 68.3 | 102.3 | 138.7 | 173.3 | 220.3 |
| 69 | EF9100 | Vac | −30 | 78 | 112 | 162 | 248 | 352 |

Examples 70-77

Stiff Composites

The same 420 gsm airlaid pad produced on the commercial airlaid machine for the previous examples was compressed to 6 mm thickness in a 160° C. heated press for 10 minutes, allowed to cool to room temperature, and then was sprayed one side at a time with approximately 25 percent solids latex binder to an add-on of 15 gsm (solids basis) and then dried in a 172° C. oven for 15 minutes. After both sides were treated, the caliper was reset to 6 mm by 5 minutes in the 160° C. heated press. The cooled composites with density of 0.06 g/cc were cut into strips 50.8 mm by 254 mm (2 by 10 inches) and tested in the Model QC100 Twing-Albert Tensile Tester in Compression to Distance mode using a 100N load cell with the sample support rods spaced 200 mm apart and the carrier side up. The work was repeated beginning with a 780 gsm airlaid having an initial thickness of 21 mm to yield composites having density of 0.13 g/cc. A 500 N load cell was needed in the Twing-Albert for the denser samples.

The binders were supplied as follows:

RHOPLEX® line of acrylic binders by Rohm & Haas Chemicals, LLC of Charlotte, N.C.;

TYLAC® (carboxylated styrene-butadiene-acrylonitrile copolymer) from Dow Reichhold Specialty latex LLC of Research Triangle Park, N.C.; and ROVENE® (carboxylated styrene-butadiene rubber) from Mallard Creek Polymers, Inc. of Charlotte, N.C.

TABLE 15

Composite Stiffness

Grams of Deflection Resistance vs. Density

| Example | Sample | 0.07 g/cc | 0.13 g/cc |
|---|---|---|---|
| 70 | Control no carrier | 62.2 | 323.6 |
| 71 | Control | 88.7 | 371.8 |
| 72 | Rhoplex ® ECO 4015 | 115.1 | 431 |
| 73 | Tylac ® 68957-000 | 116.7 | 426.3 |
| 74 | Rhoplex ® GL-720 | 126.0 | 454.3 |
| 75 | Rovene ® RX 50660-18 | 127.6 | 553.9 |
| 76 | Rhoplex ® TR 407/GL 720 | 140.0 | 449.6 |
| 77 | Rhoplex ® GL-730 | 143.1 | 431 |

What is apparent from the data in Table 15 is that different binders are more suited for different densities of airlaid pads. The stiffest binders for the low density composite were the RHOPLEX® GL-720 and the blend of RHOPLEX® TR 407 and GL-720. With the 0.13 g/cc sample series, the binder yielding the stiffest sample was ROVENE® RX 50660-18. The others were essentially comparable.

Example 78

Basic Airlaid Structure for Scrim

An airlaid structure was constructed using a laboratory pad-former that deposits individualized fibers on a forming wire or nonwoven scrim carrier under vacuum. The resulting airlaid structure has a scrim on one side and an airfelt pad on the other. In the following examples, the forming wire was masked off to an area of 25.4 cm (10 inches) by 35.56 cm (14 inches). To form the airlaid structure, a 17 gsm (grams per square meter) polypropylene nonwoven scrim, which was a spunbond-meltblown-spunbond (SMS) type 350939 made by BBA Fiberweb of Old Hickory, Tenn., was laid on the forming wire of the pad-former. A 100 gsm airfelt base pad was formed on the scrim in four increments of 1.92 grams cellulose fluff and 0.34 grams of bicomponent fiber, turning the pad 90° after each addition to minimize formation irregularities. The composition of the airfelt was 85 percent cellulose fibers, available as FOLEY FLUFFS® from Buckeye Technologies Inc., and 15 percent bicomponent binder fiber or bico fiber, Type T-255 with merge number 1661, which had a 2.0 denier and 6 mm length, made by Trevira GmbH of Bobingen, Germany, and which had a polyethylene sheath over a polypropylene core.

The airfelt material and scrim were carefully transferred to a cold laboratory press and compacted to about 2 mm thickness. The consolidated airlaid structure was placed scrim-side down over a vacuum box which had a 20 mesh stainless steel screen, and which was connected to the suction side of a 6.5 horsepower wet/dry vacuum cleaner. The airfelt side of the entire pad was sprayed with 1.75 grams of a 24.96 percent solution of sodium tetraborate decahydrate from U.S. Borax Inc. of Valencia, Calif., and then sprayed again with 4.08 grams of a 9.65 percent solids aqueous ethylene vinyl acetate (EVA) latex, AIRFLEX® 192 made by Air Products Polymers L.P. The airlaid structure was then dried for 5 minutes in a 105° C. convection oven. The calculated add-on levels were 4.83 gsm borax and 4.36 gsm latex binder.

Example 79

Airlaid Structure with 793 Rayls (N-S/m$^3$) Airflow Resistance

The basic airlaid structure formed in Example 1 was cut into two pieces each trimmed to 16.5 by 25.4 cm (6.5 by 10 inches). The first piece was sprayed on the SMS scrim side with 2.56 grams of the 24.96 percent solution of sodium tetraborate decahydrate and with 2.49 grams of the 9.65 percent dispersion of AIRFLEX® 192. The airlaid structure was then transferred to a laboratory press preheated to 160° C. The press was shimmed to about 1.5 mm and closed on the pad with a pressure of 12,410 Kilopascals (1800 psi) for 10 minutes. This served to evaporate the water and then to melt the sheath of the bicomponent binder fiber and thereby stabilize the airlaid structure. This airlaid structure had a final weight of 6.05 grams, a basis weight of 144.3 gsm, a thickness of 1.67 mm and a density of 0.086 g/cc.

The airflow of the airlaid structure was measured. Measurements were taken using a self-calibrating Permtest Model MK4 portable tester made by Metso Paper Inc. of Turku, Finland. To take a reading, the sample was placed on a test stand, which was a highly perforated 20 cm$^2$ steel plate raised 25 mm from the surface of a table and having approximately 90 percent open area. Three readings were taken and the results averaged. The instrument had an operating range of 0.9-410 liters/sec (2-870 cfm). It was found that the pad or airlaid structure had an airflow of 14.6 liters/sec (30.9 cfm) corresponding to airflow resistance of 793 NS/m$^3$ Rayls.

Example 80

Airlaid Structure with 1817 Rayls Airflow Resistance

Another 16.5 by 25.4 cm (6.5 by 10 inches) piece of the basic airlaid structure was sprayed on the SMS scrim side with 2.88 grams of the 24.93 percent solution of borax and 4.83 grams of 9.65 percent AIRFLEX® 192 latex binder. The airlaid structure was dried and cured at 160° C. for 10 minutes as before to give a dry add-on of 17.14 gsm borax and 11.11 gsm latex binder. The final structure weighed 6.3 grams and had a basis weight 150.2 gsm, a thickness of 1.77 mm, a density of 0.085 g/cc, and exhibited airflow of 6.4 liters/sec (13.6 cfm) or 1817 Rayls airflow resistance.

Example 81

Airlaid Structure with 9806 Rayls Airflow Resistance

In this example, a 17 gsm SMMS (spunbond-meltblown-meltblown-spunbond) scrim from Avgol Nonwoven Industries, Tel Aviv, Israel was used as the carrier sheet and an airlaid structure was formed thereon in four stages as in the previous examples. The airfelt had a basis weight of 100 gsm and was made of 85 gsm of FOLEY FLUFFS® and 15 gsm Type T-255 bico. The forming wire was masked off to an area which was 30.5×33 cm (12×13 inches) and the airlaid structure that was formed weighed 12.45 grams and had a basis weight of 124 gsm. The composite structure or pad was placed on the vacuum box with the scrim side down. The open airfelt side was sprayed with 3.62 grams of a 25 percent solution of borax, followed by 2.06 grams of 25 percent AIRFLEX® 192. It was then dried for 5 minutes in the 105° C. convection oven. The add-ons were calculated to be 11.8 gsm borax and 5.1 gsm latex. The airlaid structure was turned over, returned to the vacuum box, and the SMMS side sprayed with 2.91 grams of the borax solution and 9.6 grams of the latex. After drying and curing in the heated press, the borax add-on to the scrim side was 9.5 gsm and the latex add-on was 23.8 gsm. The final airlaid structure weighed 18.8 grams and had a basis weight of 187 gsm, a thickness 1.73 mm, and a density 0.108 g/cc.

The air flow of this airlaid structure was also measured. It was found that the air flow was 1.18 liters/sec (2.5 cfm), corresponding to 9806 Rayls airflow resistance.

Example 82

Fire-Retardant Two Sided Treatment

Using the laboratory handsheet former described above, airlaid handsheets containing 80 percent cellulose fluff from comminuted FFLE+ and 20 percent Trevira 1661 bico fiber were formed at a basis weight of 300 gsm and cured at 150° C. in a heated laboratory press shimmed to a thickness of 6.0 mm to produce handsheets with a density of 0.05 g/cc. The handsheets were then cut into 10 cm×10 cm (4 inch×4 inch) samples, weighed, and sprayed evenly on both sides with a 42 percent solution of ammonium polyphosphate (GLO-TARD FFR2) at varied add-on levels. The samples were dried in an oven for one hour at 125° C. and reweighed. The handsheets were then subjected to the Fire Barrier Test described above wherein the burner was centered under the sample holder. The time until flame penetration of the sample was recorded. Untreated material caught on fire quickly and was burned through in less than 10 seconds. See Table 16.

TABLE 16

| Sample | Original wt. (grams) | Treated wt. (grams) | Per Side Add-on (percent) | Per Side Add-on (gsm) | Burn Through, (minutes) |
|---|---|---|---|---|---|
| Control | 4.00 | 4.00 | 0.0 | 0.0 | <0.16 |
| 1A | 3.96 | 4.07 | 1.4 | 4.2 | 6.25 |
| 1B | 4.17 | 4.38 | 2.5 | 7.5 | 11.1 |
| 1C | 3.62 | 3.84 | 3.05 | 9.2 | >15 |

The effect of fire-retardant loading is clearly shown in Sample 1B where the higher the ammonium polyphosphate add-on, the longer the sample can tolerate the flame before strike-through occurs.

Example 83

Fire-retardant One Sided Treatment of FOLEY FLUFFS®

300 gsm handsheets containing 80 percent FOLEY FLUFFS® and 20 percent Trevira 1661 bico fiber were made in the laboratory handsheet former and fixed to a density of 0.05 g/cc using the procedure of Example 82. In Example 83, however, the handsheets were only sprayed on one side with the ammonium polyphosphate dispersion (GLO-TARD FFR2) and subjected to the Fire Barrier Test with the treated side toward the flame.

TABLE 17

| Sample | Original wt. (grams) | Treated wt. (grams) | Add-on (percent) | Add-on (gsm) | Burn Through, (minutes) |
|---|---|---|---|---|---|
| Control | 4.00 | 4.00 | 0.0 | 0.0 | <0.16 |
| 2A | 4.11 | 4.19 | 1.9 | 5.7 | 10.4 |
| 2B | 3.85 | 3.95 | 2.6 | 7.8 | 14.3 |
| 2C | 3.78 | 3.91 | 3.4 | 10.2 | >15 |

A hole appeared in the center of Sample 2A exposed to the flame after 10.4 minutes of exposure to the open flame of the burner and the test was halted. See Table 17. As demonstrated by Samples 2B and 2C, the higher the loading of ammonium polyphosphate, the longer the airlaid sample can withstand the open flame before a hole is burned through to the foam layer. Comparing the burn times of Example 82, Sample 1C (double-sided fire-retardant treatment) to Example 83, Sample 2B (single-sided fire-retardant treatment), it appears that concentrating the fire-retardant on the side toward the flame has the effect of a higher overall loading and increases the time before burn-through occurs. It is more efficient to only treat the side which will be toward the flame.

Example 84

Fire-Retardant One Sided Treatment of FFLE+

300 gsm handsheets containing 80 percent FFLE+ as the fluff pulp and 20 percent Trevira 1661 bico fiber were made and cured to a density of 0.05 g/cc using the procedure of Example 82. In this example, the handsheets were only sprayed on one side with the ammonium polyphosphate dispersion (GLO-TARD FFR2) and tested in the Fire Barrier Test with the treated side toward the flame.

TABLE 18

| Sample | Original wt. (grams) | Treated wt. (grams) | Add-on (percent) | Add-on (gsm) | Burn Through, (minutes) |
| --- | --- | --- | --- | --- | --- |
| Control | 4.00 | 4.00 | 0.0 | 0.0 | <0.16 |
| 3A | 4.66 | 4.75 | 1.9 | 5.7 | 8.8 |
| 3B | 3.56 | 3.65 | 2.5 | 7.5 | 13.7 |
| 3C | 3.88 | 4.04 | 4.1 | 12.3 | >15 |

With Sample 3A the open flame burned a hole through the airlaid layer in 8.8 minutes and the test was halted. See Table 18. Sample 3B developed a hole after nearly 14 minutes in the flame and Sample 3C did not develop a hole and the test was stopped after 15 minutes.

Examples 83 and 84 show that both the regular and the debonder treated pulps can be made into fire barriers. Only one side, the side toward the flame, has to be treated for the airlaid to become an effective fire barrier. For materials with basis weights of about 300 gsm, the minimum loading of GLO-TARD-FFR2 to ensure that there is no burn through of the sample in the 15 minute test is about 4 percent by weight based on the weight of the untreated handsheet material.

Example 85

Semi-Durable Fire-Retardant Treatment 150 gsm handsheets containing 80 percent FFLE+ and 20 percent Trevira 1661 bico fiber were made and cured to a density of 0.05 g/cc using the procedure of Example 82. The handsheet was sprayed on one side with a mixture of the ammonium polyphosphate dispersion (GLO-TARD FFR2) and an ethylene vinyl acetate latex, AirFlex® 192, such that after drying for one hour at 105° C. the handsheet was 7.5 gsm in latex polymer and 15 gsm in fire-retardant. The dry handsheet was placed on a test stand and a vertical 6 cm diameter by 6 cm high permeability column was placed in the center of the handsheet. 500 ml of water was then poured slowly through the handsheet.

After drying overnight, the handsheet was subjected to the Fire Barrier Test and found to withstand the flame for 2.2 minutes. See Table 19.

TABLE 19

| Example | Durable Treatment (gsm) | Flushed 500 ml | Burn Time (Minutes) |
| --- | --- | --- | --- |
| Comparative 1 | none | yes | 0.17 |
| 4 | EVA 7.5 | yes | 2.2 |
| 11A | EVCl 15 | | >15 |
| 11B | EVCl 15 | yes | 3.2 |
| 5 | Boz A-silox 10 | yes | 13.2 |

A control handsheet treated with the mixture of the ammonium polyphosphate dispersion (GLO-TARD FFR2), but without the latex binder, and similarly flushed with water burned through in less than 10 seconds, so the presence of the latex significantly improved the retention of fire-retardant properties.

Example 86

Durable Fire-Retardant Treatment 150 gsm handsheets containing 80 percent debonder-treated wood pulp (FFLE+) and 20 percent Trevira 1661 bico fiber were made and cured to a density of 0.05 g/cc using the procedure of Example 1. The handsheet was sprayed on one side with the ammonium polyphosphate dispersion (GLO-TARD FFR2) and then sprayed with an amino-siloxane waterproofing agent containing 15 percent latex solids of Tallopol SK81. After drying for one hour at 105° C., the handsheet was 10 gsm in amino-siloxane and 15 gsm in fire-retardant. The dry handsheet was placed on a test stand and a vertical 6 cm diameter by 6 cm high permeability column was placed in the center of the handsheet. 500 ml of water was then poured slowly through the handsheet.

After drying for 3 hours at 105° C., the handsheet was subjected to the Fire Barrier Test. The handsheet was found to withstand the flame for 13.2 minutes. The application of the waterproofing agent enabled the water-washed treated handsheet to retain 75 percent of its original fire-retardant property, evidence of a very extraction-retardant fire-retardant treatment.

Example 87

Borax Pre-Treated Cellulose Fiber

Strips of a FFLE+ cellulose wood pulp sheet 25.4 mm by 101.6 mm (1 inch by 4 inch) were treated with a warm 20 percent solids solution of sodium tetraborate decahydrate to calculated dry add-on levels of 2.5 percent and 5.0 percent. After weighing to determine the actual add-on, the strips were run through the laboratory comminution device, which is a three stage fluffer, and collected. The treated cellulose fluff was then blown into a 150 gsm airlaid handsheet which was 20 percent by weight of bicomponent fiber Type 1661. The handsheets were set to a density of 0.03-0.04 g/cc by being held for 15 minutes in a laboratory press heated to 140° C. The airlaid handsheets were then cut to 101.6 mm² (4 inch square) samples and subjected to the Fire Barrier Test described above.

The 2.5 percent borax treated sample 6A withstood 14.2 minutes of the open flame before a hole opened up in the airlaid layer exposing the foam to the direct flame of the burner. The sample 6B formed from 5 percent borax treated fiber withstood the full 15 minutes of flame without burning a hole into the foam.

Example 88

Borax Pre-Treated Cellulose Fiber Leached with Water

A 101.6 mm$^2$ at 150 gsm of the 5 percent borax-treated airlaid sample from Example 87 was leached with 500 ml of distilled water poured through a 6.0 cm diameter column centered on the sample. The handsheet was then dried for 1.5 hours in a 105° C. convection oven.

TABLE 20

| Example | Borax (gsm) | Anti-leach Treatment (gsm) | Pre or Post Treatment | Flushed 500 ml | Burn Time (minutes) |
|---|---|---|---|---|---|
| 6A | 3 | no | Pre-pulp | | 14.2. |
| 6B | 6 | no | Pre-pulp | | >15 |
| 7 | 6 | no | Pre-pulp | yes | 4.25. |
| 8 | 6 | Boz A-silox 4.5 | Pre-pulp | yes | 7.25 |

The 5 percent borax sample withstood 4.25 minutes of the open flame in the Fire Barrier Test, indicating that some of the borax remained in or on the fiber. See Table 20. If all the borax had been extracted, the sample would have burned through in 10 seconds or less.

Example 89

Borax Pre-Treated Cellulose Fiber Post-Treated with Water-Repellent and Leached with Water

101.6 mm square at 150 gsm 5 percent borax-treated samples from Example 87 was sprayed with siloxane dispersions to an add-on of 3 percent by weight siloxane. One sample was treated with Dow Corning 2-8630 Polymer and another sample was treated with Bozzeto Tallopol SK81. The Dow Corning siloxane came as a viscous liquid and was dispersed at 15 percent actives in very dilute phosphoric acid using an ethoxylated alcohol suspending agent, Witconol TD-100. The Tallopol came as a dispersion requiring only dilution with water to 15 percent actives. The treated samples were leached as in Example 88 with 500 ml of distilled water and then dried for 1.5 hours in a 105° C. convection oven.

The leached 3 percent Dow Corning 2-8630 sample withstood 4.75 minutes of the open flame of the Fire Barrier Screening Test described above, before a hole appeared in the airlaid. Since untreated airlaid is breached in 10 seconds or less, that the sample held for nearly 5 minutes indicated that some of the borax remained in or on the fiber. The leached 3 percent Tallopol sample withstood 7.25 minutes of the open flame before the Fire Barrier Test was terminated when a hole developed in the barrier.

Example 90

Ammonium Polyphosphate Pre-Treated Cellulose Fiber

Strips of FFLE+ cellulose wood pulp sheet 25.4 mm by 101.6 mm (1 inch by 4 inch) were treated with a 20 percent solids solution of GLO-TARD® FFR2 to calculated dry add-on levels of 2.5 percent and 5.0 percent. After weighing to determine the actual add-on, the strips were run through the laboratory comminution device, which is a three stage fluffer, and collected. The treated cellulose fluff was then blown into a 150 gsm airlaid handsheet which was 20 percent by weight of bicomponent fiber Type 1661. The handsheet samples were set to a density of 0.03-0.04 g/cc by being held for 15 minutes in a laboratory press heated to 140° C. The handsheets were then cut to 101.6 mm squares (4 inch squares) and subjected to the Fire Barrier Test described above.

TABLE 21

| Example | APP (gsm) | Waterproof agent (gsm) | Flush 500 ml | Burn Time (Minutes) |
|---|---|---|---|---|
| 9A | 3.75 | no | | 11.5 |
| 9B | 7.5 | no | | 8.6 |
| 10A | 15 | DC A-silox 4.5 | yes | >15. |
| 10B | 15 | Boz A-silox 4.5 | yes | >15 |

The 2.5 percent FR treated sample 9A withstood 11.5 minutes of the open flame before forming a hole and the 5 percent FR treated sample 9B withstood 8.6 minutes of flame. See Table 21.

Example 91

Ammonium Polyphosphate Pre-treated Cellulose Fiber Post-Treated with Water-Repellent and Leached with Water

As in Example 90, the pulp strips were treated with a 20 percent solution of GLO-TARD® FFR2, but in this example to an add-on level of 10 percent by weight pulp. An airlaid handsheet of 80 weight percent fluff and 20 weight percent bico with a basis weight of 150 gsm was prepared as in Example 90 and 101.6 mm squares were treated with each of the two amino-siloxanes used in Example 89 and then subjected to the 500 ml leaching step followed by redrying and Fire Barrier testing.

Both leached siloxane-treated samples withstood the full 15 minutes of open flame without breakthrough to the foam. This is evidence that waterproofing agents protect the soluble ammonium polyphosphate from being washed off and out of an airlaid fire barrier formed by treating the original pulp sheet with fire-retardant just prior to comminution into fluff pulp, mixing with bicomponent binder fiber, and forming the airlaid handsheet.

Example 92

Ammonium Polyphosphate Pre-Treated Cellulose Fiber Post-Treated with Latex Water-Repellent and Leached with Water

As in Example 90, the pulp strips were treated with a 20 percent solution of GLO-TARD® FFR2, but in this example to an add-on level of 10 percent by weight of pulp. An airlaid handsheet of 80 weight percent fluff and 20 weight percent bico with a basis weight of 150 gsm was prepared as in example 9 and 101.6 mm squares were treated with AirFlex® 4530 at an add-on rate of 15 gsm latex solids and then dried in an 85 C convection oven for 45 minutes. One of the sample squares was subjected to the 500 ml leaching step followed by redrying and Fire Barrier testing.

The un-bleached latex-treated sample 11A withstood the full 15 minutes of open flame without breakthrough to the foam. However, the leached sample 11B suffered a breaching of the barrier after 3.2 minutes. This is evidence that an effective amount of the soluble ammonium polyphosphate stayed on the pulp fibers throughout the leaching step.

Example 93

Phosphate Ester Pre-Treated Cellulose Fiber

Strips of a FFLE+ cellulose wood pulp sheet 25.4 mm by 101.6 mm (1 inch by 4 inch) were treated with a 20 percent solids solution of Fire Retard 3496 to calculated dry add-on levels of 2.5 percent and 5.0 percent. After weighing to determine the actual add-on, the strips were run through the laboratory comminution device, which is a three stage fluffer, and collected. The treated cellulose fluff was then blown into a 150 gsm airlaid handsheet which was 20 percent by weight of bicomponent fiber Type 1661. The handsheets were set to a density of 0.03-0.04 g/cc by being held for 15 minutes in a laboratory press heated to 140° C. The handsheets were then cut to 101.6 mm square (4 inch square) samples and subjected to the Fire Barrier Test described above.

TABLE 22

| Example | Phos-E (gsm) | Waterproof agent (gsm) | Flush 500 ml | Burn Time (Minutes) |
|---|---|---|---|---|
| 12A | 3.75 | no | | 3.0 |
| 12A | 7.5 | no | | 10.8 |
| 13 | 15 | DC A-silox 4.5 | yes | 7.5 |

The 2.5 percent Fire Retard treated sample 12A withstood 3.0 minutes of the open flame and the 5 percent Fire Retard treated sample 12B withstood 10.8 minutes of flame before the flame breached the barrier. See Table 22.

Example 94

Phosphate Ester Pre-Treated Cellulose Fiber Post-Treated with Water-Repellent and Leached with Water As in Example 93, pulp strips were treated with a 20 percent solution of Fire Retard® 3496 but to an add-on level of 10 percent by weight fluff. An airlaid handsheet of 80 weight percent fluff and 20 weight percent bico and 150 gsm was prepared as in Example 90 and 101.6 mm squares were treated with the Dow 2-8630 siloxane used in Example 89 and then subjected to the 500 ml leaching step followed by redrying and the Fire Barrier Test.

The leached siloxane-treated sample withstood 7.5 minutes of open flame before breakthrough to the foam.

Example 95

Inherently Fire-Retardant Melamine Fiber Structure 50 mm cut length Basolfil Merge 80 Melamine fiber was cut with scissors to about 12 mm in length in order to better process through the airlaid handsheet former. An airlaid handsheet with a basis weight of 150 gsm was formed in the laboratory-scale airlaid handsheet former using 80 percent Basofil Melamine Fiber Merge 80 and 20 percent Type 1661 bico fiber. After compressing and curing, a 101.6 mm square sample was cut and mounted in the Fire Barrier Test apparatus and subjected to the flame of the Bunsen burner for 15 minutes. The sample was not consumed by the flames and merely turned black. A thermocouple inserted between the airlaid and the urethane foam showed a maximum temperature of about 300° C. The urethane foam was not burned, indicating that the airlaid was a good thermal insulator in addition to being a flame barrier.

Example 96

Inherently Fire-Retardant Melamine Fiber Layer on Airlaid Structure 50 mm cut length Basolfil Merge 80 Melamine fiber was cut with scissors to about 12 mm in length in order to better process through the airlaid handsheet apparatus An airlaid handsheet with a basis weight of 150 gsm was formed in the airlaid handsheet former having a 50 gsm layer of 80 percent Basofil Melamine Fiber Merge 80 and 20 percent Type 1661 bico fiber under a 100 gsm layer of 80 percent FFLE+ and 20 percent type 1661 bicomponent fiber. After compressing and curing, a 101.6 mm square sample was cut and mounted in the Fire Barrier Screening Test apparatus with the Basofil layer toward the flame of the Bunsen burner. The layer acted as a flame barrier for an average of 4.9 minutes before the flame penetrated to the foam pad above.

With the Basofil fiber, higher basis weight seems important for achieving a long-lasting flame barrier.

Example 97

Inherently Fire-Retardant Melamine Fiber Layer on Airlaid Structure 50 mm cut length Basolfil Merge 80 Melamine fiber was cut with scissors to about 12 mm in length in order to better process through the airlaid handsheet apparatus. An airlaid handsheet with a basis weight of 150 gsm was formed in the laboratory-scale airlaid handsheet former having a 37.5 gsm layer of 80 percent Basofil Melamine Fiber Merge 80 and 20 percent Type 1661 bico fiber under a 112.5 gsm layer of 80 percent FFLE+ and 20 percent type 1661 bicomponent fiber. After compressing and curing, a 101.6 mm square sample was cut and mounted in the Fire Barrier Screening Test apparatus with the Basofil layer toward the flame of the Bunsen burner. The layer acted as a flame barrier for an average of 5.4 minutes before the flame penetrated to the foam pad above.

With the Basofil fiber, higher basis weight seems important for achieving a long-lasting flame barrier and a 37.5 gsm layer of flame retardant fiber is just as effective as 50 gsm.

Example 98

Insulating Airlaid Structure Formed on an Inherently Fire-Retardant Carrier Sheet 50 mm cut length Basolfil Merge 80 Melamine fiber was cut with scissors to about 12 mm in length in order to better process through the airlaid handsheet apparatus An airlaid handsheet with a basis weight of 35 gsm was formed of 80 percent Basofil Melamine Fiber and 20 percent Type 1661 bico fiber. The 50 mm long staple Basofil fiber was hand-cut with scissors to approximately 12 mm length to process better through the handsheet apparatus. The handsheet was compressed in a heated laboratory press to a density of 0.108 g/cc. This sheet was then used as the carrier sheet under a 125 gsm conventional airlaid structure of 80 percent FFLE+ and 20 percent type 1661 bicomponent fiber. After compressing and curing to thickness of 3.0 mm for an overall density of approximately 0.054 g/cc, a 101.6 mm square sample was cut and mounted in the Fire Barrier Test apparatus with the Basofil carrier side toward the flame of the Bunsen burner.

The carrier acted as a flame barrier for just 15.0 minutes before the flame penetrated to the foam pad above. With a low basis weight layer of the Basofil fiber/bico blend, higher density seems critical for achieving an effective flame barrier.

Example 99

Pretreating FFLE+ Pulp Sheet—Phosphate Ester

For some automotive applications, a uniform dark gray color is preferred as well as having the material be essentially non-wetting in water. Additionally, having fire retardancy throughout the insulator pad rather than concentrated on the surface is also desired for certain applications.

Using a metering pump and multi-nozzle dispenser, 16.7% solids of FR-3496 phosphate ester (based on pulp) was applied to FFLE+ drylap prior to comminution in the hammermill. Simultaneously, from a second metering system a 50/50 blend of 30% GE Magnasoft Extra Emulsion and 30% carbon black pigment was also dosed to the pulp sheet to an actives loading of 1.0% each by weight pulp. The resulting airlaid sheet (fluff/bico ratio of 80/20 calculated before pre-treating the pulp) had a basis weight of 404 gsm and caliper of 10 mm for density of 0.04 g/cc. In the Fire Barrier Test, this material withstood the flame for 15 minutes without burn-through. Even after undergoing the standard leaching procedure with 500 ml water, the airlaid material still withstood 15 minutes over the flame. The water-repellency was such that, apparently during extraction, the water passed through the pores or interstices of the airlaid structure without effectively contacting the treated fibers and dissolving the phosphate ester. In the modified fire barrier test the weight loss recorded after three minutes over the flame was 6.7% and the attained temperature on the side opposite the flame was 180° C. The material was self-extinguishing in the Federal MVSS-302 (Motor Vehicle Safety Standard) horizontal burn test with zero burn rate. Additionally, the material was self-extinguishing in the UL-94 vertical burn test for plastic materials (Underwriters Laboratories Test for Flammability of Plastic Materials for Parts in Devices and Appliances) with no burning drips for a rating of V-0. In fact, the after flame times t1, t2, and t3 were all zero.

Example 100

Pretreating FFLE+ Pulp Sheet—Ammonium Polyphosphate

The procedure of Example 97 was repeated except that ammonium polyphosphate was used as the fire-retardant instead of the phosphate ester. The airlaid material h produced had a basis weight of 342 gsm and a thickness of 10.0 mm. This material showed a mass loss of 7.3% in the 3.0 minute modified fire barrier test with a final temperature opposite the flame of 192° C. The material withstood the full 15 minute test without burn-through, and was self-extinguishing in the MVSS-302 horizontal burn test with a zero burn rate.

Example 101

Pretreating FFLE+ Pulp Sheet—Phosphate Ester and Surface Treating the Resulting Airlaid Structure When extreme fire resistance is desired in an airlaid product, the material may be surface-treated with fire-retardant chemical in addition to pre-treating the pulp sheet before comminution. Wood pulp feedstock (FFLE+) was dosed with 5% by weight actives (based on the pulp weight) of the phosphate ester fire-retardant FR-3496. An airlaid web comprising 85% wood pulp (untreated weight) and 15% bicomponent fiber was produced and sprayed on each side with an additional 5% of the fire-retardant from a 15% actives solution of FR-3496. After drying the airlaid weighed 162 gsm and had a thickness of 5.1 mm. This material was subjected to a modification of the fire barrier test in which the sample was weighed prior to the test and then exposed to the flame for 3.0 minutes, cooled and reweighed. The mass loss upon the 3 minute exposure to the flame was 11.0% and the temperature on the side opposite the flame reached 210° C. Thickness is a factor in thermal insulation, as the thicker materials did not get as hot on the side opposite the flame as did the thinner sample.

Example 102

Pilot Plant Examples of 3× Phosphate Ester-Treated FOLEY FLUFFS® Pulp 0.1016-meter (4-inch) wide dry-lap rolls of FOLEY FLUFFS® cellulose pulp were pre-treated with 3.40 gsm of a 36.4 percent solids solution of the phosphate ester flame retardant, FR 3496, and 0.30 gsm of a 10 percent solids solution of GE Magnasoft using a manifold delivery system prior to entry into the hammermill. This fiber will henceforth be referred to as "Pre-treated FOLEY FLUFFS®."

An airlaid substrate called "102A" was prepared on a Dan-Web pilot scale airlaid manufacturing unit at Buckeye Technologies, Inc., Memphis, Tenn. in October of 2006. The raw materials consisted of the Pre-treated FOLEY FLUFFS®, untreated FOLEY FLUFFS®, Trevira 1661 bicomponent binder fiber, an ethyl vinyl acetate latex binder available as AIRFLEX® 192, a 15 percent solids solution of FR 3496 from Manufacturer's Chemicals, and a 1.9 percent actives solution of GE Magnasoft silicone. The produced airlaid structure had a basis weight of 253.1 gsm and a thickness of 0.0083-meters. The pilot substrate, 102, was prepared according to the composition given in Table 23 below on the pilot line.

TABLE 23

Composition of Pilot Example 102A

| Component of Substrate | Gsm |
|---|---|
| Southern Softwood Pulp - FOLEY FLUFFS ® | 136 |
| Pre-treated Southern Softwood Pulp - FOLEY FLUFFS ® | 68 |
| Bicomponent Fiber Trevira 1661 | 36 |
| EVA Latex Binder Spray - AIRFLEX ® 192 | 2.0 |
| FR 3496 | 10.2 |
| GE Magnasoft Silicone | 0.9 |
| Total Target Basis Weight (gsm) | 253.1 |

The first forming head added 68.0 gsm of untreated FOLEY FLUFFS® fiber and 12.0 gsm of Trevira 1661 bicomponent fibers. The second forming heads added 68.0 gsm of pre-treated Foley Fluffs® and 12.0 gsm of Trevira 1661 bicomponent fibers. The third forming head added an identical formulation as Forming Head 1. Immediately after this, the web was compacted via the compaction roll, and a spray of 3.40 gsm FR 3496, and a mixture of 0.30 gsm of GE Magnasoft and 1.00 gsm of AIRFLEX®-192 latex emulsion diluted to 10 percent solids dispensed onto the top and bottom surfaces of the web. The web was then cured in a Moldow Through Air Tunnel Dryer at a temperature of 135° C. After this, the web was wound and collected. The machine speed was 15 meters/minute.

Example 102B was manufactured in a manner identical to Sample 102A on the pilot line, with the exception that the machine line speed was decreased from 15 meters/minute to 7.5 meters/minute to increase the basis weight. The basis weight of the prepared airlaid was 335.9 gsm. The overall thickness of the sample was 0.0112-meters.

The pilot substrate, 102B, was prepared according to the composition given in Table 24 below.

TABLE 24

Composition of Pilot Example 102B

| Component of Substrate | Gsm |
|---|---|
| Southern Softwood Pulp - FOLEY FLUFFS ® | 180 |
| Pre-treated Southern Softwood Pulp - FOLEY FLUFFS ® | 90.0 |
| Bicomponent Fiber Trevira 1661 | 48.0 |
| EVA Latex Binder Spray - AIRFLEX ® 192 | 3.00 |
| FR 3496 | 13.5 |
| GE Magnasoft Silicone | 1.35 |
| Total Target Basis Weight (gsm) | 335.9 |

Examples 102A and 102B were cut into 0.127-meters by 0.127-meters (5 inch×5 inch) samples, weighed, and sent to The Govmark Organization for ASTM D7140 analysis. A second sample of 102A was set to twice its original density (0.03 g/cc to 0.06 g/cc) by being held in a heated laboratory press at 140° C. A sample of this material labeled 102AP was also weighed and sent to The Govmark Organization for ASTM D7140 analysis. Additionally, a sample of a competitive flame retardant material, manufactured by Western Nonwovens (WNI) and customarily used in the top panel of mattresses, was sent for comparative purposes. The ASTM D7140 is a standard test method to measure heat transfer through a textile thermal barrier material as described briefly earlier in this document. The samples were also analyzed in-house using the Fire Barrier Test described earlier.

Table 26 summarizes the data obtained.

TABLE 26

| Sample | Total Basis Weight (gsm) | Density (g/cc) | Fire Barrier Test (Burn Time in minutes) | Average Temp Rise (°C.) | Average Heat Transfer Rate (cal/sq cm-sec) | Average Heat Transfer Rate (KW/m²) | Ignition (yes/no) | Observations |
|---|---|---|---|---|---|---|---|---|
| 102A | 272 | 0.03 | >15 min | 41 | 0.09 | 3.77 | no | Char |
| 102AP | 272 | 0.06 | >15 min | 49.2 | 0.11 | 4.60 | no | Char |
| 102B | 340 | 0.03 | >15 min | 39.8 | 0.09 | 3.77 | no | Char |
| WNI | 284 | 0.05 | Failed at 8 min | 51.3 | 0.12 | 5.02 | no | Char |

Example 102C was manufactured in a manner similar to Sample 102A on the pilot line, with the exception that the amount of flame retardant, FR 3496, added to this sample (both in pre-treatment and spray) was twice that added to Example 102A. The machine line speed was 15 meters/minute. The basis weight of the prepared airlaid was 263.3 gsm. The overall thickness of the sample was 0.0085-meters.

The pilot substrate, 102C, was prepared according to the composition given in Table 25 below:

TABLE 25

Composition of Pilot Example 102C

| Component of Substrate | Gsm |
|---|---|
| Southern Softwood Pulp - FOLEY FLUFFS ® | 136 |
| Pre-treated Southern Softwood Pulp - FOLEY FLUFFS ® | 68.0 |
| Bicomponent Fiber Trevira 1661 | 36.0 |
| EVA Latex Binder Spray - AIRFLEX ® 192 | 2.00 |
| FR 3496 | 20.4 |
| GE Magnasoft Silicone | 0.9 |
| Total Target Basis Weight (gsm) | 263.3 |

Figure 22:
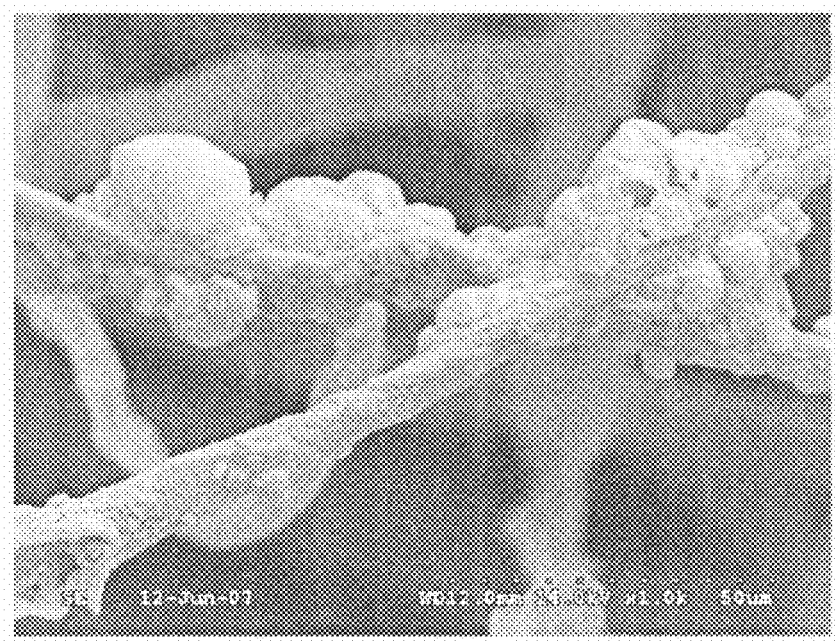
FIG. 22 and FIG. 23 are photomicrographs of material manufactured on a commercial line with the same formulation as Example 102A. The images are representative of the sample after its subjection to the Fire Barrier Test.
Figure 23:
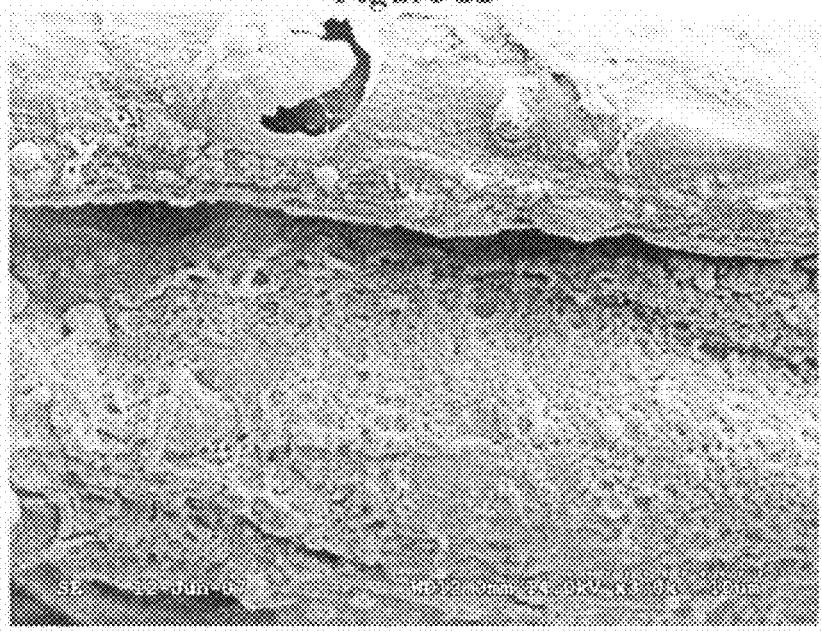

FIG. 22 and FIG. 23 are photomicrographs of material manufactured on a commercial line with the same formulation as Example 102A. The images are representative of the sample after its subjection to the Fire Barrier Test. The images were generated using the Hitachi S3500-N Scanning Electron Microscope. Example 102A was sputter-coated with gold using an Emitech® K550X Sputter Coater. Secondary electron images of the sample were then obtained at magnifications of 1000×, FIG. 22, and 3000×, FIG. 23, at an accelerating voltage of 14,000 volts and a working distance of 9600-micrometers.

Pilot Example 102C was subjected to the in-house Buckeye Fire Barrier Test. On successfully passing this test by remaining unconsumed after the duration of 15 minutes, samples of this material were quilted at Mattress Factory Showroom in Memphis, Tenn., and were then sent to a mattress assembly facility located in Cincinnati, Ohio. This facility assembled three twin beds, each made up of a mattress and foundation. The beds were manufactured to be Flame Retardant (FR) compliant. The mattress construction was tight top panel, one-sided with two tape-edge seams. The border contained Example 102C, the panel contained Western Nonwovens (WNI FR product), and the bottom panel on the mattresses included a FR filler cloth supplied by Precision Fabrics Group (PFG). The remaining components of the mattress were standard material. Table 27 provides a summary of the FR components comprising the manufactured twin mattresses:

TABLE 27

Summary of FR Components in the Bed

| Component Description | Material Spec | Supplier | Composition | Application |
| --- | --- | --- | --- | --- |
| Example 102C | 0.9 osf, Phosphate Ester based FR wood fibers | BKI | ~80% wood/20% bico. | FR Border |
| ESYNTHIAL SAFE ® TB60 | 0.9 osf, Phosphate Salt based FR rayon | WNI | 80% rayon/20% polyester | FR Panel |
| SOFTGUARD ® 0864 | 4.5 osy FR filler cloth | PFG | 90% viscose/10% PET post-treated | FR Filler Cloth |

Samples of the manufactured twin mattresses were sent to S.G.S. U.S. Testing Company Inc. located in Tulsa, Okla. This laboratory facility is certified and equipped to burn mattresses in accordance with the 16 CFR 1633 standard. This standard is a new open-flame mattress flammability standard which will apply to all mattresses sold in the United States that are manufactured in the United States or imported on or after Jul. 1, 2007. The following is a brief summary of the bed burn procedure:

Test Procedure for Bed Burn According to the 16 CFR 1633 Standard:

The prepared twin mattresses were conditioned for at least 48 hours prior to testing. After conditioning, a mattress and foundation set was placed on a metal test frame inside a concrete test room. The room was configured in accordance with Test Room Layout Option B as specified in 16 CFR 1633.

The ignition source was the NIST Dual Burner System as outlined in 16 CFR 1633. The fuel used was commercial propane delivered at a rate of 12.9 l/min to the top burner for 70 seconds, and at a rate of 6.6 l/min to the side burner for 50 seconds.

After the ignition of the burner, key properties were monitored and recorded during the procedure for each of the three prepared twin mattresses. The properties included Heat Release Rate, Total Heat, and Ceiling Temperature. In addition, photos and video were taken during the procedure.

Further details about the 16 CFR 1633 standard and the bed burn procedure are available in a 2006 Resource Toolkit prepared by the International Sleep Products Association (ISPA) and the Sleep Products Safety Council (SPSC). This Resource Toolkit highlights information pertinent to state and federal mattress flammability requirements. Additionally, information about this standard can be retrieved from the U.S. Consumer Product Safety Commission website at www.cpsc.gov.

Table 28 summarizes the key properties recorded during testing at S.G.S.:

TABLE 28

Summary of Burn Test Results

| Property | Maximum Allowed Value | Bed Burn No. 1 | Bed Burn No. 2 | Bed Burn No. 3 |
| --- | --- | --- | --- | --- |
| Heat Release Rate (kW) | 200 | 29 | 27 | 30 |
| Total Heat Release-First 10 min (MJ) | 15.0 | 4.2 | 5.1 | 8.8 |
| Pass/Fail | | Pass | Pass | Pass |

A summary of key observations based on the bed burns at S.G.S. U.S. Testing Company is as follows:
1. The construction of the mattress was critical to passing or failing a burn test. A bed that had construction flaws could negatively influence the results.
2. The border was more difficult to extinguish than the panel.
3. The BKI border (Example 102C) provided good barrier protection on the mattresses tested.
4. After the burn, the BKI border remained soft and flexible in contrast to the WNI material in the panel which was rigid and brittle.
5. Bed Burn No. 1 was almost text-book perfect. The border self-extinguished within 10 minutes after the start of the test.
6. Bed Burn No. 2 had a construction defect at the left corner of the mattress.

A hog ring that held the foam to a steel frame was missing in the corner.

This caused the foam to break through and be exposed to the gases from the burn. The FR material was able to contain the fire.
7. Bed Burn No. 3 had another construction defect. This time it was tape failure on the foundation. The flame was able to go underneath and continued to burn. As in the second burn, the FR material was able to contain the FR for the duration of the test.

Example 103

Inherently Fire Retardant FR CORONA® Fiber Layer on Airlaid Structure

Using the laboratory handsheet former described earlier, three airlaid handsheets were formed to a basis weight of 170 gsm each. The first handsheet, 103A, containing 80 percent FR Corona and 20 percent Trevira 1661 bico fiber was formed to a basis weight of 170 gsm and cured at 150° C. in a heated laboratory press shimmed to a thickness of 0.006-meters to produce a handsheet with a density of 0.03 g/cc.

The second handsheet, 103B, composed of two distinct layers was also formed to a total basis weight of 170-gsm. The first layer containing 80 percent FR CORONA® fiber and 20 percent Trevira 1661 bico fiber was formed at a basis weight of 55-gsm. The second layer containing 80 percent comminuted FOLEY FLUFFS® that had been pre-treated with a 6 percent solids solution of the phosphate ester, Flovan CGN, using the technique described previously, and 20 percent Trevira 1661 bico fiber was formed on top of the first layer at a basis weight of 115 gsm. The two-layered handsheet was sprayed evenly on the FOLEY FLUFFS® side with a 5.5 gsm solids solution of Flovan CGN, and cured at 150° C. in a heated laboratory press shimmed to a thickness of 0.006-meters to produce a handsheet with a density of 0.03 g/cc.

A second two-layered handsheet, 103C, was generated in the identical manner as 103B, with the exception that both the first and second layers were formed to a basis weight of 85 gsm each. The total basis weight of this sample was also 170 gsm.

The handsheets, 103A, 103B, and 103C were then cut into 0.127-meters by 0.127-meters (5 inch×5 inch) samples, weighed, and sent to The Govmark Organization for ASTM D7140 analysis. This test method is a standard test method to measure heat transfer through a textile thermal barrier material as described briefly earlier in this document. Additionally, the samples were analyzed in-house using the Fire Barrier Test described earlier.

Example 105

Flovan CGN Pilot Plant 3x-Treated FOLEY FLUFFS® Cellulose Fiber

Four inch wide rolls of FOLEY FLUFFS® cellulose pulp were pre-treated with a 30 percent solids solution of the flame retardant, Flovan CGN, using a manifold delivery system prior to entry into the hammermill. Each meter of FOLEY FLUFFS® pulp was pre-treated with approximately 12.0 grams of a 30 percent solids solution of Flovan CGN.

An airlaid substrate called "105" was prepared on a Dan-Web pilot scale airlaid manufacturing unit at Buckeye Tech-

TABLE 29

| Sample | Layer Basis Weights (gsm) | Total Basis Weight (gsm) | Density (g/cc) | Fire Barrier Test (Burn Time in minutes) | Average Temp Rise (°C.) | Average Heat Transfer Rate (cal/sq cm-sec) | Average Heat Transfer Rate (KW/m$^2$) | Ignition yes/no | Observations |
|---|---|---|---|---|---|---|---|---|---|
| 103A | 170 CORONA | 170 | 0.03 | >15 min | 94.3 | 0.21 | 8.79 | No | Char |
| 103B | 55 CORONA 115 FF | 170 | 0.03 | >15 min | 102.7 | 0.23 | 9.62 | No | Char |
| 103C | 85 CORONA 85 FF | 170 | 0.03 | >15 min | 82.2 | 0.18 | 7.53 | No | Char |

In Table 29 above, FF refers to FOLEY FLUFFS® and CORONA refers to FR CORONA®. Based on the test data obtained from the Govmark Organization, it appeared that the barrier sample containing a 50/50 mixture of FOLEY FLUFFS® and FR CORONA® fiber, Example 103C, performed better with regard to heat transfer and temperature rise than the sample composed entirely of FR CORONA®, Example 103A.

Example 104

Flovan CGN Laboratory Pre-treated FOLEY FLUFFS® Cellulose Fiber

Strips of FOLEY FLUFFS® cellulose wood pulp sheets measuring 3-feet in length were sprayed with a 40 percent solids dispersion of Flovan CGN mixed with 4 percent solids GE Magnasoft dispersion and a 1.33 percent phosphoric acid solution to produce a dry yield of 6.5% solids of Flovan CGN. The pre-treated strips were fiberized in a comminution device, the Kamas Mill, and blown into a 225 gsm handsheet which was 20 percent by weight of bicomponent fiber Type 1661 using the laboratory handsheet former described earlier. The handsheet sample was set to a density of 0.03 g/cc by being held for 15 minutes in a laboratory press heated to 140° C. The handsheets were then cut to 0.1016-meter by 0.1016-meter squares (4-inch by 4-inch) and subjected to the Fire Barrier Test described above. Burn time is shown in Table 30.

TABLE 30

| Example | Flovan CGN (Add-on %) | Burn Time (Minutes) |
|---|---|---|
| 104 | 6.5 | >15 | nologies, Inc., Memphis, Tenn. in April of 2007. The raw materials consisted of the Flovan CGN pre-treated FOLEY FLUFFS® described above, Trevira 1661 bicomponent binder fiber, an ethyl vinyl acetate latex binder available as AIRFLEX® 192, and a mixture of 30 percent solids solution of Flovan CGN, three percent solids solution of GE Magnasoft silicone, and one percent solution of phosphoric acid. The produced airlaid structure had a basis weight of 300.1 gsm. The pilot substrate, 105, was prepared according to the composition given in Table 31 below on the pilot line.

TABLE 31

| Composition of Pilot Example 105 | |
|---|---|
| Component of Substrate | Gsm |
| Southern Softwood Pulp - FOLEY FLUFFS ® | 216 |
| Bicomponent Fiber Trevira 1661 | 54.0 |
| 30% Flovan CGN (3% GE Magnasoft, 1% phosphoric acid) | 20.1 |
| EVA Latex Binder Spray - AIRFLEX ® 192 | 10.0 |
| Total Basis Weight (gsm) | 300.1 |

The first forming head added 72.0 gsm of pre-treated Foley Fluffs fluff, 18.0 gsm of Trevira 1661 bicomponent fibers, 3.5 gsm solids of Flovan CGN flame retardant, 0.35 gsm solids of GE Magnasoft silicone, and 0.12 gsm solids of phosphoric acid. The Flovan CGN, GE Magnasoft, and phosphoric acid were mixed together in a solution with the respective solids contents of each being 30 percent, 3 percent, and 1 percent. The second and third forming heads added the identical mixtures as Forming Head 1. Immediately after these forming head layers came together, the web was compacted via the compaction roll. Then, 5.00 gsm solids of AIRFLEX-192 emulsion and 4.8 gsm solids of Flovan CGN flame retardant were sprayed onto the top of the web during the first pass. The AIRFLEX®-192 and Flovan CGN were in solution together. An identical mixture of AIRFLEX®-192 latex emulsion and Flovan CGN was added during a second pass in surface of the web facing the spray was reversed such that the application of the mixture occurred on the untreated side of the web. The web was cured in a Moldow Through Air Tunnel Dryer at a temperature of 135° C. After this, the web was wound and collected. The machine speed was 10-20 meters/minute. The prepared airlaid contained an overall weight percent of flame retardant Flovan CON of 6.5 percent.

Figure 28:
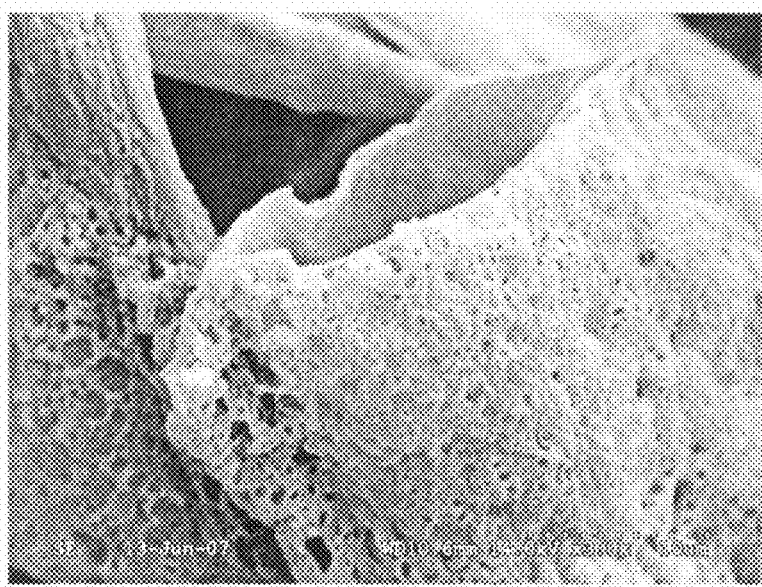
FIG. 28 illustrates how the FR-treated FFLE+™ wood fiber take on the appearance of hollow shells that retain their original shape despite charring.

FIG. 28 illustrates how the FR-treated FFLE+™ wood fiber take on the appearance of hollow shells that retain their original shape despite charring. The burn time is provided in Table 32.

TABLE 32

| Example | Burn Time (Minutes) |
|---|---|
| 105 | >15 |

Example 106

Flovan CGN 3×-Treated FOLEY FLUFFS® Cellulose Fiber

Six percent solids of Flovan CGN flame retardant were dispersed onto strips of Foley Fluffs® cellulose wood pulp sheets measuring 0.0254-meter by 0.1016-meters (1 inch by 4 inch). The pre-treated strips were then run through the laboratory comminution device, which is a three stage fluffer, and collected. The Flovan® CGN pre-treated FOLEY FLUFFS® cellulose fluff was blown into 170 gsm handsheets containing 20 percent by weight of Trevira 1661 bicomponent fiber. The handsheets were set to a density of 0.03 g/cc by being held for 15 minutes in a laboratory press heated to 140° C. The handsheets were cut to 101.6 mm squares (4 inch squares) and sprayed evenly on both sides with Flovan CGN dispersion at an add-on level of 5.5 gsm solids. In addition to the handsheet sample set to a density of 0.03 g/cc (Sample 106A), an additional handsheet was made and set to a density of 0.06 g/cc (Sample 106B). The samples were subjected in-house to the Fire Barrier Test described earlier. In addition, the handsheets were sent to The Govmark Organization for ASTM D7140 analysis. Table 33 summarizes results from the two tests.

TABLE 33

| Sample | Basis Weight (gsm) | Density (g/cc) | Fire Barrier Test (Burn Time in minutes) | Average Temp Rise (° C.) | Average Heat Transfer Rate (cal/sq cm-sec) | Average Heat Transfer Rate (KW/m²) | Ignition (yes/no) | Observations |
|---|---|---|---|---|---|---|---|---|
| 106A | 170 | 0.03 | >15 | 90.1 | 0.20 | 8.37 | No | Char |
| 106B | 170 | 0.06 | >15 | 81.4 | 0.18 | 7.53 | No | Char |

Example 107

Flovan CGN 3×-Treated FFLE+™ Cellulose Fiber

Six percent solids of Flovan CGN flame retardant were dispersed onto strips of FFLE+™ cellulose wood pulp sheets measuring 0.0254-meter by 0.1016-meters (1 inch by 4 inch). The pre-treated strips were then run through the laboratory comminution device, which is a three stage fluffer, and collected. The pre-treated comminuted fluff was blown into 170 gsm airlaid handsheets which were 20 percent by weight of bicomponent fiber Trevira Type 1661. The handsheet samples were set to a density of 0.03 g/cc by being held for 15 minutes in a laboratory press heated to 140° C. They were then cut into 101.6 mm squares (4 inch squares) and sprayed evenly on both sides with Flovan CGN dispersion at an add-on level of 5.5 gsm solids (Sample 107). Samples of the handsheets were subjected in-house to the Fire Barrier Test described earlier and ASTM D7140 analysis at The Govmark Organization. Table 34 summarizes results from the two tests.

TABLE 34

| Sample | Basis Weight (gsm) | Density (g/cc) | Fire Barrier Test (Burn Time in minutes) | Average Temp Rise (° C.) | Average Heat Transfer Rate (cal/sq cm-sec) | Average Heat Transfer Rate (KW/m²) | Ignition (yes/no) | Observations |
|---|---|---|---|---|---|---|---|---|
| 107 | 170 | 0.03 | >15 min | 80.1 | 0.18 | 7.53 | No | Char |

Figure 24:
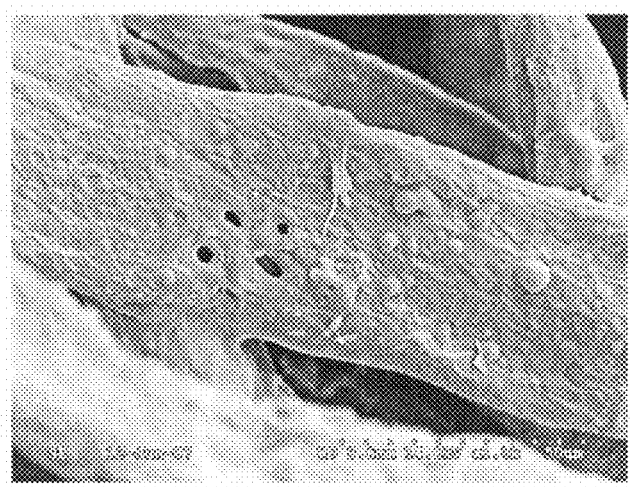
FIG. 24 and FIG. 25 are photomicrographs of material with a similar formulation as Example 107. The images were generated using the Hitachi S3500-N Scanning Electron Microscope. Example 107 was sputter-coated with gold using an Emitech® K550× Sputter Coater. Secondary electron images of the sample were then obtained at magnifications of 1000× (FIG. 24) and 3000× (FIG. 25) at an accelerating voltage of 14,000 volts and a working distance of 9600-micrometers.
Figure 25:
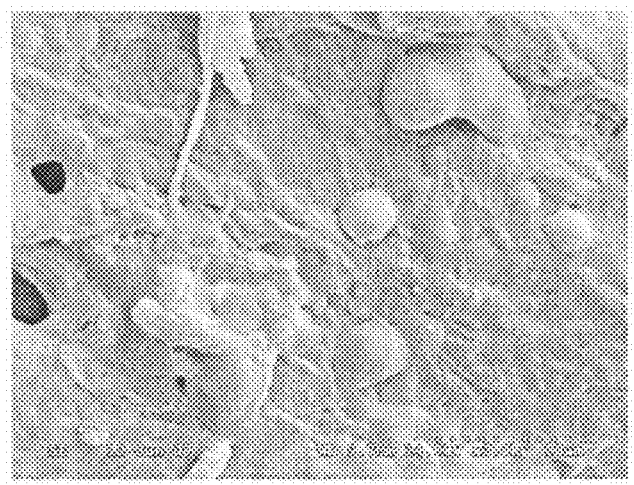

FIG. 24 and FIG. 25 are photomicrographs of material with a similar formulation as Example 107. The images were generated using the Hitachi S3500-N Scanning Electron Microscope. Example 107 was sputter-coated with gold using an Emitech® K550× Sputter Coater. Secondary electron images of the sample were then obtained at magnifications of 1000× (FIG. 24) and 3000× (FIG. 25) at an accelerating voltage of 14,000 volts and a working distance of 9600-micrometers.

The photomicrographs clearly show the evidence of Flovan CGN flame retardant treatment on the surfaces of the FFLE+™ wood fibers.

Figure 26:
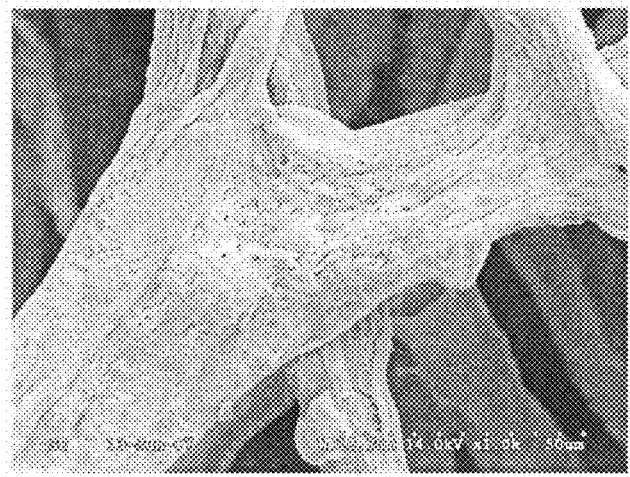
FIG. 26 at a magnification of 1000×, FIG. 27 at a magnification of 3000×, and FIG. 28, also at a magnification of 3000×, are photomicrographs of a charred sample with a formulation similar to Example 107. The photographed fibers had been subjected to the Fire Barrier Test.
Figure 27:
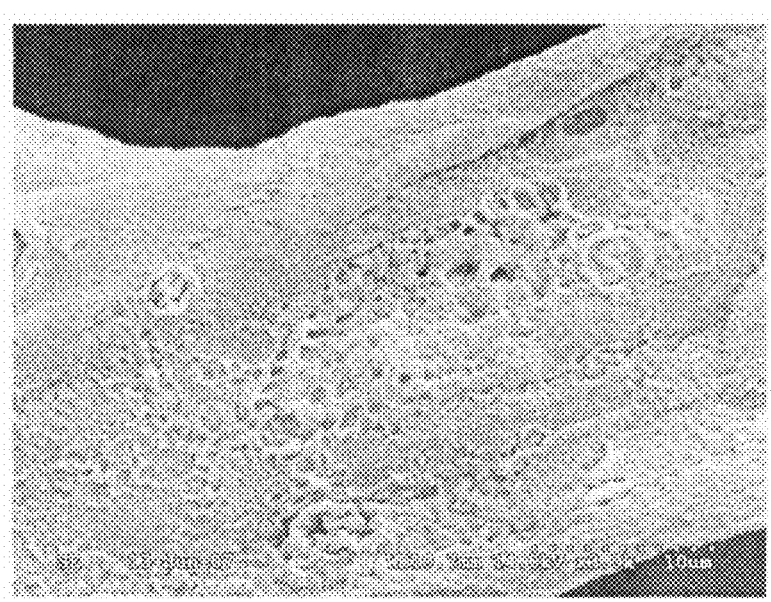

FIG. 26 at a magnification of 1000×, FIG. 27 at a magnification of 3000×, and FIG. 28, also at a magnification of 3000×, are photomicrographs of a charred sample with a formulation similar to Example 107. The photographed fibers had been subjected to the Fire Barrier Test. This sample was prepared and imaged in an identical manner as the uncharred sample of FIGS. 24 and 25.

FIG. 28 illustrates how the FR-treated FFLE+™ wood fiber take on the appearance of hollow shells that retain their original shape despite charring.

Example 108

Manufacturing Plant Example—Flovan CGN 3×-Treated FFLE+™ Cellulose Fiber

An airlaid substrate was manufactured at Buckeye Technologies' Delta, British Columbia, Canada, multi-head commercial scale airlaid machine on Apr. 18, 2007. The raw materials consisted of FFLE+™ cellulose fiber, Trevira 1663 bicomponent binder fiber, an ethyl vinyl acetate latex binder available as AIRFLEX® 192, and a mixture of 40 percent solids Flovan CGN, 4 percent GE Magnasoft, and 1.33 percent phosphoric acid. The produced airlaid structure had a basis weight of 300.4 gsm. The substrate, 108, was prepared according to the composition given in Table 35 below on Buckeye Delta's commercial line

TABLE 35

| Component of Substrate 108 | Gsm |
| --- | --- |
| Southern Softwood Pulp - FFLE+ ™ | 207.0 |
| Bicomponent Fiber Trevira 1663 | 51.0 |
| Flovan CGN (40% solids solution) | 18.0 |
| GE Magnasoft Silicone (4% solids solution) | 1.80 |
| Phosphoric Acid (1.33%) | 0.60 |
| Flovan CGN (5% solids solution) | 10.0 |
| GE Magnasoft Silicone (0.5% solids solution) | 1.00 |
| Phosphoric Acid (0.50%) | 1.00 |
| EVA Latex Binder Spray - AIRFLEX ® 192 | 10.0 |
| Total Basis Weight (gsm) | 300.4 |

A solution of 8 percent solids CGN Flovan, 0.8% solids GE Magnasoft, and approximately 0.2 percent of phosphoric acid was applied uniformly, in a manner that was consistent from edge-to-edge of the pulp, to six 32-inch wide rolls of drylap FFLE+™ cellulose pulp via a specially-designed manifold system prior to entry into the hammermills. Phosphoric acid is added as it aids in the curing of GE Magnasoft silicone.

After the pre-treated FFLE+™ pulp was fiberized in the hammermills, the first forming head added 69.0 gsm of the pre-treated FFLE+™ fluff, 17.0 gsm of Trevira 1663 bicomponent fibers, and a pulp dosing solution comprising 6.00 gsm of 40 percent solids Flovan CGN flame retardant, 0.60 gsm of 4 percent solids GE Magnasoft silicone, and 0.20 gsm of 1.33 percent phosphoric acid. The second and third forming heads added identical mixtures to Forming Head 1. Immediately after this, the web was compacted via the compaction roll. Then, a spray solution comprising a mixture of 5.00 gsm of 5 percent solids AIRFLEX®-192 latex emulsion, 0.5 gsm of 0.5 percent solids GE Magnasoft, and 0.50 gsm of 0.5 percent phosphoric acid was sprayed onto the top surface of the web during the first pass. An identical mixture of AF-192 latex emulsion, Flovan CGN flame retardant, GE Magnasoft silicone, and phosphoric acid was sprayed onto the second surface of the web during a second pass. Then the web was cured in the dryer at a temperature of 135° C. After this, the web was wound and collected. The machine speed was approximately 10-20 meters/minute. The prepared airlaid contained an overall weight percent of flame retardant Flovan CGN of 9.32 percent.

The prepared airlaid substrate 108 was subjected multiple times to the Buckeye Fire Barrier Test described earlier in this document. The flame never breached the airlaid barrier within the 15 minute duration of the test. In addition, a propane torch was placed to the barrier without the web igniting.

Airlaid substrate 108 was leached with 500 milliliters of water according to the standard leaching procedure described earlier in this document. In this case, the flame breached the barrier at approximately 5 minutes into the Fire Barrier Test.

Table 36 provides a summary of the test performed on the airlaid substrate 108.

TABLE 36

| Example | Waterproof agent (gsm) | Flush 500 ml | Burn Time (Minutes) |
| --- | --- | --- | --- |
| 108 | yes | no | >15 |
| 108 | yes | yes | ~5 |

Table 37 summarizes the various experiments performed on the handsheets. Included within the table is a statement as to the fire-retardant applied in each experiment.

TABLE 37

| Example (Sample) | Fiber types | Basis Wt. (gsm) | FR Agent (gsm total) | Anti-leach Treatment (gsm) | Pre or Post treatment | Flushed 500 ml | Burn Time (min.) |
| --- | --- | --- | --- | --- | --- | --- | --- |
| 82 (1A) | FFLE+ ™/bico | 300 | APP 8.4 | no | Post 2 sides | | 6.25. |
| 82 (1B) | FFLE+ ™/bico | 300 | APP 15 | no | Post 2 sides | | 11.1 |
| 82 (1C) | FFLE+ ™/bico | 300 | APP 18.3 | no | Post 2 sides | | >15 |
| 83 (2A) | FOLEY FLUFFS ®/bico | 300 | APP 5.7 | no | Post 1 side | | 10.4. |
| 83 (2B) | FOLEY FLUFFS ®/bico | 300 | APP 7.8 | no | Post 1 side | | 14.3 |
| 83 (2C) | FOLEY FLUFFS ®/bico | 300 | APP 10.2 | no | Post 1 side | | >15 |
| 84 (3A) | FFLE+ ™/bico | 300 | APP 5.7 | no | Post 1 side | | 8.8 |
| 84 (3B) | FFLE+ ™/bico | 300 | APP 7.5 | no | Post 1 side | | 13.7 |
| 84 (3C) | FFLE+ ™/bico | 300 | APP 12.3 | no | Post 1 side | | >15 |
| 85 (Comp 1) | FFLE+ ™/bico | 150 | APP 15 | no | Post 1 side | yes | 0.17 |
| 85 (4) | FFLE+ ™/bico | 150 | APP 15 | EVA 7.5 | Post 1 side | yes | 2.2 |
| 86 (5) | FFLE+ ™/bico | 150 | APP 15 | Boz A-silox 10 | Post 1 side | yes | 13.2 |
| 87 (6A) | FFLE+ ™/bico | 150 | Borax 3 | no | Pre-pulp | | 14.2. |
| 87 (6B) | FFLE+ ™/bico | 150 | Borax 6 | no | Pre-pulp | | >15 |
| 88 (7) | FFLE+ ™/bico | 150 | Borax 6 | no | Pre-pulp | yes | 4.25. |
| 89 (8) | FFLE+ ™/bico | 150 | Borax 6 | Boz A-silox 4.5 | Pre-pulp | yes | 7.25 |
| 90 (9A) | FFLE+ ™/bico | 150 | APP 3.75 | no | Pre-pulp | | 11.5 |
| 90 (9B) | FFLE+ ™/bico | 150 | APP 7.5 | no | Pre-pulp | | 8.6 |
| 91 (10A) | FFLE+ ™/bico | 150 | APP 15 | DC A-silox 4.5 | Pre-pulp | yes | >15. |

TABLE 37-continued

| Example (Sample) | Fiber types | Basis Wt. (gsm) | FR Agent (gsm total) | Anti-leach Treatment (gsm) | Pre or Post treatment | Flushed 500 ml | Burn Time (min.) |
|---|---|---|---|---|---|---|---|
| 91 (10B) | FFLE+ ™/bico | 150 | APP 15 | Boz A-silox 4.5 | Pre-pulp | yes | >15 |
| 92 (11A) | FFLE+ ™/bico | 150 | APP 15 | EVCl 15 | Post 1 side | | >15 |
| 92 (11B) | FFLE+ ™/bico | 150 | APP 15 | EVCl 15 | Post 1 side | yes | 3.2 |
| 93 (12A) | FFLE+ ™/bico | 150 | Phos-E 3.75 | no | Pre-pulp | | 3.0 |
| 93 (12B) | FFLE+ ™/bico | 150 | Phos-E 7.5 | no | Pre-pulp | | 10.8 |
| 94 (13) | FFLE+ ™/bico | 150 | Phos-E 15 | DC A-silox 4.5 | Pre-pulp | yes | 7.5 |
| 95 (14) | BASOFIL/bico | 150 | Inherent in fiber | no | N/A | | >15 |
| 96 (15) | BASOFIL/bico 50 gsm FFLE+ ™/bico 100 gsm | 150 | Inherent in fiber (upper layer) | no | N/A | | 4.92 |
| 97 (16) | BASOFIL/bico 37.5 gsm FFLE+ ™/bico 112.5 gsm | 150 | Inherent in fiber (upper layer) | no | N/A | | 5.36 |
| 98 (17) | BASOFIL/bico 35 gsm densified used as carrier FFLE+ ™/bico 125 gsm | 160 | Carrier sheet Inherently FR | no | N/A | | 15 |
| 102 (102A) | FOLEY FLUFFS ®/bico | 253 | Phos-E | GE Magnasoft | Pre-Pulp Post 2 sides | | >15 |
| 102 (102B) | FOLEY FLUFFS ®/bico | 336 | Phos-E | GE Magnasoft | Pre-Pulp Post 2 sides | | >15 |
| 102 (102C) | FOLEY FLUFFS ®/bico | 263 | Phos-E | GE Magnasoft | Pre-Pulp Post 2 sides | | >15 |
| 103 (103A) | FR CORONA ®/bico | 170 | Inherent in fiber | no | N/A | | >15 |
| 103 (103B) | FR CORONA ®/bico 55 gsm FOLEY FLUFFS ®/bico 115 gsm | 170 | Inherent in fiber (upper layer) | no | N/A | | >15 |
| 103 (103C) | FR CORONA ®/bico 85 gsm FOLEY FLUFFS ®/bico 85 gsm | 170 | Inherent in fiber (upper layer) | no | N/A | | >15 |
| 104 (104) | FOLEY FLUFFS ®/bico | 150 | Flovan CGN | no | Pre-pulp | | >15 |
| 105 (105) | FOLEY FLUFFS ®/bico | 300 | Flovan CGN | GE Magnasoft | Pre-Pulp Post 2 sides | | >15 |
| 106 (106A) | FOLEY FLUFFS ®/bico | 170 | Flovan CGN | no | Pre-Pulp Post 2 sides | | >15 |
| 106 (106B) | FOLEY FLUFFS ®/bico | 170 | Flovan CGN | no | Pre-Pulp Post 2 sides | | >15 |
| 107 (107) | FFLE+ ™/bico | 170 | Flovan CGN | no | Pre-Pulp Post 2 sides | | >15 |
| 108 (108) | FFLE+ ™/bico | 300 | Flovan CGN | GE Magnasoft | Pre-Pulp Post 2 sides | No yes | >15 ~5 |

APP = GLO-TARD FFR2 ammonium polyphosphate
Phos-E = Fire Retard 3496 or FR 3496 phosphate ester The present invention is not limited in scope by the specific embodiments described herein. Indeed, various modifications of the invention in addition to those described herein will become apparent to those in the skilled in the art from the forgoing description and the accompanying figures. Such modifications are intended to fall within the scope of the appended claims.

Patents, patent application, publications, product descriptions, and protocols are cited throughout this application, the disclosures of which are incorporated herein by reference in their entireties for all purposes. All patents, patent applications, and publications cited in this specification are hereby incorporated by reference in their entirety. In case of a conflict in terminology, the present disclosure controls.

While it will be apparent that the invention herein described is well calculated to achieve the benefits and advantages set forth above, it will be appreciated that the invention is susceptible to modification, variation and change without departing from the spirit thereof. For instance, the nonwoven structure is described in the context of an airlaid process. However, non-airlaid processes are also contemplated.

What is claimed is:

1. A fire-retardant nonwoven material, comprising:
   (A) a nonwoven substrate comprising matrix fibers including individualized cellulosic fibers;
   (B) a binder; and
   (C) a fire retardant,
   wherein the fire-retardant nonwoven material has a Burn Through Time in a fire barrier screening test of about 1 minute or greater.

2. The fire-retardant nonwoven material of claim 1, wherein the Burn Through Time in the Fire Barrier Test is about 15 minutes or greater.

3. The fire-retardant nonwoven material of claim 1, wherein matrix fibers further comprise synthetic fibers.

4. The fire-retardant nonwoven material of claim 3, wherein the matrix fibers are present in amounts ranging from about 30 weight percent to about 95 weight percent based on the total weight of the nonwoven material.

5. The fire-retardant nonwoven material of claim 4, wherein the matrix fibers are present in amounts ranging from about 60 weight percent to about 80 weight percent based on the total weight of the nonwoven material.

6. The fire-retardant nonwoven material of claim 1, wherein the binder is a bicomponent fiber binder, a latex binder, a thermoplastic material, or a mixture thereof.

7. The fire-retardant nonwoven material of claim 6, wherein the binder is present in amounts ranging from about 5 weight percent to about 70 weight percent core binder.

8. The fire-retardant nonwoven material of claim 7, wherein the binder is present in amounts ranging from about 20 weight percent to about 40 weight percent core binder.

9. The fire-retardant nonwoven material of claim 1, wherein the nonwoven substrate has a basis weight of from about 200 gram per square meter (gsm) to about 3000 gsm.

10. The fire-retardant nonwoven material of claim 9, wherein the basis weight of the nonwoven material substrate is from about 200 gsm to about 1500 gsm.

11. The fire-retardant nonwoven material of claim 9, wherein the basis weight of the nonwoven material substrate is from about 1500 gsm to about 3000 gsm.

12. The fire-retardant nonwoven material of claim 1, wherein the basis weight of the nonwoven material substrate is from about 10 gsm to about 2000 gsm.

13. The fire-retardant nonwoven material of claim 12, wherein the basis weight of the nonwoven material substrate is from about 10 gsm to about 150 gsm.

14. The fire-retardant nonwoven material of claim 1, wherein the nonwoven material has a caliper thickness of from about 1.0 mm to about 60 mm.

15. The fire-retardant nonwoven material of claim 14, wherein the nonwoven material has a caliper thickness of from about 1.0 mm to about 3 mm.

16. The fire-retardant nonwoven material of claim 1, wherein the fire retardant is present in an amount of from about 3 gsm to about 100 gsm.

17. The fire-retardant nonwoven material of claim 16, wherein the fire retardant is present in an amount of from about 3 gsm to about 15 gsm.

18. The fire-retardant nonwoven material of claim 16, wherein the fire retardant is present in an amount of from about 15 gsm to about 50 gsm.

19. The fire-retardant nonwoven material of claim 16, wherein the fire retardant is present in an amount of from about 50 gsm to about 100 gsm.

20. The fire-retardant nonwoven material of claim 1, wherein the fire-retardant nonwoven material further comprises an anti-leachant which is present in an amount of from about 5 gsm to about 50 gsm.

21. The fire-retardant nonwoven material of claim 1, wherein the nonwoven material is an airlaid nonwoven, spunbonded nonwoven, a meltblown nonwoven, a spunlaced nonwoven, or a combination thereof.

22. The fire-retardant nonwoven material of claim 21, wherein the nonwoven material is an airlaid nonwoven substrate.

23. The fire-retardant nonwoven material of claim 1, wherein the nonwoven substrate has a density of from about 0.015 g/cc to about 0.10 g/cc.

24. The fire-retardant nonwoven material of claim 23, wherein the nonwoven substrate has a density of from about 0.017 g/cc to about 0.045 g/cc.

25. The fire-retardant nonwoven material of claim 1, wherein the nonwoven material has sound transmission reduction of 5 decibel or greater in an LSTT sound transmission test.

26. The fire-retardant nonwoven material of claim 25, wherein the nonwoven material has sound transmission reduction of 11 decibel or greater in an LSTT sound transmission test.

27. The fire-retardant nonwoven material of claim 1, further comprising a carrier having a basis weight of from about 8 gsm to about 2000 gsm which is integral with a surface of the core.

28. The fire-retardant nonwoven material of claim 27, further comprising a carrier having a basis weight of from about 8 gsm to about 25 gsm which is integral with a surface of the core.

29. The fire-retardant nonwoven material of claim 1, further comprising a carrier having a basis weight of from about 10 gsm to about 2000 gsm which is integral with a surface of the core.

30. The fire retardant, nonwoven material of claim 1, further comprising an auxiliary layer containing plastic material with a basis weight of from about 300 gsm to about 700 gsm on the nonwoven material.

31. The fire retardant, nonwoven material of claim 1, further comprising an auxiliary layer with a basis weight of from about 50 gsm to about 400 gsm on the nonwoven material.

32. The fire retardant, nonwoven material of claim 31, wherein the auxiliary layer has a basis weight of from about 150 gsm to about 400 gsm.

33. The fire-retardant, nonwoven material of claim 1, wherein the nonwoven material has a sound absorption coefficient ($\alpha$) as determined by ASTM E1050-98 at 1000 Hz of about 0.5 or greater.

34. The fire-retardant nonwoven material of claim 33, wherein the nonwoven material has a sound absorption coefficient (a) as determined by ASTM E1050-98 at 1000 Hz of about 0.7 or greater.

35. The fire-retardant nonwoven material of claim 1, wherein the nonwoven material has a sound absorption coefficient (a) as determined by ASTM E1050-98 at 2500 Hz of about 0.9 or greater.

36. The fire-retardant, nonwoven material of claim 1, wherein the nonwoven material has a SAMI of about 3 $\delta$dB/kgsm or greater.

37. The fire-retardant, nonwoven material of claim 36, wherein the nonwoven material has a SAMI of about 8 $\delta$dB/kgsm or greater.

38. The fire-retardant nonwoven material of claim 1, further comprising a waterproofing, anti-leaching agent.

39. The fire-retardant nonwoven material of claim 38, wherein the anti-leaching agent is present in an amount of from about 5 gsm to about 50 gsm.

40. The fire-retardant nonwoven material of claim 3, wherein the matrix fibers include inherently fire-retardant fibers.

41. The fire-retardant nonwoven material of claim 40, wherein the fire retardant fibers comprise ammonium polyphosphate, melamine, sodium tetraborate decahydrate, or combinations thereof.

42. The fire-retardant nonwoven material of claim 1, wherein the nonwoven structure has an airflow resistance of from about 500 to about 10,000 Rayls (NS/m$^3$).

43. The fire-retardant nonwoven material of claim 42, wherein the nonwoven structure has an airflow resistance of from about 500 to about 3,000 Rayls (NS/m$^3$).

44. The fire-retardant, nonwoven material of claim 1, wherein the nonwoven material is fabricated as a panel having an area of 50 m$^2$ or less.

45. The fire-retardant, nonwoven material of claim 44, wherein the panel has been molded with an application of heat and pressure into a shape which is retained.

46. The fire-retardant, nonwoven material of claim 44, wherein the panel has an area of 10 meters square or less.

47. The fire-retardant, nonwoven material of claim 1, wherein the nonwoven material is attached to a panel of upholstery material or carpeting.

48. The fire-retardant, nonwoven material of claim 1, wherein the nonwoven material is attached to a panel of an automobile.

49. The fire-retardant, nonwoven material of claim 1, wherein the nonwoven material is attached to a wall or structural member of a building.

50. A sound attenuating laminate comprising the nonwoven material of claim 1 and attached or applied thereto or otherwise in contact therewith upholstery material, carpeting or a structural member or surface.

51. A mattress, futon or other bedding product, furniture cushion or covering incorporating the fire-retardant nonwoven material of claim 1.

52. A fire retardant, nonwoven material comprising a core, containing:
(A) from about 30 weight percent to about 95 weight percent matrix fibers, the matrix fibers comprising individualized cellulosic fibers;
(B) from about 60 weight percent to about 5 weight percent core binder, where weight percentages in the core are based on the total weight of the core;
(C) a fire retardant, where the fire-retardant nonwoven material has a Burn Through Time in a fire barrier screening test of about 1 minute or greater; and where
(D) the core has a basis weight of from about 200 g/m² to about 3000 g/cm²,
(E) the core has a density of from about 0.015 g/cc to about 0.10 glee, and
(F) the nonwoven material has sound transmission reduction of 5 decibel or greater in an LSTT sound transmission test.

53. A fire retardant, nonwoven material, comprising:
(a) a scrim with an interior surface and an outer surface, the scrim having a basis weight of from about 8 gsm to about 200 gsm;
(b) a nonwoven material having an interior surface and an outer surface, wherein the interior surface of the nonwoven material is in contact with the interior surface of the scrim, the nonwoven material having a basis weight of from about 10 g/m2 to about 2000 g/m2 which contains from about 30 weight percent to about 95 weight percent matrix fibers, wherein the matrix fibers comprise individualized cellulosic fibers, and from about 5 weight percent to about 70 weight percent of a binder where the weight percentages are based on the total weight of the nonwoven material; and
(c) the nonwoven material having been treated with a fire retardant.

54. The fire retardant, nonwoven material of claim 53, further comprising:
(d) deposited on the outer surface of the scrim from about 1 g/m² to about 40 g/m² of a polymeric coating; and, optionally,
(e) deposited on the outer surface of the nonwoven material from about 1 g/m² to about 40 g/m² of a second polymeric coating; and
wherein the nonwoven structure has a Burn Through Time in a fire barrier screening test of about 1 minute or greater.

55. A process for the production of a fire-retardant nonwoven material, comprising:
(A) providing a comminution sheet of cellulosic fibers,
(B) comminuting the sheet into individualized cellulosic fibers,
(C) providing binder fibers,
(D) air conveying the individualized cellulosic fibers and binder fibers to form a mixture of matrix fibers,
(E) air laying the matrix fibers on a forming wire to form an airlaid nonwoven material,
(F) optionally, depositing a latex binder on the airlaid nonwoven material,
(G) heating the nonwoven material to cure the binder fibers,
(H) depositing a fire retardant on the nonwoven material, and
(I) optionally, depositing an anti-leachant on the nonwoven material.

56. A process for the production of a fire-retardant, nonwoven material comprising:
(1a) on a moving foraminous wire from one or more forming heads, depositing a mixture comprising:
(A) from about 95 weight percent to about 40 weight percent matrix fibers, wherein the matrix fibers comprise individualized cellulosic fibers,
(B) from about 60 weight percent to about 5 weight percent core binder, to form a core of the nonwoven material, where weight percentages in the core are based on the total weight of the core, and
(C) a fire retardant, followed by
(2a) heating the nonwoven material to consolidate the mixture of matrix fibers and binder, or,
(1b) deposition on a moving foraminous wire of
(A) a woven or nonwoven carrier with a basis weight of from about 10 gsm to about 2000 gsm; followed by
(2b) deposition on the carrier from one or more forming heads of a mixture containing
(B) from about 95 weight percent to about 40 weight percent matrix fibers, wherein the matrix fibers comprise individualized cellulosic fibers,
(C) a fire retardant, and
(D) from about 60 weight percent to about 5 weight percent core binder,
to form a core of the nonwoven material, where weight percentages in the core are based on the total weight of the core, and so that the carrier is integral with a surface of the core, followed by
(3) heating the nonwoven material to consolidate the mixture of matrix fibers and binder, wherein
(E) the core has a basis weight of from about 200 gsm to about 3000 gsm, and
(F) the core has a density of from about 0.015 g/cc to about 0.10 g/cc.

57. A process for the production of a nonwoven structure, comprising;
(1) providing a scrim with an interior surface and an outer surface, the scrim having a basis weight of from about 8 g/m² to about 200 g/m²;
(2) airlaying a nonwoven material on the interior surface of the scrim, the nonwoven material having a basis weight of from about 10 g/m² to about 2000 g/m² which contains from about 30 weight percent to about 95 weight percent matrix fibers, wherein the matrix fibers comprise individualized cellulosic fibers, and from about 5 weight percent to about 70 weight percent of a binder where the weight percentages are based on the total weight of the nonwoven material;

(3) depositing on the outer surface of the scrim from about 1 g/m² to about 40 g/m² of a polymeric coating;

(4) depositing a fire retardant material onto an outer surface of either the nonwoven structure or the scrim so that the nonwoven structure has a Burn Through Time in a fire barrier screening test of about 1 minute or greater; and, optionally, (5) depositing on the outer surface of the nonwoven material from about 1 g/m² to about 40 g/m² of a second polymeric coating.

58. A process for the production of a fire-retardant nonwoven material comprising:

(A) depositing a fire retardant on a comminution sheet of cellulosic fibers, (B) comminuting the sheet into individualized cellulosic fibers, (C) providing binder fibers, (D) air conveying the individualized cellulosic fibers and binder fibers to form a mixture of matrix fibers, (E) air laying the matrix fibers on a forming wire to form an airlaid nonwoven material, (F) optionally, depositing a latex binder on the airlaid nonwoven material, (G) heating the nonwoven material to cure the binder, and (H) optionally, depositing an anti-leachant on the comminution sheet or on the nonwoven material.

59. A process for the production of a nonwoven material comprising:

(A) providing a comminution sheet of cellulosic fibers, (B) treating the comminution sheet with a substance by spraying or dousing the comminution sheet;

(C) comminuting the sheet into individualized cellulosic fibers, (C) providing binder fibers, (D) air conveying the individualized cellulosic fibers and binder fibers to form a mixture of matrix fibers, (E) air laying the matrix fibers on a forming wire to form an airlaid nonwoven material, and (F) heating the nonwoven material to cure the binder fibers.

60. The process of claim 59, wherein the substance applied to the comminution sheet is a fire retardant, waterproofing agent, pigment, adhesive, biocide, antileachant, polymer, antimicrobicide, or a combination thereof.

* * * * *